(12) United States Patent
Park et al.

(10) Patent No.: US 9,460,575 B2
(45) Date of Patent: Oct. 4, 2016

(54) VEHICLE CONTROL APPARATUS AND METHOD THEREOF

(71) Applicant: LG Electronics Inc., Seoul (KR)

(72) Inventors: Jiyeong Park, Seoul (KR); Soyoung Kim, Seoul (KR); Hyunsun Lyu, Seoul (KR); Hangshin Cho, Seoul (KR); Gijae Yi, Seoul (KR); Jongseok Park, Seoul (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 14/560,119

(22) Filed: Dec. 4, 2014

(65) Prior Publication Data

US 2015/0161836 A1 Jun. 11, 2015

(30) Foreign Application Priority Data

Dec. 5, 2013 (KR) ........................ 10-2013-0150977

(51) Int. Cl.
*G07C 9/00* (2006.01)
*B60R 25/20* (2013.01)
*G06F 21/32* (2013.01)
(Continued)

(52) U.S. Cl.
CPC ....... *G07C 9/00134* (2013.01); *B60R 25/2045* (2013.01); *G06F 21/32* (2013.01); *G06F 21/36* (2013.01); *H04L 9/3231* (2013.01); *B60R 2325/205* (2013.01); *G06F 3/048* (2013.01);
(Continued)

(58) Field of Classification Search
CPC .......... G07C 5/00; G07C 5/008; G07C 9/00; G07C 9/00309; G07C 9/00896; G07C 9/00819; G07C 9/00134; G07C 9/00142; G07C 9/00158; G07C 9/00166; G07C 9/00174; B06R 25/2045

USPC .............. 340/5.1–5.5, 5.21–5.23, 5.51–5.55
See application file for complete search history.

(56) References Cited

U.S. PATENT DOCUMENTS 6,144,293 A 11/2000 Plaschko et al.
6,927,668 B1 8/2005 Odle et al.
(Continued)

FOREIGN PATENT DOCUMENTS

CN 1533940 10/2004
CN 1856630 11/2006
(Continued)

OTHER PUBLICATIONS

Extended Search Report dated Jun. 1, 2015 from corresponding European Patent Application No. 14004096.5, 11 pages.
(Continued)

*Primary Examiner* — Allen T Cao
(74) *Attorney, Agent, or Firm* — Fish & Richardson P.C.

(57) ABSTRACT

A vehicle includes a sensing unit for sensing an authentication input of a user, the sensing unit including a sensor configured to sense one or more taps that are applied by the user to arbitrary positions within a preset region of the vehicle as the authentication input. The vehicle control apparatus also includes a control apparatus that includes a memory configured to store an authentication information and a controller configured to determine whether the authentication input matches the stored authentication information. The controller is also configured to control the vehicle according to the stored authentication information when the authentication input matches the stored authentication information.

26 Claims, 43 Drawing Sheets

(51) Int. Cl.
*G06F 21/36* (2013.01)
*H04L 9/32* (2006.01)
*G06F 3/048* (2013.01)

(52) U.S. Cl.
CPC ...... *H04L 2209/805* (2013.01); *H04L 2209/84* (2013.01)

(56) References Cited

U.S. PATENT DOCUMENTS

| | | | |
|---|---|---|---|
| 7,593,000 | B1 | 9/2009 | Chin |
| 8,618,913 | B1* | 12/2013 | Bailey ................. H04W 12/08 340/10.1 |
| 2006/0145825 | A1 | 7/2006 | McCall |
| 2010/0109838 | A1 | 5/2010 | Fisher |
| 2012/0191993 | A1 | 7/2012 | Drader et al. |
| 2015/0334291 | A1* | 11/2015 | Cho ..................... G03F 3/0488 348/222.1 |
| 2015/0338979 | A1* | 11/2015 | Rhee .................... G06F 3/0414 345/174 |

FOREIGN PATENT DOCUMENTS

| | | |
|---|---|---|
| EP | 0 803 623 A1 | 10/1997 |
| EP | 0 976 897 A1 | 2/2000 |
| EP | 1113405 | 7/2001 |
| EP | 1 571 601 A2 | 9/2005 |
| EP | 2019005 A3 | 7/2009 |
| EP | 2463798 | 6/2012 |
| EP | 1970265 B1 | 9/2012 |
| JP | 2008296607 A | 12/2008 |
| JP | 2009127252 A | 6/2009 |
| WO | 2010/043277 | 4/2010 |
| WO | 2013/152558 | 10/2013 |

OTHER PUBLICATIONS

Partial European Search Report dated Mar. 4, 2015 from corresponding European Patent Application Na 14004096.5, 5 pages.
Einar Tysen, "Unlock Android phone after too many pattern attempts." einartysen.se, Jan. 8, 2010, pp. 1-18, XP055056490, retrieved from the Internet: URL http://einartysen.se/unlock-android-phone-after-too-many-pattern-attemsp/ [retrieved on Mar. 14, 2013].
Office Action issued in European Application No. 14170462.7 on Dec. 22, 2015, 7 pages.

* cited by examiner

FIG. 5B
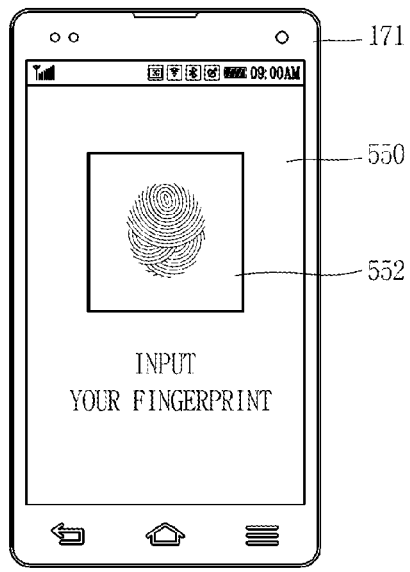
(a)
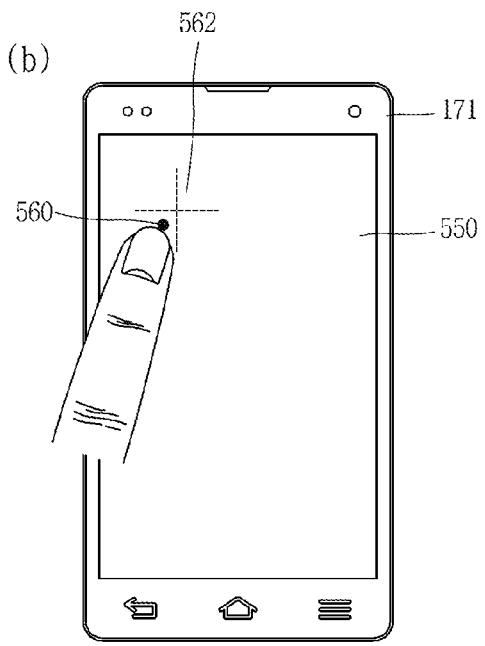
(b)
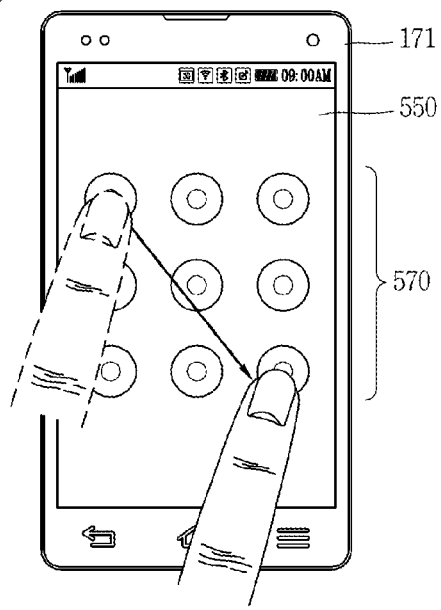
(c)

FIG. 7A
(a)
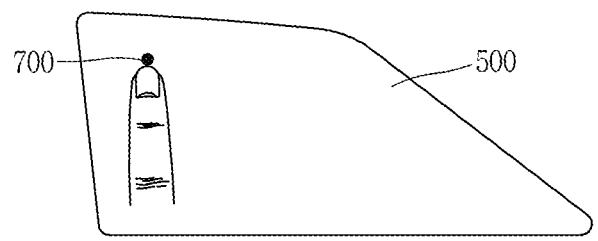
(b)
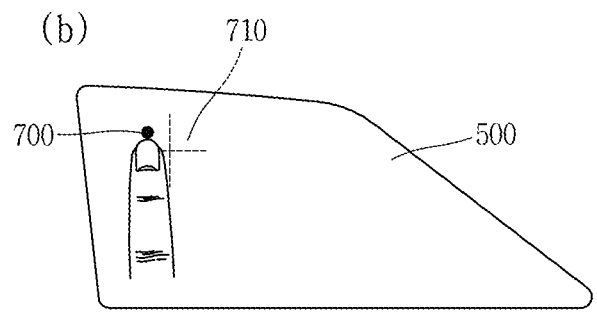
(c)
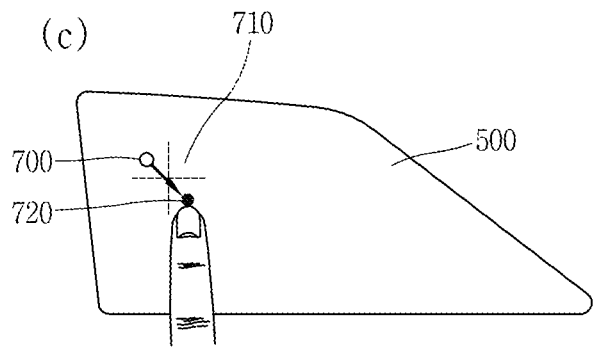

FIG. 7F
(a) 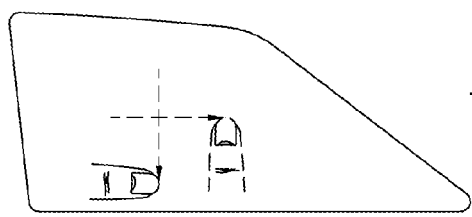  (b) 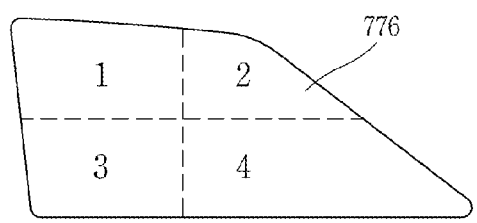
FIG. 7G
(a) 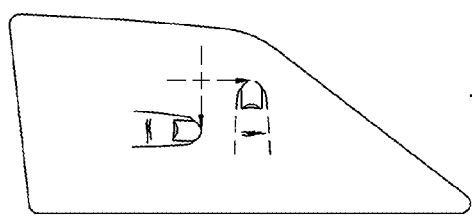  (b) 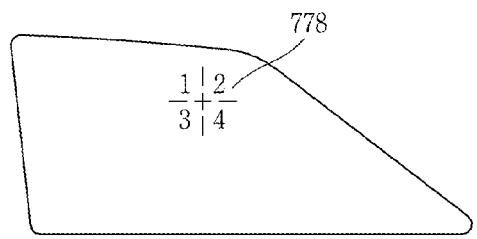

FIG. 14B
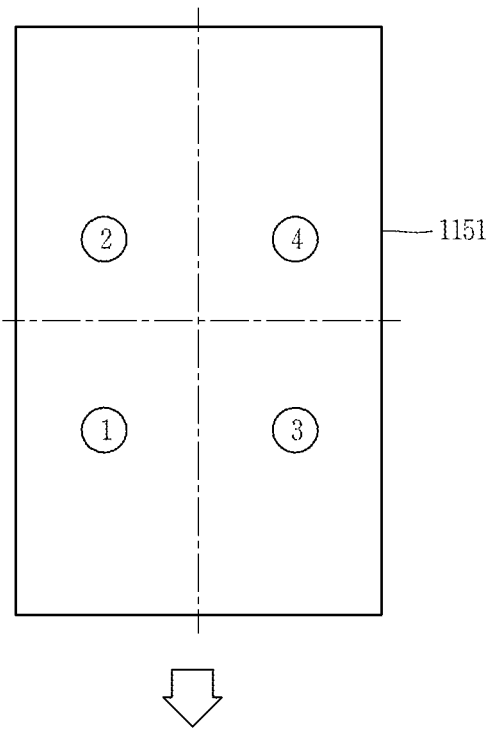
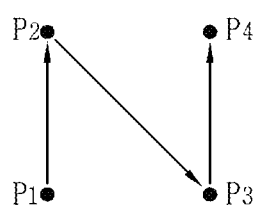
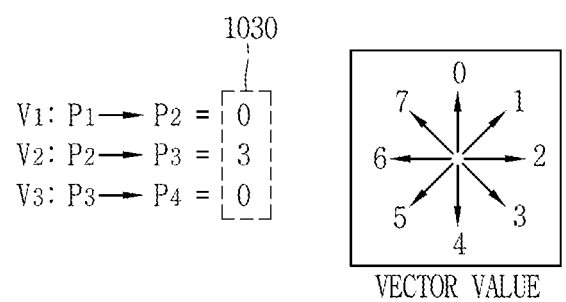

FIG. 15
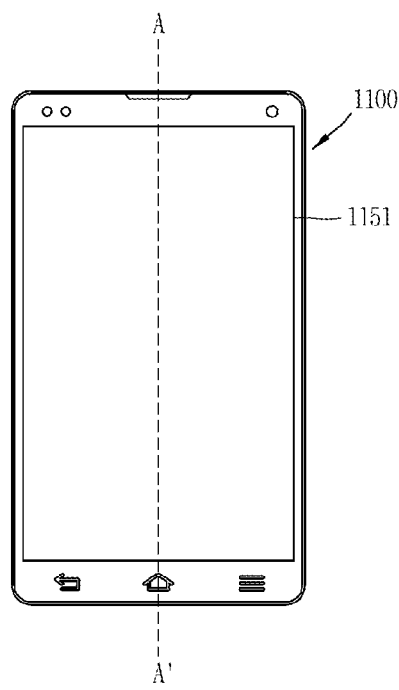
(a)
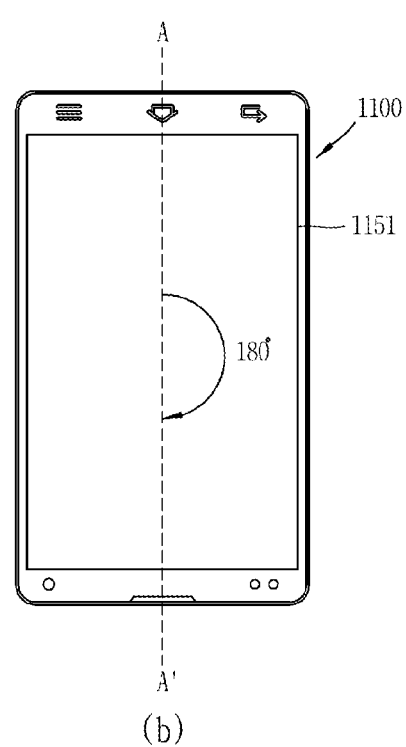
(b)
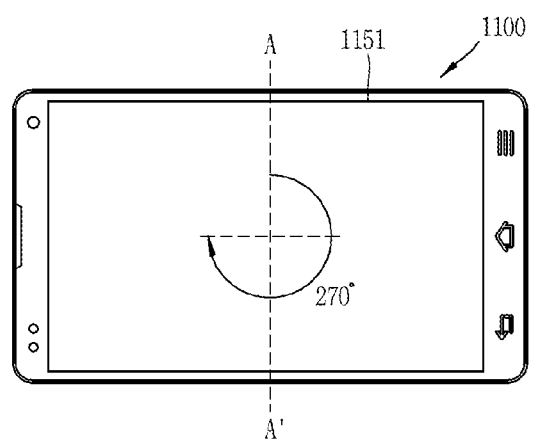
(d)
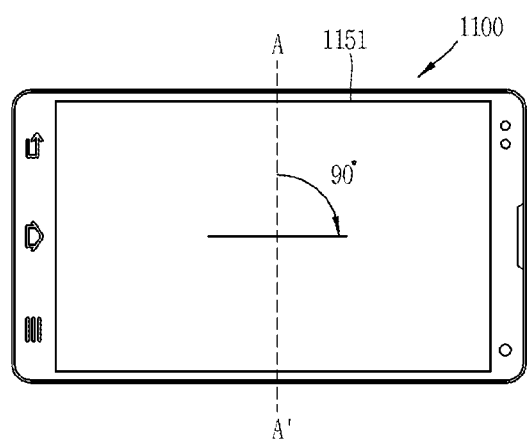
(c)

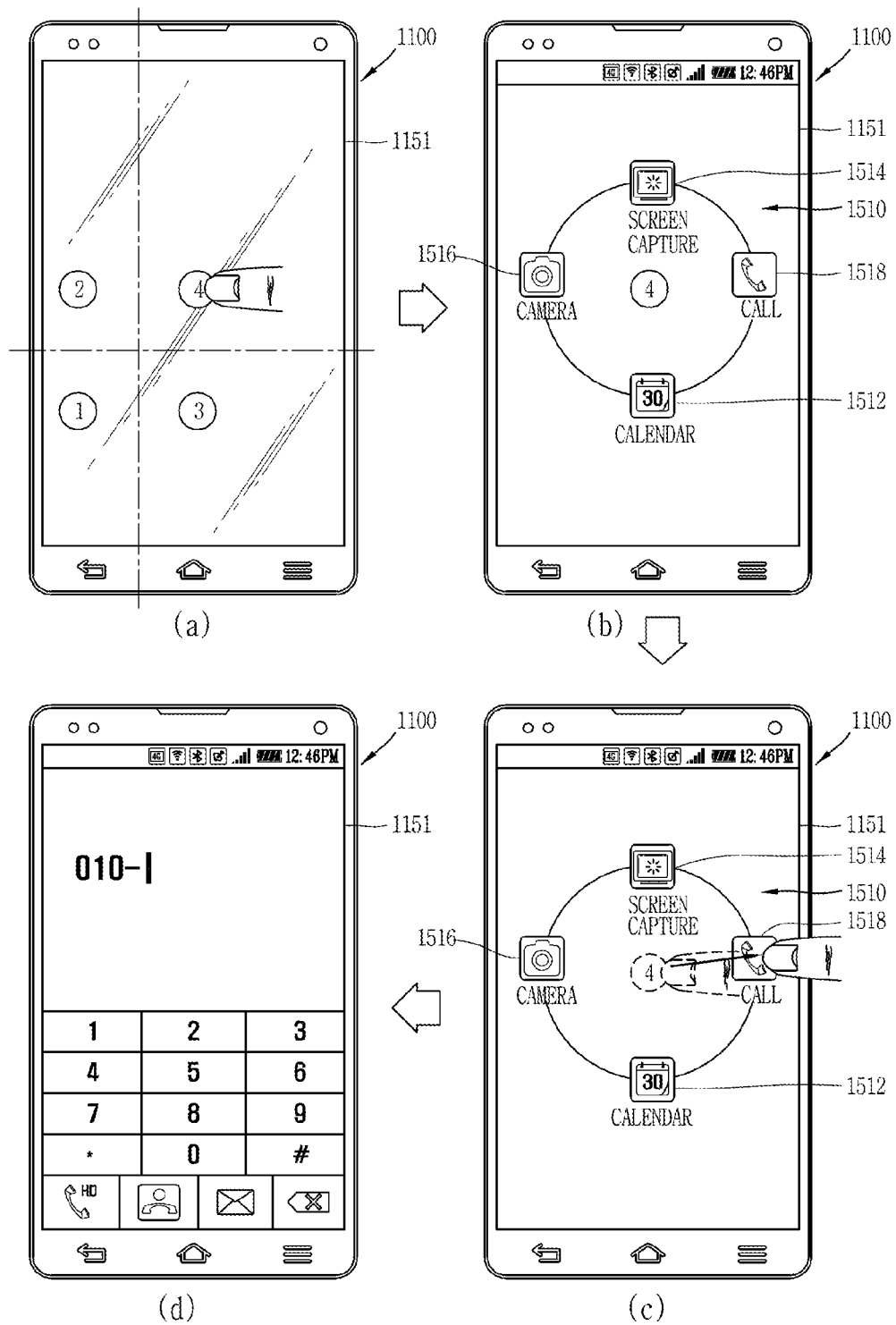

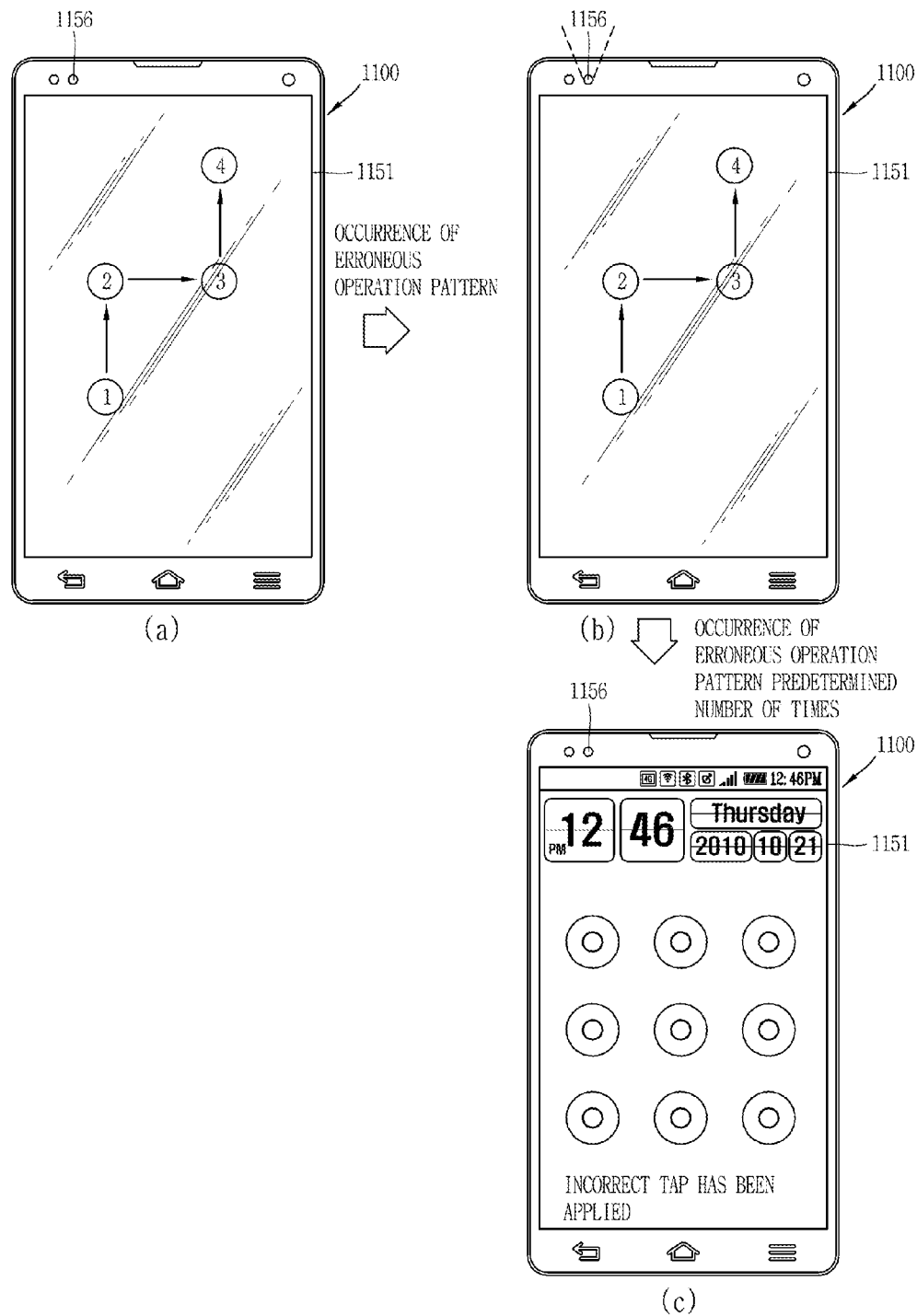

FIG. 22
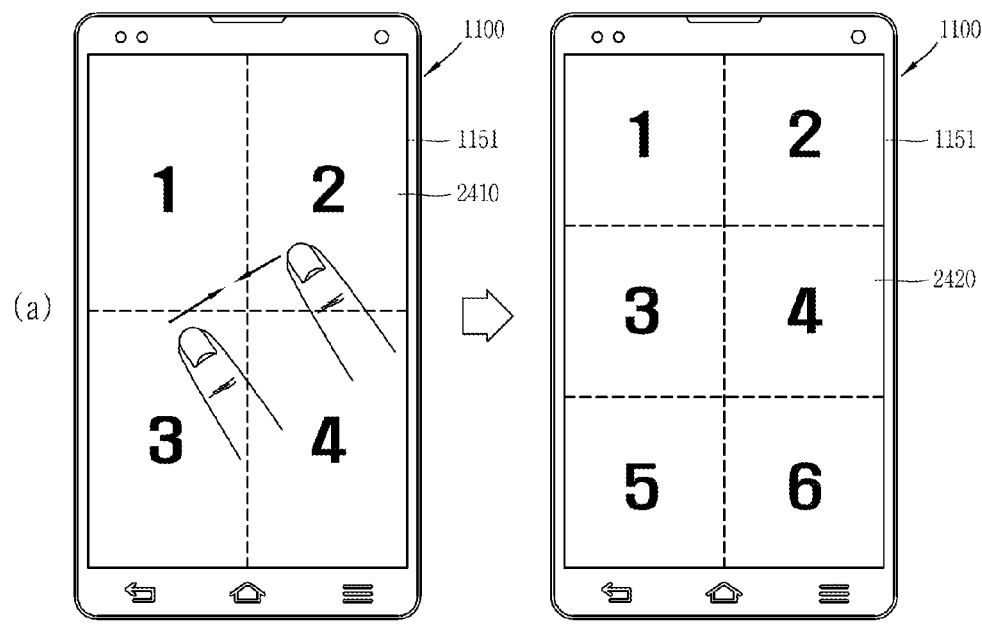
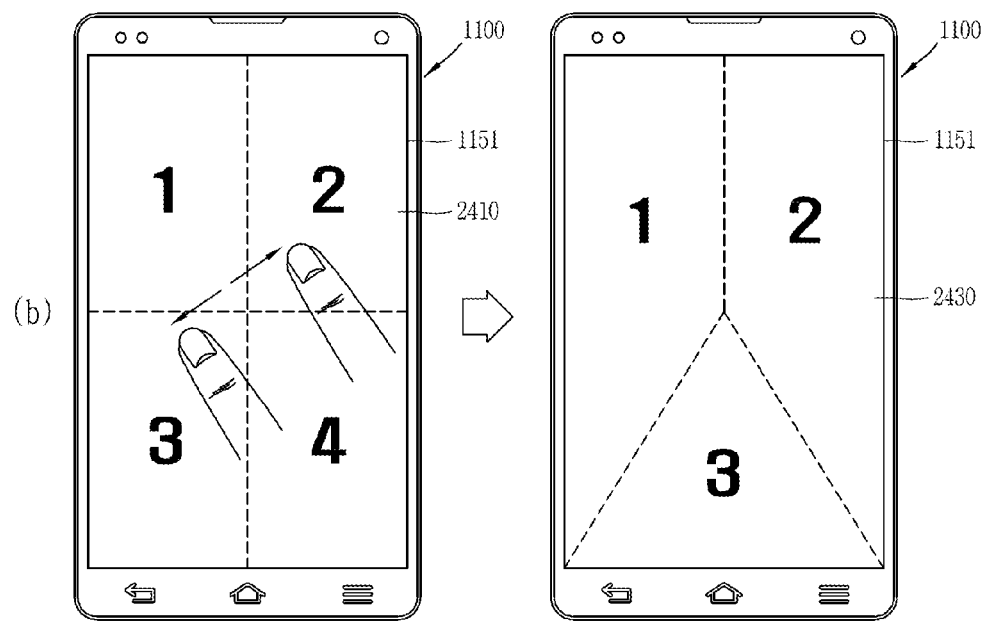

FIG. 25B
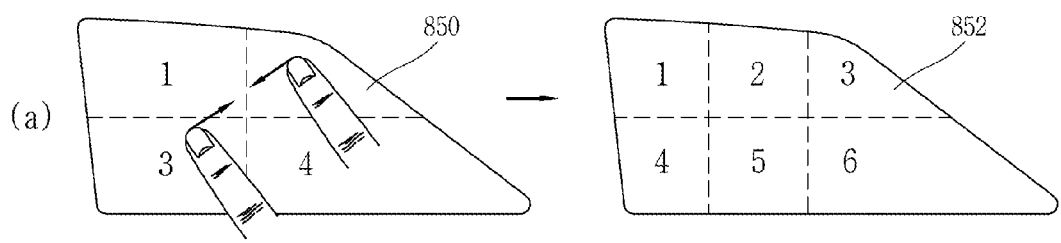
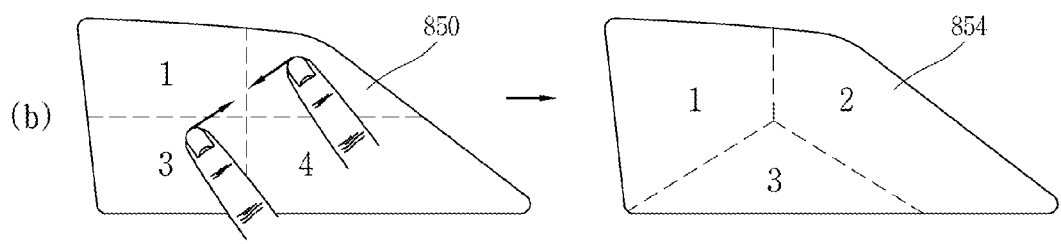

(a)

- Passengers: 1
- Authorized: TOM
- Preffered temp. :27℃

(b)

- Now temp.:30℃
- Target temp. :27℃

Temperature is auto controling.

FIG. 26C
(a)
-Passengers: 2
-Authorized: TOM
-Sheet Space
 Adjusting
(b)
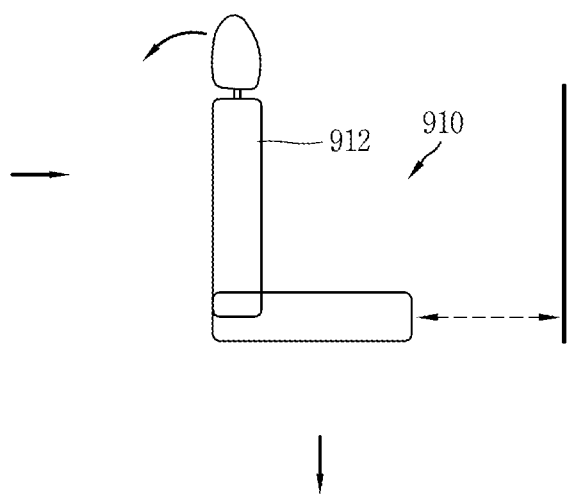
(c)
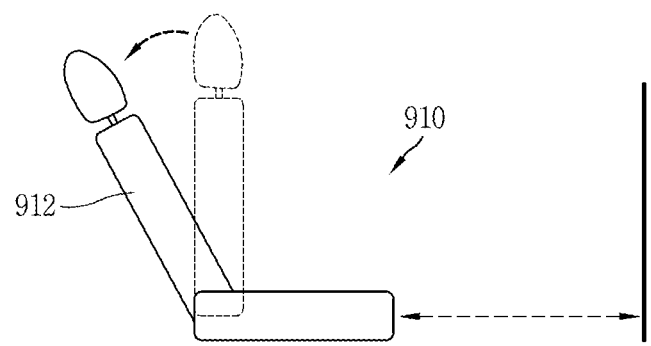

VEHICLE CONTROL APPARATUS AND METHOD THEREOF

CROSS-REFERENCE TO RELATED APPLICATION

Pursuant to 35 U.S.C. §119(a), this application claims the benefit of earlier filing date and right of priority to Korean Application No. 10-2013-0150977, filed in Republic of Korea on Dec. 5, 2013, the contents of which is incorporated by reference herein in its entirety.

FIELD

The present disclosure relates to a vehicle control apparatus and a control method thereof.

BACKGROUND

A recent vehicle control technique provides many functions unlike the conventional one. For instance, a recent vehicle control apparatus may control a vehicle door to be open, or may control a vehicle to start, using a fingerprint authentication method rather than the conventional key method. Alternatively, the vehicle control apparatus may control a height of a driver's seat, an angle of a back of a seat, etc. according to a driver's request, thereby providing a more comfortable and pleasant driving environment.

Research on a method capable of driving a vehicle by a user more easily and conveniently, and capable of providing a user's preferred driving environment using such vehicle control system is actively ongoing.

SUMMARY

Therefore, an aspect of the detailed description is to provide a vehicle control apparatus capable of allowing a user to generate his or her preferred driving environments more easily and conveniently, and a control method thereof.

According to another aspect, a vehicle includes a sensing unit configured to sense an authentication input of a user, the sensing unit including a sensor configured to sense one or more taps that are applied by the user to arbitrary positions within a preset region of the vehicle as the authentication input. The vehicle control apparatus also includes a control apparatus that includes a memory configured to store an authentication information, and a controller configured to determine whether the authentication input matches the stored authentication information and to control, based on the authentication input matching the stored authentication information, the vehicle according to the stored authentication information.

Implementations of this aspect may include one or more of the following features. For example, the controller may be configured to determine whether one or both of a spatial information or a temporal information that is associated with the one or more taps that are applied by the user matches the stored authentication information. The controller may be configured to form an authentication information input region within the preset region to sense the one or more taps, one or both of a size and a position of the authentication information input region may be determined based on a position of the first of the one or more taps. The vehicle control apparatus may further include an external frame that forms an outer appearance of the vehicle, a window, and an internal frame within which the user can board, wherein the preset region is disposed on at least one of the external frame, the window, and the internal frame. The controller may be configured to control, based on the authentication input matching the stored authentication information, the vehicle by releasing a locked stated of the vehicle. The vehicle control apparatus may further include a door, wherein the controller is configured to release a locked stated of the door by releasing the locked state of the vehicle. The memory may be further configured to store past control information associated with the user, the controller being configured to control, based on the authentication input matching the stored authentication information, the vehicle according to the stored authentication information and the past control information, the memory being configured to store past control information that includes driver setting data. The vehicle control apparatus may further include a display unit that is mounted to the vehicle and configured to output visual information, and the controller may be configured to control the display unit to output a portion of the authentication input that has matched the stored authentication information. The vehicle control apparatus may further include a driving unit that is configured to perform at least a first function and a second function of the vehicle that are opposite to each other, wherein based on sequential input of the same authentication input by the user, the controller may be configured to control the driving unit to perform the first and second functions in an alternating manner.

In some cases, the sensing unit may be configured to sense the authentication input of the user, the authentication input including a first tap and a touch input that follows the first tap. The sensor may include a touch sensor configured to sense positions associated with the touch input, wherein the controller may be configured to control the vehicle based on a determination that the sensed positions matches the stored authentication information. The sensor may include an acceleration sensor configured to sense a rhythmic pattern associated with the touch input, and the controller may be configured to control the vehicle based on a determination that the sensed rhythmic pattern matches the stored authentication information. The vehicle control apparatus may further include a display unit that is mounted to the vehicle and configured to output visual information, wherein the stored authentication information may be a preset pattern of position changes of sequentially-input taps, and wherein the display unit may output an image corresponding to the taps sensed by the sensing unit. An output position of the image on the display unit may be variable according to a position of the first tap. The display unit may be configured to restrict output of the image based on lapse of a preset time period. Upon detection of the first tap and the touch input, the controller may perform a preset function based on the touch input. The sensor may be configured to sense corresponding position information of taps that are sequentially input by the user as the touch input within a preset region formed inside or outside of the vehicle, and the controller is configured register the sensed position information as the stored authentication information of the user.

In some cases, the vehicle control apparatus may further include an output unit that is configured to output notification information to the outside of the vehicle, wherein the controller is configured to activate the output unit based on the authentication input matching the stored authentication information. The memory may be configured to store a plurality of authentication information corresponding a plurality of users, and the controller may be configured to determine whether the authentication input matches one of the plurality of the stored authentication information and to control, based on the authentication input matching one of the plurality of the stored authentication information, the vehicle according to the one of the plurality of the stored authentication information. The sensing unit may include a gesture sensor that is configured to sense a gesture of the user that is performed inside or outside of the vehicle, and the stored authentication information may include gesture data, the controller being configured to control a function of the vehicle based on the gesture of the user matching the stored gesture data. The sensing unit may be configured to sense the touch input that is in the form of a fingerprint, wherein the controller is configured to control the vehicle based on a determination that the sensed fingerprint matches the stored authentication information. The vehicle control apparatus may further include an authentication signal sensing unit that is configured sense a user authentication signal that is transmitted wirelessly from an external device, wherein the controller is configured to control a function of the vehicle based on the user authentication signal matching a pre-stored authentication signal. The authentication signal sensing unit may be configured to receive user authentication information that includes at least one of fingerprint information, iris recognition information, and password information from the external device and to control the vehicle based on the received user authentication information matching a pre-stored reference information. The authentication signal sensing unit may be configured to receive information corresponding to a plurality of taps that are sequentially input by the user into the external device and to control the vehicle based on the information corresponding to the plurality of taps matching a pre-stored tap information. The sensor may be configured to sense the one or more taps that are applied by the user to arbitrary positions within the preset region of the vehicle as the authentication input based on a determination that the external device is within a preset distance from the vehicle.

According to yet another aspect, a system for controlling a vehicle includes a sensing unit configured to sense an authentication input of a user, the sensing unit including a sensor configured to sense one or more taps that are applied by the user to arbitrary positions within a preset region of the vehicle as the authentication input, and a control apparatus. The control apparatus includes a memory configured to store an authentication information, and a controller configured to determine whether the authentication input matches the stored authentication information and to control, based on the authentication input matching the stored authentication information, the vehicle according to the stored authentication information.

According to yet another aspect, a method for controlling a vehicle includes sensing an authentication input of a user, wherein sensing the authentication input includes sensing one or more taps that are applied by the user to arbitrary positions within a preset region of the vehicle of the vehicle as the authentication input, and controlling a function of the vehicle based on a determination by a controller that the authentication input matches an authentication information that is stored in a memory.

Further scope of applicability of the present application will become more apparent from the detailed description given hereinafter. However, it should be understood that the detailed description and specific examples, while indicating certain implementations of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary implementations and together with the description serve to explain the principles of the disclosure.

In the drawings:

FIGS. 5A and 5B are schematic views illustrating example processes for receiving user authentication information, in a vehicle control apparatus according to the present disclosure;

FIGS. 7A to 7G are reference views illustrating example processes for receiving user pattern information comprising a plurality of taps, in a vehicle control apparatus according to the present disclosure;

FIGS. 14A and 14B are conceptual views illustrating an example method for sensing a user's motion pattern using the components of FIG. 13;

FIGS. 15, 16A, 16B, and 16C are conceptual views illustrating an example method to control a mobile terminal with respect to the terminal's orientation according to an implementation of the present disclosure;

FIGS. 18A and 18B are conceptual views illustrating an example method to control a mobile terminal in a case where a last tap has not been released but is in a contacted state with a display unit, according to an implementation of the present disclosure;

FIG. 19 is a conceptual view illustrating an example method to control a mobile terminal according to an implementation of the present disclosure, in a case where an erroneous motion pattern has been applied to the mobile terminal;

FIGS. 21 and 22 are conceptual views for illustrating an example method to set a motion pattern for releasing a locked state using a mobile terminal according to an implementation of the present disclosure.

FIGS. 25A and 25B are reference views illustrating example processes for generating pattern information by a user, in a vehicle control apparatus according to the present disclosure;

FIGS. 26A to 26D are reference views illustrating an example process where an environment setting state of a vehicle is changed based on an authenticated user in a vehicle control apparatus according to the present disclosure.

Like reference symbols in the various drawings indicate like elements.

DETAILED DESCRIPTION OF THE DISCLOSURE

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, terms such as "module" and "unit" may be used to refer to elements or components. Use of such terms herein is merely intended to facilitate description of the specification, and the suffix itself is not intended to give any special meaning or function. The accompanying drawings are used to facilitate understanding of various technical features and it should be understood that the implementations presented herein are not limited by the accompanying drawings. As such, the present disclosure should be construed to extend to any alterations, equivalents and substitutes in addition to those which are particularly set out in the accompanying drawings.

Figure 1A:
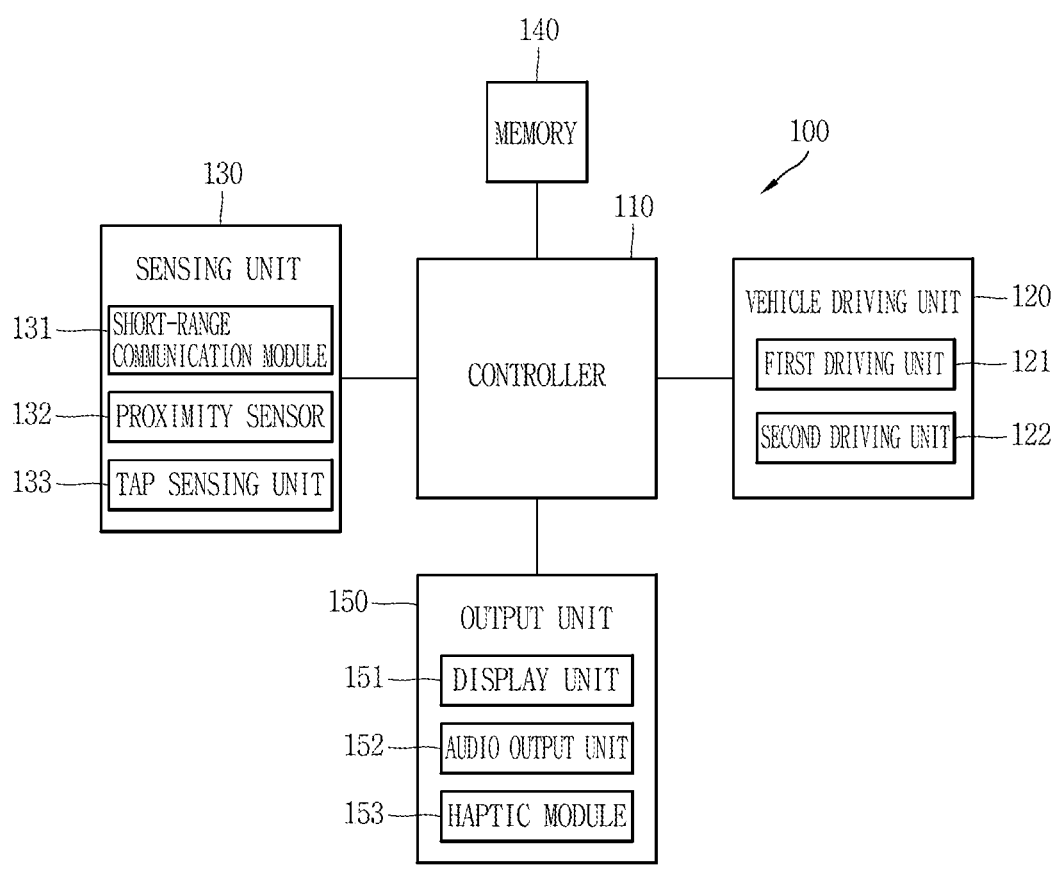
FIG. 1A is a block diagram for illustrating an example vehicle control apparatus according to the present disclosure.

Referring to FIG. 1A, a vehicle control apparatus 100 according to the present disclosure may include a controller 110, a sensing unit 130 connected to the controller 110, a vehicle driving unit 120, and a memory 140. The vehicle control apparatus 100 may further include an output unit 150. The vehicle control apparatus 100 may be formed at a body unit of a vehicle, the body unit including an external frame which forms appearance, a window, and an internal frame formed such that a user is able to be on board. FIG. 1A shows the vehicle control apparatus 100 having various components, but it is understood that implementing all of the illustrated components is not a requirement. Greater or fewer components may alternatively be implemented.

The sensing unit 130 may be implemented using one or more sensors configured to sense internal information of the vehicle control apparatus 100, the surrounding environment of the vehicle control apparatus 100, user information, and the like. For example, the sensing unit 130 is shown here as having a proximity sensor 141 and an illumination sensor 142. If desired, the sensing unit 130 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The vehicle control apparatus 100 may be configured to utilize information obtained from sensing unit 130, and in particular, information obtained from one or more sensors of the sensing unit 130, and combinations thereof.

The sensing unit 130 may further include a short-range communication module 131. For example, the short-range communication module 131 for short-range communication may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, Wireless Universal Serial Bus (Wireless USB), and the like. The short-range communication module 131 may support wireless communication between the vehicle control apparatus 100 and an external device 170 through wireless area networks.

The vehicle driving unit 120 may release a locked state of a vehicle, or may convert the current state of the vehicle into a locked state. The locked state of the vehicle may refer to a state where functions of the vehicle are limited entirely or partially, the vehicle does not start, and/or a door of the vehicle does not open. On the other hand, the released state may refer to a state where at least one among a driver's side door, a passenger's side door, rear doors, and/or a trunk can open. The released state may also refer to a state where all functions of the vehicle can be performed; that is, the vehicle can start or various functions such as a navigation function and a ventilation function can be performed.

The vehicle driving unit 120 may change various settings and enable a function to be automatically performed. The vehicle driving unit 120 may control each component of the vehicle under control of the controller 110. For instance, the vehicle driving unit 120 may control an opening amount of a driver's side window or a passenger's side window, an angle of a side mirror, etc. In some cases, the vehicle driving unit 120 may adjust a height or a horizontal position (for example, a distance between seats) of at least one among a driver's seat or a passenger seat and rear seats. Further, the vehicle driving unit 120 may set a steering wheel on a driver's side. For instance, the vehicle driving unit, for example, may set a height, a sensitivity, etc. of the steering wheel under the control of the controller 110. Further, under control of the controller 110, the vehicle driving unit 120 may enable a gear to operate in an automatic transmission mode or in a manual transmission mode. In case of a hybrid vehicle, the vehicle driving unit 120 may enable either a combustion engine mode or an electric motor mode to be preferentially selected.

Under control of the controller 110, the vehicle driving unit 120 may change not only a hardware setting state of the vehicle, but also a software setting state of the vehicle. For example, under control of the controller 110, the vehicle driving unit 120 may enable a predetermined music play list to be displayed or may enable one music item on the predetermined music play list to be automatically reproduced. Further, the vehicle driving unit 120 may automatically set a predetermined specific destination point, and may enable a path to the specific destination point to be automatically displayed though a navigation system. In addition, under control of the controller 110, the vehicle driving unit 120 may enable a distance from a preceding or following vehicle or a speed of the vehicle to be automatically set in a case where a cruise control of the vehicle operates.

To this end, the vehicle driving unit 120 may be provided with one or more different sub-driving units, and the sub-driving units may change hardware or software setting states of the vehicle, respectively. Hereafter, the sub-driving unit configured to change a hardware setting state of the vehicle is referred to as a first driving unit 121, and the sub-driving unit configured to change a software setting state of the vehicle is referred to as a second driving unit 122.

In order to change a hardware setting of the vehicle, the first driving unit 121 may include other components for changing the external frame or the internal frame of the vehicle. For example, the first driving unit 121 may further include a hardware driving unit for adjusting a height of a seat or an angle of a back of a seat. And the first driving unit 121 may further include an adjusting unit for adjusting a height of a steering wheel. The adjusting unit can include an elastic member such as a coil or a spring, or a pressure member.

The second driving unit 122 may be implemented as one or more application programs or applications. For example, the second driving unit 122 may be implemented as a form that includes one of application programs for driving a navigation system, or that includes an application program for reproducing pre-stored media data (for example, MP3) and the like. Such application programs or applications may be one of various types of vehicle control apparatuses.

The output unit 150 is configured to generate an output associated with a sense of sight, an auditory sense, and/or a tactual sense, and may include at least one of a display unit 151, an audio output unit 152, a haptic module 153, and an optical output unit 154. The display unit 151 for displaying various types of image information may have a layered structure with a touch sensor, or may be integrally formed with a touch sensor, thereby implementing a touch screen. The touch screen may serve as a user input unit 123 that provides an input interface between the vehicle control apparatus 100 and a user, and at the same time, may provide an output interface between the vehicle control apparatus 100 and the user.

The touch screen may be implemented on various portions of the vehicle. For example, the touch screen may be implemented on an entire region or a partial region of a windshield of the vehicle. Alternatively, or additionally, the touch screen may be implemented anywhere on an external surface (a surface exposed to outside of the vehicle) or an internal surface (a surface that faces inside of the vehicle). The touch screen may be also implemented on an external or internal surface of a driver's side window, a passenger's side window, or windows on the rear seat side of the vehicle. The touch screen may be also implemented on a side mirror or a sunroof of the vehicle.

The touch screen may be implemented not only on glass such as a window or a sunroof of the vehicle, but also on the external or internal frame of the vehicle. For example, the touch screen may be implemented on a surface of the external frame of the vehicle, that is, between a windshield and a window or between windows, such as an A-pillar, a B-pillar or a C-pillar. In some cases, the touch screen may be implemented on at least one portion (for example, one portion in the vicinity of a door knob of a vehicle door) of an external surface of the vehicle door. The touch screen may be also formed on a surface of a cover of a gear box within the vehicle or on one portion of a cover of a console box. In addition, the touch screen may be formed in plurality on one or more different portions of the vehicle.

A memory 140 can store therein data available to various functions of the vehicle control apparatus 100. The memory 140 may store therein multiple application programs or applications that are driven in the vehicle control apparatus 100, data and commands for an operation of the vehicle control apparatus 100. At least part of such application programs may be downloaded from an external server through wireless communication. For basic functions of the vehicle control apparatus 100 (for example, a vehicle starting function, a navigation function, and vehicle locking and unlocking functions), at least part of such application programs may be pre-installed on the vehicle control apparatus 100 before being released. In some cases, the application program may be stored in the memory 140, and may be installed on the vehicle control apparatus 100. The controller 110 may run the application program so that an operation (or a function) of the vehicle control apparatus can be performed.

Information on at least one user may be stored in the memory 140. The information on the user may be authentication information on the user, and information on various types of setting conditions of the vehicle that are set directly by the user or are set properly based on bio-information on the user. The information on the user can be, for example, setting information on temperature or humidity in the vehicle which is set by the user, setting information that depends on a driving habit of the user, or the like. In addition, the information on the user may be a record of driving paths along which the user drove. In addition, the authentication information may be information on a password or a pattern that is predetermined by the user, or may be information that is based on bio-information on the user, such as recognition information on user's fingerprints or irises. In addition, the authentication information may be information relating to a user's gesture.

A program for operation of the controller 110 may be stored in the memory 140, pieces of data (for example, user authentication information, or driving environment setting information) that are input or output may be temporarily stored in the memory 140. Pieces of data on various patterns of vibration and sound that are output when a touch input is applied to the touch screen may be stored in the memory 140.

The memory 140 may include, for example at least one storage medium of a flash memory, a hard disk, a solid state disk (SDD), a silicon disk drive (SDD), a multimedia card micro type, a card memory (for example, an SD, a XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The vehicle control apparatus 100 may operate in association with a web storage apparatus that, like the memory 140, performs a storage function over the Internet.

In some cases, the controller 110 may control an entire operation of the vehicle control apparatus 100 in addition to the operation associated with the application programs described above. The controller 110 may process a signal, data, information, and the like that are input or output through the above components, or may control driving of the vehicle by running the application program that is stored in the memory 140. In addition, the controller 110 may control at least part of the above components that have been described with reference to FIG. 1A, in order to run the application program stored in the memory 140. Furthermore, the controller 110 may control the above components that are included in the vehicle control apparatus 100, through combination of at least two of them in order to run the application program.

In some cases, the controller 110 may receive authentication information from a user, and may determine whether the user is an authenticated user or not, based on the authentication information. The authentication information may be recognition information on the user's finger or on a predetermined pattern. In addition, the authentication information may be recognition information on user's irises, or information on a user's specific gesture. For example, the controller 110 may receive pattern recognition information or finger recognition information, as the authentication information. The pattern recognition information may be based on multiple taps, which may also be referred to as knocks, that are applied by a user to one portion of an external or internal surface of the vehicle. The multiple taps may be applied, for example, using the user's finger and/or knuckle. A tap-based authentication information may be referred to as a knock pattern. In some cases, a knock pattern can include a knock code. The finger recognition information can be input through one portion of the external or internal surface of the vehicle, or through a touch screen region that is formed on a driver's side or passenger's side window, a window shield and the like. In addition, the controller 110 may recognize a user's gesture that is formed inside or outside the vehicle, or may recognize information on the user's irises, using a photo sensor or a camera that is provided in the sensing unit 130.

The controller 110 may release a locked state of the vehicle only after determining that a user is an authenticated user. Thus, the vehicle control apparatus 100 can enable the user to open a door of the vehicle, a trunk, and the like without having to use a key. In addition, the controller 110 may cause the vehicle to start based on predetermined authentication information on the user. In addition, the controller 110 may switch the current state of the vehicle into the locked state. That is, based on selection by the authenticated user, the controller 110 may maintain the locked state of the vehicle until the authentication information on the authenticated user is input again. In some cases, when the authentication information on the user is input from outside of the vehicle in the state where the vehicle has been unlocked, the controller 110 may switch the state of the vehicle to the locked state. Then, when the same authentication information is input again in a state where the vehicle has been switched to the locked state, the vehicle may be switched back to the unlocked state. That is, two opposite functions, such as switching to a locked state and switching to an unlocked state, may be performed sequentially upon sequential input of the same authentication information.

The controller 110 may be connected to a touch screen that is formed on one portion of the vehicle through which the authentication information on the user can be entered. The controller 110 may receive information on a user's fingerprint or pattern information through the touch screen. Alternatively, or additionally, the controller 110 may receive a preset password. To do this, the controller 110 may perform pattern recognition processing that recognizes a writing input or a picture-drawing input that is applied onto the touch screen, as a text or an image, respectively. Furthermore, the controller 110 may control one or more of the above components by combination, in order to realize various implementations of the vehicle control apparatus 100 which are to be described below.

In addition, the controller 110 may display various pieces of image information on the touch screen that is formed on one portion of the vehicle. For example, the controller 110 may display a finger input region for user authentication or graphic objects for a pattern input on the touch screen, and may display a result of the user authentication, information on a currently-authenticated user, or the like.

When a user is an authenticated user, the controller 110 may change a setting state of the vehicle based on information on the corresponding user. For example, the controller 110 may adjust a height of a driver's seat or the like, an angle of a back of a seat, or the like, and may adjust temperature or humidity in the vehicle, by controlling a first driving unit 121, based on information on the authenticated user. In addition, based on information on the authenticated user, the controller 110 may adjust an opening amount of a driver's side window or a passenger's side window, an angle of a side mirror, a height of a steering wheel, etc.

The controller 110 may change various types of operation modes of the vehicle according to preferences of an authenticated user. For example, the controller 110 may control one operation mode preferred by an authenticated user (e.g., a normal mode or a sports mode) to be selected, by switching an operation mode of a power steering device of a steering wheel. In addition, the controller 110 may switch a gear transmission mode to a manual transmission mode or an automatic transmission mode according to a preference of an authenticated user.

In addition, the controller 110 may change not only such hardware settings, but also software settings. For example, if an authenticated user rides in the vehicle, the controller 110 can automatically select his/her favorite music item or a list containing a music item that he/she previously listened to. In addition, the controller 110 may automatically select a channel of a radio broadcasting system that the authenticated user frequently tunes in and listens to.

In addition, the controller 110 may change various settings of the vehicle, based on a time at which the authenticated user rides in the vehicle. For example, based on a time at which the user is authenticated and on a record of the authenticated driver's driving, the controller 110 may search for a destination point where the authenticated user frequently goes at the corresponding time. That is, in a case where the user has a habit of regularly going "home" after work between 8:00 pm and 9:00 pm, if the user rides in the vehicle between 8:00 pm to 9:00 pm, the controller 110 may automatically set the destination point to "home" and display the corresponding path on a display unit of a navigation system, based on the record of the driving.

In this manner, the controller 110 of the vehicle control apparatus 100 according to the implementation of the present disclosure enables the user to control the vehicle using the authentication information. As a result, the user can ride in the vehicle and control the vehicle in an easier and more convenient manner. When the user is authenticated, the controller 110 of the vehicle control apparatus 100 according to the implementation of the present disclosure adjusts various driving environment settings of the vehicle as well, based on the fact that the user is authenticated, thereby automatically providing his/her favorite driving environment.

In addition, regardless of whether or not the user rides in the vehicle, the controller 110 may change the hardware or software settings of the vehicle in a convenient manner, based on the user's selection. For example, the controller 110 may change at least one hardware or software setting, based on the multiple-times tapping on the inside of the vehicle, for example, the console box, the gear box, or the windows in the driver seat or the front passenger seat. As one example, if the user applies the tapping multiple times to the steering wheel of the vehicle, the controller 110 recognizes this and thus may adjust the height of the steering wheel or may change the power steering wheel operation mode from one mode to another.

In some cases, the controller 110 can change the hardware or software setting state, based not only on the multiple taps, but also on the user's gesture. For example, the controller 110 can be connected to a camera, a photo sensor, a laser sensor, or an infrared sensor, among others, to sense movements of the driver or the passenger who rides in the vehicle. Then, based on the movements of the driver and the passenger, the controller 110 may perform a specific function and adjust a currently-set state. As one example, if the passenger sitting on the front passenger seat make a hand-lowering gesture toward the window in the front passenger seat, the extent to which the window in the front passenger seat is opened may be adjusted based on the passenger's gesture. In addition, if a specific gesture (for example, a fingers-flicking gesture or a hands-clapping gesture) is sensed, the controller 110 may reproduce predetermined specific music data, based on the driver's or passenger's gesture.

In some cases, at least one or more among the constituent elements described above may operate in cooperation with one another to realize operation or control of the vehicle control apparatus 100, or a method of controlling the vehicle control apparatus 100, which are described above, according to various implementations. In addition, the operation or the control of the vehicle control apparatus 100, or the method of controlling the vehicle control apparatus 100 may be realized on the vehicle control apparatus 100 by running at least one application program that is stored in the memory 140.

The constituent elements enumerated above are described in more detail below in reference to FIG. 1A, before describing the vehicle control apparatus 100 according to the various implementations.

The sensing unit 130 may sense at least one among (i) information on the inside of the vehicle control apparatus, (ii) information on an surrounding environment of the vehicle control apparatus, and (iii) information on the user, and generate a sensing signal corresponding to the sensed information. Based on the sensing signal, the controller 110 can control driving of or operation of the vehicle control apparatus 100, and/or can perform data processing, a function, or an operation associated with the application program that is stored on the vehicle control apparatus 100. Typical sensors among various sensors that can be included in the sensing unit 130 are described in more detail.

The proximity sensor 132 may include a sensor that can sense presence or absence of an object approaching a surface and/or an object located near a surface, by using an electromagnetic field, infrared rays, or the like without making physical contact with the object being sensed. The proximity sensor 132 may be arranged at an inner region of the mobile terminal covered by the touch screen, or near the touch screen.

The proximity sensor 132, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 132 can sense proximity of a pointer relative to the touch screen by changes of an electromagnetic field, which is responsive to an approach of an object with conductivity. In this case, the touch screen, acting as a touch sensor, may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 132 senses a proximity touch and a proximity touch pattern (for example, a proximity touch distance, a proximity touch direction, a proximity touch speed, proximity touch time, a proximity touch position, a proximity touch movement state, and the like). In some cases, the controller 110 may process data (or information) that corresponds to the proximity touch operation and the proximity touch pattern that are sensed through the proximity sensor 132, and further output visual information that corresponds to the processed data on the touch screen. Furthermore, the controller 110 may control the vehicle control apparatus 100 in such a manner that different operations are performed or different pieces of data (or different pieces of information) are processed depending on whether the touch applied to the same point on the touch screen is a proximity touch or a contact touch.

A touch sensor can sense a touch applied to the touch screen, such as the display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, among others.

When a touch input is sensed by a touch sensor, corresponding signals may be transmitted to a touch controller. The touch controller may process the received signals, and then transmit corresponding data to the controller 110. Accordingly, the controller 110 may sense which region of the display unit 151 has been touched. Here, the touch controller may be a component separate from the controller 110, or may be a part of the controller 110.

In some implementations, the controller 110 may execute the same or different controls according to a type of touch object that touches the touch screen or a touch key provided in addition to the touch screen. Whether to execute the same or different control according to the object which provides a touch input may be decided based on a current operating state of the vehicle control apparatus 100 or a currently executed application program, for example.

The touch sensor and the proximity sensor may be implemented individually, or in combination, to sense various types of touches. Such touches can include a short (or tapping) touch, a long touch, a multi-touch, a drag touch, a flick touch, a pinch-in touch, a pinch-out touch, a swipe touch, a hovering touch, and the like.

In some cases, an ultrasonic sensor may be implemented to recognize position information relating to a touch object using ultrasonic waves. The controller 110, for example, may calculate a position of a wave generation source based on information sensed by an illumination sensor and a plurality of ultrasonic sensors. Since light is much faster than ultrasonic waves, the time required for the light to reach the optical sensor is much shorter than the time required for the ultrasonic wave to reach the ultrasonic sensor. The position of the wave generation source may be calculated based on this information. For instance, the position of the wave generation source may be calculated using the time difference from the time that the ultrasonic wave reaches the sensor based on the light as a reference signal.

The sensing unit 130 can include at least one a camera sensor (CCD, CMOS etc.), a photo sensor (or image sensors), and a laser sensor, among others.

Implementing a camera with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

As described above, various pieces of image information relating to inputting of the authentication information on the user can be displayed on the display unit 151. For example, a graphic object that indicates a region for inputting a user's fingerprint or a graphic object for inputting the pattern information may be displayed on the display unit 151 that is formed, as the touch screen, on one portion of the vehicle. In addition, if user authentication has been completed, a result of the user authentication and information relating to the currently-authenticated user may be displayed on the display unit 151. These pieces of image information may be displayed on at least one portion of the windshield of the vehicle, the window in the front passenger seat, or other portions of the vehicle. To do this, at least one portion of the window of the vehicle or at least one portion of the windshield of the vehicle that is equipped with the vehicle control apparatus 100 according to the implementation of the present disclosure is designed in such a manner that the touch input by the user is sensed.

In addition, the display unit 151 can be formed on not only the external surface of the windshield and of the window, but also on the internal surface. Then, information that is processed in the vehicle control apparatus 100 may be displayed (or output) on the display unit 151 that is formed on the internal surface.

For example, screen information that is displayed on the display unit 151 that is formed on the internal surface may be execution screen information on an application program that is run on the vehicle control apparatus 100, or information on a user interface (UI) and a graphic user interface (GUI) that depend on the execution screen information.

In addition, the display unit 151 may be realized by being included in the sensing unit 130. In this case, a result of the sensing by the sensing unit 130, and a result of matching the user authentication information or at least one portion (for example, a name of the user and like) of the authentication information inherent to the user may be displayed on the display unit 151.

Audio data that is stored in the memory 140 can be output through the audio output unit 152. A sound signal associated with a function (for example, a user authentication confirmation sound and a user authentication guidance sound) that is performed in the vehicle control apparatus 100 may be output through the audio output unit 152. The audio output unit 152 can include a speaker, a buzzer, and the like.

In some cases, the output unit 150 of the vehicle control apparatus 100, disclosed in the present specification, according to the implementation, can be configured to include the haptic module 153. The haptic module 153 generates various haptic effects that the user can feel. A typical example of the haptic effect that is generated by the haptic module 153 is vibration. For example, if it is sensed that the touch input by the user is applied to the touch screen realized on the external frame of the internal frame of the vehicle, the widow in the form of glass, or the like, the controller 110 outputs haptic information using the haptic module 153. Accordingly, using the haptic information, the user can confirm whether he/she properly entered the authentication information.

The strength, the pattern, and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, and an effect by reproducing the sense of cold and warmth using an element that can absorb or generate heat, among others.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the vehicle control apparatus 100.

Various implementations to be explained later may be implemented in a computer or a computer-readable recording medium, by software, hardware, or a combination thereof.

In some cases, the sensing unit 130 of the vehicle control apparatus 100, disclosed in the present specification, according to the implementation may further include a main body that is configured to be mounted on the body and to come into contact with one portion of a user's body, and a tap sensing unit 133 for sensing a tap on the main body or a tap gesture. Here, the tap that is sensed in the tap sensing unit 133 of the vehicle control apparatus 100 can be a means for inputting the authentication information on the user. In addition, if the user rides in the vehicle, the tap can be used as a means for controlling various functions of the vehicle control apparatus 100. Moreover, the tap can be construed to mean a motion of lightly hitting the main body of the vehicle control apparatus 100 or an object, with a tapping tool such as a finger, or a motion of lightly bringing the tapping tool into contact with the main body of the vehicle control apparatus 100 or the object. Here, the main body of the sensing unit 130 is formed on a body unit of the vehicle that includes the external frame and the internal frame of the vehicle and the window or the windshield.

The tapping tool with which the tap is applied may be anything that can apply an external force to the main body of the vehicle control apparatus 100 or the object, such as a finger, a stylus pen, a pen, a pointer, a fist, or a knuckle. The tipping tool may not necessarily be limited to the thing that can be applied to the vehicle control apparatus 100 according to the present disclosure, and any type of object or part of a user's body may be possible as long as it can apply the external force to the main body of the vehicle control apparatus 100 or the object.

In some cases, the objects to which the tap gesture is applied may be at least one among the main body of the vehicle control apparatus 100 and the object that is placed on and on the vehicle control apparatus 100.

In some cases, the tap or the tap gesture may be sensed by at least one among an acceleration sensor and a touch sensor that are included in the tap sensing unit 133. Here the acceleration sensor can be a sensor that is capable of measuring dynamic forces, such as acceleration, vibration, and impact, which are applied to the main body of the vehicle control apparatus 100.

Accordingly, the acceleration sensor can sense vibration (or a movement) of the main body of the vehicle control apparatus 100, which occurs due to the tap gesture, and thus senses whether the tap is applied to the object. Therefore, the acceleration sensor can sense the tap on the main body of the vehicle control apparatus 100 or sense that an object that is positioned close to the main body of the vehicle control apparatus 100 to such an extent that it can be sensed whether the movement or the vibration occurs in the main body of the vehicle control apparatus 100 is tapped on.

In this manner, as long as the sensing of the movement or the vibration of the main body of the vehicle control apparatus 100 is possible, the acceleration sensor can sense not only the application of the tap to the main body of the vehicle control apparatus 100, but also the application of the tap to points other than the main body.

In the vehicle control apparatus 100 according to the present disclosure, in order to sense the tap on the vehicle control apparatus, only one among the acceleration sensor and the touch sensor may be used, the acceleration sensor and the touch sensor may be sequentially used, or the acceleration sensor and the touch sensor may be used at the same time. A mode in which only the acceleration sensor is used to sense the tap may be referred to as a first mode, a mode in which the touch sensor is used to sense the tap may be referred to as a second mode, and a mode in which the acceleration sensor and the touch sensor are all utilized (at the same time or sequentially) to sense the tap may be referred to as a third mode or a hybrid mode.

On the other hand, if the tap is sensed through the touch sensor, it may be possible to more accurately recognize a position at which the tap is sensed.

On the other hand, in the vehicle control apparatus 100 according to one implementation, in order to sense the tap through the acceleration sensor or the touch sensor, the display unit 151 of the vehicle control apparatus 100 can also operate in an inactivated state in a specific mode in which a minimum amount of current or electric power is consumed. The specific mode is referred to as a doze mode.

For example, in the doze mode, a light-emitting element for outputting a screen can be turned off and the touch sensor turned on in the display unit 151 in a touch screen structure in which the touch sensor is layered into the display unit 151. In addition, the doze mode is a mode in which the display unit 151 can be turned off and the acceleration sensor turned on. In addition, the doze mode is a mode in which the display unit 151 can be turned off and the touch sensor and the acceleration sensor all turned on.

Therefore, in the doze mode, that is, in a state where the display unit 151 is turned off (in a state where the display unit 151 is inactivated), if the user applies the tap to at least one point on the touch screen that is formed on one portion of the vehicle, or to a specific point on the main body of the vehicle control apparatus 100, it is sensed that the tap is applied from the user, through at least one among the touch sensor or the acceleration sensor that is turned on.

In addition, in order to distinguish between a tap as a means for inputting the authentication information on the user or a tap as a means for controlling a function of the vehicle control apparatus 100, and a simple collision of an outside arbitrary object with the touch screen, only if the tap is applied two or more times within a reference time to the touch screen formed on one portion of the vehicle may it be determined that the "tap" is sensed for inputting the authentication information on the user and controlling the vehicle control apparatus 100. For example, if it is determined that as a result of the sensing by the tap sensing unit 133, the tap is applied one time to the touch screen formed on one portion of the vehicle, the controller 110 may recognize that only the outside arbitrary object or an human body has collided with the touch screen, without recognizing that the one-time tap is for inputting the authentication information on the user.

Therefore, only if the tap sensing unit 133 senses that the tap is applied at least two or more times (or multiple times) consecutively within the reference time may it be determined that the "tap" should be processed as the means for inputting the authentication information on the user or as the mean of controlling the function of the vehicle control apparatus 100 is sensed.

Accordingly, the tap gestures as used herein mean that the tap gesture is to be sensed at least two times consecutively within the reference time. Therefore, the sensing of the "tap" hereinafter means that it is sensed that a user's finger or an object such as a touch pen is lightly hit substantially multiple times on the main body of the main body of the vehicle control apparatus 100.

Furthermore, the controller 110 may make it possible not only to sense the tap within the reference time, but also to determine whether the taps have been applied using different fingers or just one finger. For example, if it is sensed that the taps are applied to one predetermined portion of the vehicle, that is, one portion of the window of the vehicle or one portion of the window shield, an A-pillar, a B-pillar, a C-pillar, a sunroof, one portion of a vehicle door, or a console box or a gear box in the vehicle, etc., the controller 110 can make it possible to sense whether the taps are applied using one finger or using different fingers, using fingerprints that are sensed from the portion to which the taps are applied. In addition, the controller 110 can recognize a position on the display unit 151, at which the taps are sensed, or acceleration that is generated due to the taps, through at least one, among the touch sensor and the acceleration sensor that are provided in the tap sensing unit 133. Thus, the controller 110 makes it possible to sense whether the taps are applied using one finger or using different fingers.

Furthermore, considering additionally an angle at which the tap is applied and a distance between points to which the tap is applied or a direction in which the fingerprint is recognized, the controller 110 can determine whether the taps are applied using one finger or using both hands or at least two fingers.

In some cases, the taps mean multiple-times tapping that are sensed consecutively within the reference time. At this point, the reference time can be a very short time, for example, a time in the range of 300 ms to 2 s.

To achieve this, when the tap sensing unit 133 senses that the main body of the vehicle control apparatus 100 is tapped on, the tap sensing unit 133 can sense whether the next tapping is applied consecutively within the reference time after the first tapping is sensed. Then, if the next tapping is sensed within the reference time, the tap sensing unit 133 or the controller 110 can determine that the tap is sensed for inputting the authentication information on the user or for controlling a specific function of the vehicle control apparatus 100 according to the implementation of the present disclosure. In this manner, only if a second tap is sensed within a predetermined time after a first tap is sensed, the controller 110 recognizes the first and second taps as "effective taps." Thus, the controller can distinguish between the tap that is applied to input the authentication information on the user or to control the vehicle control apparatus 100 and the collision of an object with the inside or outside of the vehicle, which occurs unintentionally or due to a user's mistake.

There are various method of recognizing the effective tap. For example, when it is sensed that the second tap is applied a second reference number of times or greater to the main body within a predetermined time after sensing the first tap that is applied a first reference number of times or greater, the controller 110 may recognizes the first and second taps as the effective taps. At this point, the first reference number of times and the second reference number of times may be the same or be different. For example, the first reference number of times may be 1, and the second reference number of times may be 2. As another example, the first reference number of times and the second reference number of times may be all 1.

Additionally, or alternatively, only if the tap is applied to within a "predetermined region," may it be determined that the "taps" are sensed. That is, when it is determined that the main body of the vehicle control apparatus 100 is first tapped on, the controller 110 can calculate a predetermined region from a point at which the tapping is first sensed. Then, if the tapping is consecutively sensed the first or second reference number of times or greater at the "predetermined region" within the reference time after the first tapping is sensed, the controller 110 may determine that the first tap or the second tap is applied.

On the other hand, of course, the reference time and the predetermined region that are described above can be variably modified according to the implementation.

Additionally, the first tap and the second tap may be sensed as a separate tap according to not only the reference time and the predetermined region, but also a position at which each tap is sensed. That is, if the second tap is sensed in a position that is a predetermined distance or above away from the position in which the first tap is sensed. The controller 110 may determine that the first tap and the second tap are applied. Then, if the first tap and the second tap are recognized based the position in which the tap is sensed, the first tap and the second tap may be sensed at the same time.

In addition, if the first tap and the second tap are configured from multiple touches, that is, from multiple-times tapping, of course, the multiple touches that make up each of the first tap and the second tap are sensed at the same time. For example, if the first touch that makes up the first tap is sensed and at the same time, the first touch that makes up the second tap is sensed in a position that is a predetermined distance or above from a position in which the first touch that makes up the first tap is sensed, the controller 110 makes it possible to enable the first touch that makes up each of the first tap and the second tap. Then, the controller 110 makes it possible to enable an additional touch input, which is sensed in each position. If the touch is sensed the first reference number of times or greater or the second reference number of times or greater, the controller 110 determines that the first tap and the second tap are applied.

In some cases, when the tap sensing unit 133 senses multiple times that the tap is applied to the main body of the vehicle control apparatus 100, the controller 110 can control not only the user authentication, but also at least one among functions that is executable on the vehicle control apparatus 100. At this point, the functions that are executable on the vehicle control apparatus 100 refer to all types of functions that are executable or runnable on the vehicle control apparatus 100. At this point, one among the executable functions is a function of an application that is installed on the vehicle control apparatus 100. Then, "an arbitrary function is executed" means "an arbitrary application program is executed or is run on the vehicle control apparatus 100." For example, based on the user's multiple taps that are sensed in the console box, the controller 110 reproduces a music file or controls the navigation apparatus in such a manner that a path to a predetermined destination point is automatically set.

As another example, a function that is executable in the vehicle control apparatus 100 is a function that is necessary for basic driving of the vehicle control apparatus 100. For example, the function necessary for the basic driving may include various functions of the vehicle, such as a function of turning on/off an air conditioner or a warm-air circulator provided in the vehicle, a function of starting the vehicle, a function of switching between the locked state and the unlocked state, or the like. In addition, the function necessary for the basic driving may be a function of turning a cruise control function of the vehicle on or off.

In some cases, the controller 110 may form a location for inputting the authentication information on the user, based on a point on the main body or the touch screen at which the tapping by the user is sensed. For example, the controller 110 can form a region for inputting the pattern information, or a region for inputting the bio-information on the user, for example, the user's fingerprint, in such a manner that the point at which the tapping by the user is first applied serves the center of the region for inputting the pattern information or the bio-information. In this case, even though the user applies the tap to a different point on the main body or the touch screen each time he/she applies the tap, the point at which the information on the user-set pattern or the bio-information on the user can vary each time the user applies the tap. Accordingly, the user can minimize exposure of the authentication information, and this is a safeguard against an illegal act, such as when the vehicle is stolen.

The user authentication information may be also input into the vehicle control apparatus 100 through an external device that is predetermined based on the user's selection. For example, the sensing unit 130 may be connected to a predetermined external device outside of the vehicle using a short-range communication module 131. The authentication information on the user may be input into the sensing unit 130 through the short-range communication module 131 and may be authenticated by the controller 110.

Figure 1B:
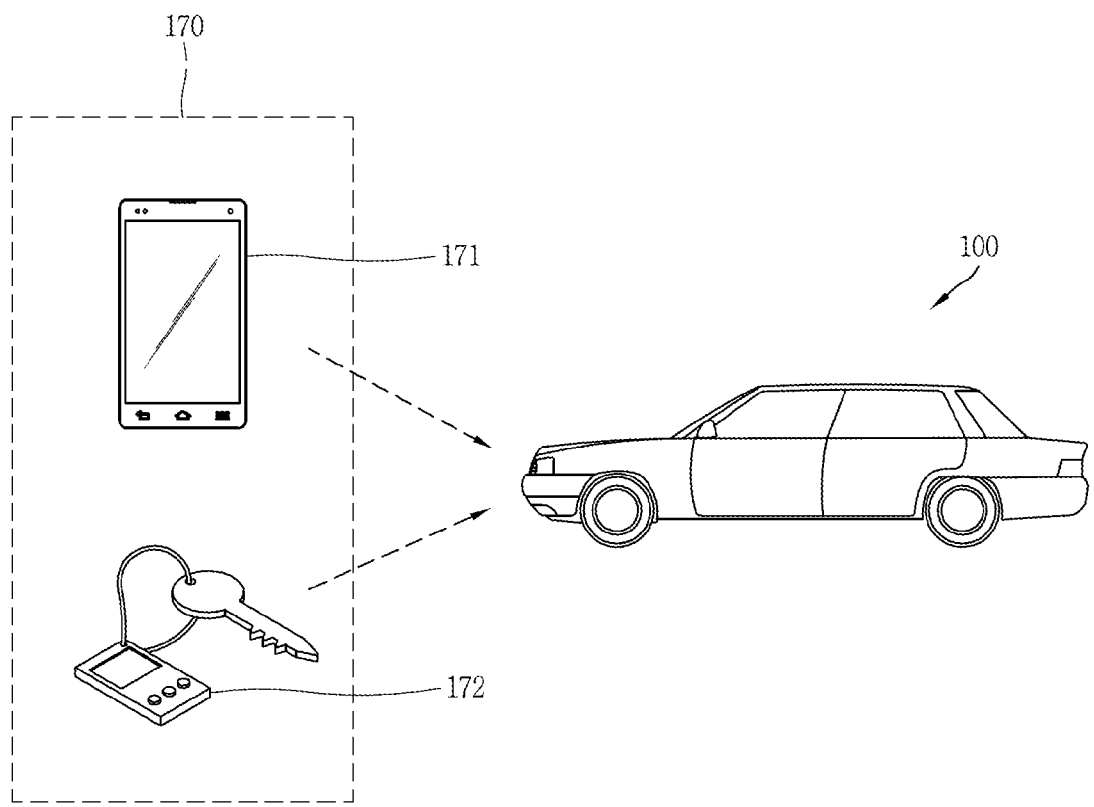
FIG. 1B is a schematic view illustrating example external devices connected to a vehicle control apparatus according to the present disclosure.

Referring to FIG. 1B, the external device 170 can be a mobile terminal, such a phone 171 or a smart key 172 that is carried by the user. In this example, the controller 110 recognizes a serial number of the external device 170. If the external device 170 is positioned within a given distance from the controller 110, the controller 110 automatically recognizes a specific user. Then, the controller 110 receives the authentication information that is input through the external device 170. The authentication information that is input from the external device 170 is transferred to the vehicle control apparatus 400 through a communication module provided in the external device 170 and through the short-range communication module 131 of the sensing unit 130.

The authentication information can be information on a user's fingerprints, recognition information on the user's irises, information on a predetermined password, or pattern information. In addition, the authentication information may be information on a user's specific gesture. To enable this type of authentication, the external device 170 may additionally have a configuration for the user inputting the authentication information, that is, a configuration for executing the same functions as those of at least one or more among the sensors provided in the sensing unit 130 of the vehicle control apparatus 100 according to one implementation or the same functions as those of additional sensors.

For example, the external device 170, such as the smart key 172 or the smart phone 171, may further include a sensing unit that corresponds to a touch screen into which a user can input pattern information, or the tap sensing unit 133 which is provided in the sensing unit 130 of the vehicle control apparatus 100. In addition, the external device 170 may further include a fingerprint recognition unit for recognizing the user's fingerprints. Of course, the external device 170 may further include one or more of an inertial sensor, a gyro sensor, an acceleration sensor, or the like.

In one implementation, a user may input authentication information on him/her using at least one piece of information among the information on the fingerprints, the predetermined pattern information, and the iris recognition information. In addition, the user may input the authentication information on him/her into the external device 170 by making a specific gesture while wearing the external device 170. In this case, according to the user's gesture, the controller 110 of the external device 170 can recognize the user's gesture using information on a change in a position of the external device 170, that is, an acceleration measurement value, an amount of change in gravity, or a value that is obtained by measuring an amount of change in inertia. Thus, the controller 110 makes use of such information as the authentication information. In addition, the external device 170 may recognize that the position is changed, using an image of the user that is input through the camera and the like, and may measure a value that is changed.

In some cases, if the authentication information is input in this manner, the controller 110 of the vehicle control apparatus 400 can control the operation of the vehicle using the authentication information that is input. For example, the controller 110 may recognize the current user according to the authentication information, and may cancel the locked state of the vehicle and set an internal environment of the vehicle that corresponds to the recognized user. In addition, if the locked state of the vehicle is canceled and the authentication information is input back in a state where the vehicle stops, the controller 110 may return the unlocked state of the vehicle to the locked state.

In some cases, the vehicle may be controlled immediately using the authentication information on the user, which is input through the external device 170, but the controller 110 may request the user to go through an authentication process one more time. In this case, if the external device 170 is positioned within a given distance from the controller 110 or the authentication information is input through the external device 170, the controller 110 switches the state of the vehicle to a wake up state and prepares for starting the vehicle according to the authentication information that is input from the authenticated user. If, in a state where the vehicle switches to the wake up state, the user inputs the authentication information one more time into a predetermined region (for example, the window in the driver seat or in the front passenger seat, the A- or B-, or C-pillar, or the like), the controller 110 authenticates the user according to the input and thus starts the vehicle.

While the example is described above in which an authentication procedure is performed once more, more authentication procedures may be performed without limitation. In addition, the example is described above in which if the authentication information on the user is input through the external device 170, the multiple authentication procedures are performed; however, the multiple authentication procedure may be applied also to a case where the user inputs the authentication information on him/her directly into touch screen region that is formed on one portion of the vehicle.

Hereinafter, a control method by the vehicle control apparatus will be explained in more detail with reference to the attached drawings.

Figure 2:
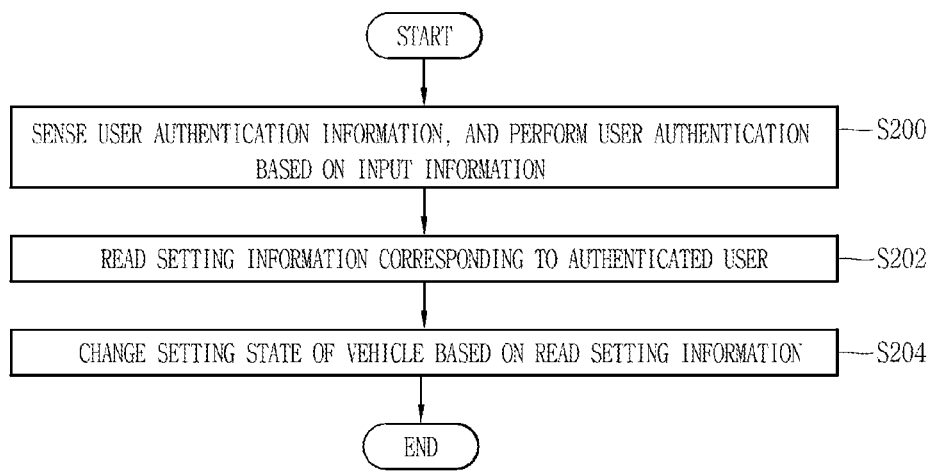
FIG. 2 is a flow chart illustrating example operational processes of a vehicle control apparatus according to the present disclosure.

FIG. 2 illustrates example operational processes of a vehicle control apparatus according to the present invention.

Referring to FIG. 2, a controller 110 of the vehicle control apparatus 100 according to the present disclosure may sense user authentication information, and may authenticate a user based on input authentication information (S200). In S200, the controller 110 may perform user authentication based on information on a pattern formed as a plurality of taps have been applied to a preset region outside a vehicle, based on a user's body authentication information (e.g., fingerprint) sensed on the preset region, or based on images input to a camera, a photo sensor, etc. provided outside the vehicle. In some cases, the controller 110 may perform user authentication based on information input from a preset external device 170.

For instance, in S200, if a first tap has been sensed on a preset region outside the vehicle, the controller 110 may recognize the tap as a user's input of authentication information. In this case, if the vehicle is in a locked state, the controller 110 may convert the locked state of the vehicle into a wake-up state, i.e., a state where user authentication information can be input from a preset region outside the vehicle. If the locked state of the vehicle is converted into the wake-up state, the controller 110 may activate a preset region outside or inside the vehicle, thereby forming a touch screen region or forming a region where a user's additional taps can be sensed. The controller 110 may control the formed region to be displayed on the touch screen, according to a user's selection or a preset state. While one or more preset regions may be located at predetermined positions outside and/or inside the vehicle, the taps may be applied at arbitrary locations within such preset regions, as further detailed below. For example, the taps need not be applied at specific pre-marked locations on the vehicle, such as pressable buttons.

The controller 110 may determine whether the user is an authenticated user, based on a plurality of taps including the first tap or based on taps separately applied from the first tap, and based on the formed region. In some cases, the controller 110 may determine whether user authentication has been performed or not, based on additional authentication information input subsequent to the first tap (e.g., preset pattern, fingerprint, the irises or a user's specific gesture, etc.). The controller 110 may control an input state of the authentication information, a matching result between the authentication information and preset information, or part of the authentication information, to be displayed on the touch screen.

The controller 110 may convert the current state of the vehicle into the wake-up state in a different manner. For instance, the controller 110 may convert the current state of the vehicle into the wake-up state, in a case where a preset external device 170 has approached within a preset distance, or in a case where authentication information on a preset user has been input through the preset external device 170. The user authentication information input through the external device 170 may be pattern recognition information, information on authentication of a user's body, a preset user's gesture information, etc.

In a case where a first tap has been applied to a preset region outside the vehicle, or in a case where authentication information input from the preset external device 170 has been received, the controller 110 may convert the current state of the vehicle into the wake-up state. And the controller 110 can perform user authentication by comparing subsequently-input information, with information pre-stored in the memory 140. If the user is an authorized user, the controller 110 may release a locked state of the vehicle. Such releasing the locked state of the vehicle may mean releasing a locked state of a door of the vehicle, or may further include an operation to automatically start the vehicle.

Authentication information, which is input from the external device for activation of the vehicle, may be equal to or different from authentication information input by the controller 110 of the vehicle control apparatus 100 so as to release a locked state of the vehicle. If the two pieces of authentication information are the same, the controller 110 may release a locked state of the vehicle based on the authentication information input from the external device 170.

If the user authentication has been completed in S200, the controller 110 can read, from the memory 140, setting information corresponding to the currently-authenticated user (S202), including any past control information from the currently-authenticated user. The setting information corresponding to the currently-authenticated user may include control information on a physical setting and a software setting of the vehicle. For example, the control information may include driver setting data of a hardware control apparatus (e.g., an angle of a seat, a back of a seat, steering wheel, or a side mirror, etc.) that is adjusted to the user's body, or may include data for controlling a software control apparatus (e.g., navigation, music play apparatus, etc.). Other types of past control information associated with the currently-authenticated user may be stored in the memory 140 to be retrieved by the controller 110 upon authentication.

If the control information corresponding to a result of the user authentication has been read from the memory 140 in S202, the controller 110 may control external and internal environments of the vehicle to be automatically controlled, based on the read control information (S204). For instance, the controller 110 may control a height of a seat or an angle of a back of a seat of the vehicle, to be controlled based on an authenticated user's height. In some cases, the controller 110 may automatically control a height of a handle, etc.

The controller 110 may change the current state of the vehicle, based on whether an authenticated user is male or female, or based on an authenticated user's age. More specifically, if an authenticated user is a male whose age is in the range of 20~30, the controller 110 may set an operation mode of a power steering apparatus into a mode suitable for high-speed driving (e.g., sports mode). If an authenticated user is an older user, the controller 110 may control a cooling or heating state into a state suitable for the older user. The controller 110 may further set a gear shifting method of the vehicle to an automatic transmission mode.

The controller 110 may control various types of states of the vehicle to a state optimized to an authenticated user. However, the controller 110 may control an environment state of the vehicle according to not only a preset state by a user, but also a preset optimized state.

For instance, in a case where a user has directly changed environments of a specific vehicle (e.g., an angle of a side mirror, a height of a handle, a height of a seat, a horizontal position of a seat, a cooling or heating temperature or humidity of the vehicle, an operation mode of a power steering system, an opening amount of a driver's side window or a passenger's side window, the controller 110 may store the information by a user's selection. If the stored information is different from current environment setting state of the vehicle as a comparison result by the controller 110, the controller 110 may restore the current environment setting state into the stored state. Thus, in a case where a user temporarily changes an environment setting state due to loading of a baggage or other reasons, an initial environment setting state set by the user may be automatically restored.

The authenticated user may be plural. In this case, the controller 110 may change an environment setting state of the vehicle which has been set in accordance with other user, on the basis of control information based on a currently-authenticated user. Therefore, in the vehicle control apparatus 100 according to the present disclosure, a driving environment suitable for a currently-authenticated user can be automatically provided even if a driver is changed.

As aforementioned, not only a physical environment setting, but also various software environment settings may be changed. For instance, the controller 110 may play a specific music, or may display a play list including a specific music file (e.g., MP3) on a preset display unit 151. The display unit 151 may be formed on an inner side surface of a windshield or a driver's side window or a passenger's side window. The display unit 151 may be pre-mounted in a predefined region. The controller 110 may control a radio channel preferred by a currently-authenticated user, to be automatically selected.

The controller 110 may control a navigation system so that a specific destination can be directly set, based on an input time of user authentication information, and based on a currently-authenticated user's driving record (mileage). In this case, the controller 110 may display not only a single destination, but also a list of a plurality of destinations, on the display unit 151, based on the driving record. A user may directly set a path to his or her desired destination, by selecting one from the list.

An example method of releasing a locked state of the vehicle of explained above with reference to FIG. 2. However, the present disclosure may be also applied to an opposite case. For instance, if starting of the vehicle is turned off by a user's selection, in a state where the vehicle has stopped for more than a predetermined time, the controller 110 may recognize authentication information re-input by the user, as a command for converting the current state of the vehicle into a locked state. The authentication information for converting the current state of the vehicle into a locked state may be input from a preset region inside the vehicle. The preset region may be part of a driver's side window or a passenger's side window, part of an upper end of a console box or a gear box, or one or more parts of a rear-view mirror. Alternatively, or additionally, the preset region may be a rim corresponding to a handgrip of a steering wheel, or part of a spoke for supporting the rim.

In a case where even starting of the vehicle has been turned off by a user's selection, if a first tap is sensed from a preset region inside the vehicle or if a preset gesture (e.g., a fingers-flicking gesture or a hands-clapping gesture) is sensed, the controller 110 may form the preset region for inputting user authentication information. The controller 110 may display video information for displaying the preset region by a user's selection.

As aforementioned, a user may input authentication information in various manners, in order to release a locked state of the vehicle, or in order to convert the current state of the vehicle into a locked state. For instance, the controller 110 may divide a preset region inside or outside the vehicle, into a plurality of regions. Then the controller 110 may receive order of at least part of the divided regions selected by a user, as user authentication information for converting the current state of the vehicle into a locked state or a lock-released state. Alternatively, or additionally, the controller 110 may receive a user's fingerprint input on the preset region, or a pattern according to an area where a user's touch and drag have been input, as the authentication information. Moreover, the controller 110 may receive a user's specific gesture sensed by a camera, a photo sensor, etc., as the authentication information.

So far, it was explained that in a case where a first tap has been sensed, the current state of the vehicle can be converted into a wake-up state based on the first tap, and user authentication information can be entered into a region formed inside or outside the vehicle.

Figure 3:
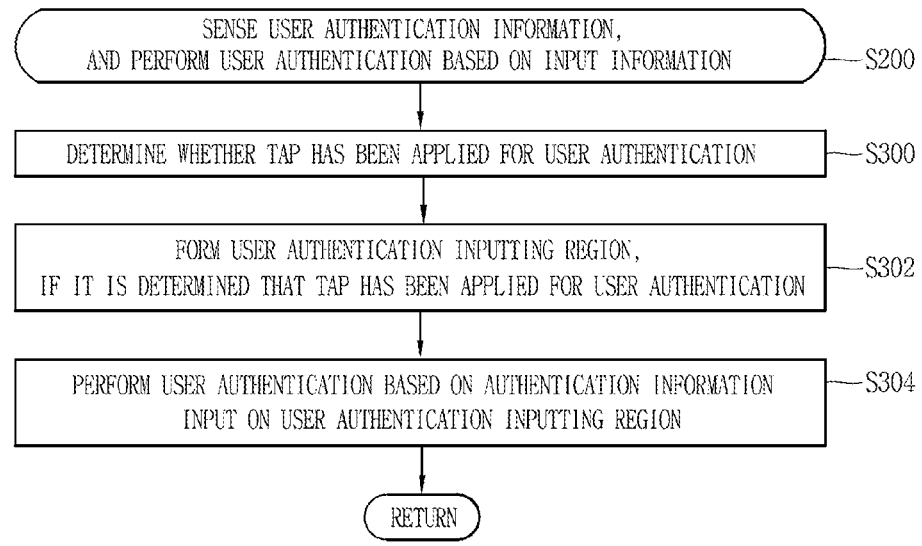
FIG. 3 is a flow chart illustrating an example process of authenticating a user, among the operational processes of FIG. 2.

FIG. 3 illustrates example processes of receiving authentication information from a user when a first tap has been sensed, and authenticating the user by a controller, in a vehicle control apparatus according to the present disclosure.

Referring to FIG. 3, when a tap has been sensed inside or outside the vehicle, the controller 110 of the vehicle control apparatus 100 according to the present disclosure determines whether the sensed tap is for user authentication (S300). For instance, the controller 110 may determine whether the sensed tap has been applied for the purpose of inputting user authentication information, based on whether the tap has been sensed from a preset region inside or outside the vehicle. Even if the tap has been sensed on a preset region inside or outside the vehicle, the controller 110 may determine, based on a sensed state of the tap, whether the tap has been applied by a user for the purpose of inputting authentication information, or the tap has been applied by an object or by a user's mistake. For instance, if the tap has been consecutively applied more than a preset frequency (the number of times) within a preset time, the controller 110 may recognize the tap as an effective tap for inputting authentication information. As another example, if the tap has been applied by part of a human body (e.g., finger, etc.) and has contacted a specific position for more than a predetermined time with a pressure more than a predetermined level, the controller 110 may recognize the tap as an effective tap.

If the tap has been determined as an effective tap as a determination result in S300, the controller 110 forms a region for inputting user authentication information (hereinafter referred to as authentication information input region), on at least part of a preset region formed inside or outside the vehicle (S302). The preset region inside or outside the vehicle may be an outer surface of a driver's side window, a passenger's side window, or a windshield (i.e., a surface exposed to outside of the vehicle), or an inner surface thereof (i.e., a surface which faces inside of the vehicle). The preset region may be a side mirror or a rear-view mirror of the vehicle, a surface of a gear box, a cover of a console box, a vehicle door, or a door knob inside or outside a door. Alternatively, or additionally, the preset region may be at least one of an A-pillar, a B-pillar, and a C-pillar.

The authentication information input region may not be formed in some cases depending on an input type of currently-set authentication information. For instance, if currently-set authentication information is a result of iris recognition using a camera, a photo sensor, etc. provided inside or outside the vehicle, or a result of a user's gesture detection, the authentication information input region may not be required. However, if currently-set authentication information is based on fingerprint recognition, password input, or pattern recognition, the authentication information input region may be formed on at least part of the preset region.

The controller 110 may form the authentication information input region by activating a preset region formed on a specific point inside or outside the vehicle, based on a determination result in S300. Alternatively, or additionally, the controller 110 may form the authentication information input region on at least part of the preset region, based on a specific point to which a first tap has been applied.

For instance, the controller 110 may form the authentication information input region based on a specific point to which a first tap has been applied. The authentication information input region may be variously formed according to a type of authentication information selected by a user. For instance, if authentication information selected by a user is a fingerprint, the authentication information input region may be a region for inputting a user's fingerprint. If authentication information selected by a user is a preset password, the authentication information input region may be a region for inputting various passwords.

If authentication information selected by a user is information on a specific motion pattern, the controller 110 may generate a type of authentication information input region where pattern information can be input from a user. For instance, the authentication information input region may be a region divided into a plurality of sections having specific numbers. The motion pattern may be formed by sequentially forming sections among the plurality of sections, the sections to which taps subsequent to a first tap have been applied. That is, the motion pattern may be order of selecting at least part of the divided sections by a user. Information, acquired by connecting specific information on the divided regions to each other in order selected by the user, may be information on a user's preset password.

In this case, the motion pattern may be variable even though the password remains the same. This is because, for example, in a case where the authentication information input region is divided into a plurality of sections, if a position, a shape or a division order of each section is changed, different motion patterns may be acquired despite the same password. The controller 110 may change a division type of the authentication information input region whenever authentication information is input, so that each input pattern can be different even for the same password. On the contrary, each password can be different even for the same motion pattern.

In a case where an authentication information input region is formed based on a position where a first tap has been sensed, the size of the authentication information input region may be changed based on the position where a first tap has been sensed. That is, the controller 110 may determine the size of the authentication information input region, based on a position where a first tap has been sensed.

For instance, the controller 110 may form an authentication information input region with a different size, in a case where a first tap has been sensed on a preset region inside or outside the vehicle (e.g., a central part of a driver's side window or a passenger's side window, a windshield, etc., or a central part of a console box, etc.) and in a case where a first tap has been sensed on right and left upper ends or a lower part of a window, a windshield, a console box, etc. For instance, if a first tap has been sensed on a central part of the preset region, an authentication information input region having a largest size may be formed. On the contrary, if a first tap has been sensed on a position farther from the central part, the size of an authentication information input region may become smaller.

In some cases, the controller 110 may display a graphic object, etc. for indicating a formed authentication information input region or a type of currently-selected authentication information, on a preset region, based on a user's selection. For instance, if an authentication information input region is formed on at least part of a preset region of the vehicle (e.g., a region where a touch screen has been formed), the controller 110 may display a guide line indicating the size and the shape of the authentication information input region.

The controller 110 may display information near the guide line, the information indicating a currently-set authentication type, i.e., indicating whether a currently-set authentication type is a fingerprint type, a password type or a preset motion pattern type. The controller 110 may change a currently-set authentication type by a user's selection. For instance, if a user's touch or tap input is sensed on a region where the authentication type information has been displayed, the controller 110 may control one or more different authentication types to be displayed, and may control one of the different authentication types to be selected by a user.

If an authentication information input region has been formed in S302, the controller 110 authenticates a user, based on the user authentication information input to the authentication information input region, and based on information on the user pre-stored in the memory 140 (S304). If it is determined that the user is an already-authenticated user as an authentication result in S304, the controller 110 goes back to S202 to read preset environment setting information on the user, from the memory 140. As a result, various types of setting states of the vehicle may be changed in S204.

The controller 110 may control information on a result of the user authentication and partial information on an authorized user, to be displayed on a preset region inside or outside the vehicle. For instance, if a user is not an authorized user as the authentication result, the controller 110 may display image information indicating the fact, on a preset region inside or outside the vehicle. On the contrary, if a user is an authorized user as the authentication result, the controller 110 may display at least part of information on the user (e.g., user's name) corresponding to the authentication result, on a preset region inside or outside the vehicle. The preset region inside or outside the vehicle, where the authentication result is to be displayed, may be a region where the display unit 151 (or touch screen) can be formed (e.g., a driver's side window or a passenger's side window, a sunroof, a side mirror, a windshield, etc.).

As aforementioned, the vehicle control apparatus 100 according to the present disclosure may receive user authentication information through the external device 170. For instance, a user may transmit authentication information such as a fingerprint, to the vehicle control apparatus 100 using his or her preset external device 170, without applying a plurality of taps or without directly inputting the authentication information to inside or outside of the vehicle. The external device 170 may be a smart phone 171, a smart key 172, etc. Alternatively, the external device 170 may be a wearable electronic device such as a smart watch or a wearable glass, among others.

Figure 4:
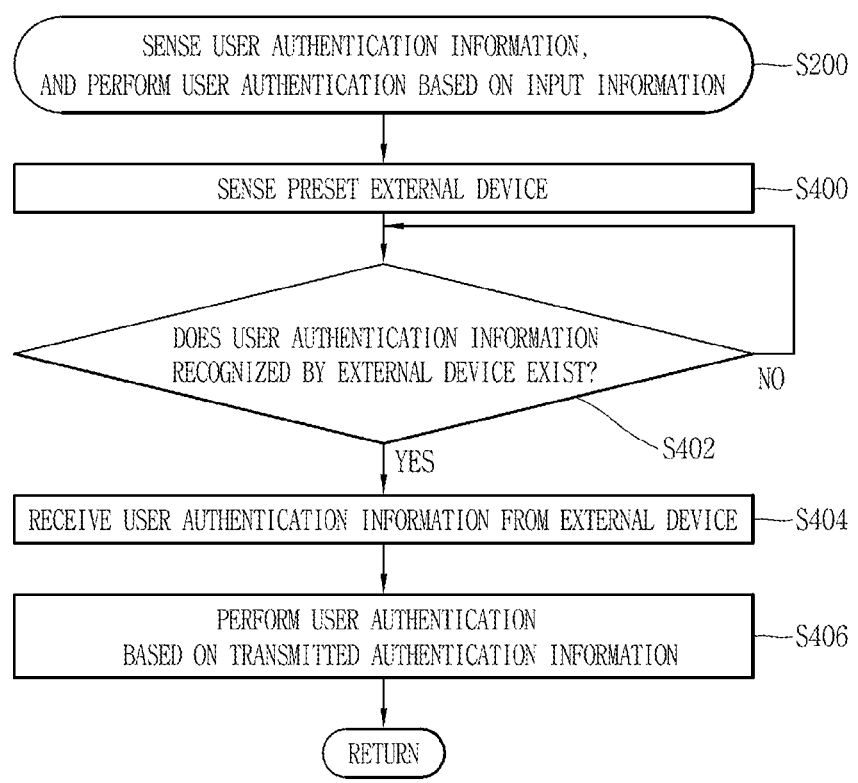
FIG. 4 is a flow chart illustrating another example process of authenticating a user, among the operational processes of FIG. 2.

FIG. 4 illustrates example processes of receiving user authentication information using an external device.

Referring to FIG. 4, the controller 110 may sense whether there exists an external device 170 preset to receive user authentication information (S400). For instance, in a case where the external device 170 approaches the controller 110 within a predetermined distance, the controller 110 may sense the approaching state based on specific information of the external device 170. In a case where a preset wireless signal is transmitted from the external device 170, the controller 110 may sense that the external device 170 is within a predetermined distance from the vehicle, by sensing the transmission.

Upon sensing the preset external device 170, the controller 110 may determine whether there exists user authentication information that is recognized by the external device 170 (S402). For instance, if the preset external device 170 has been sensed in S400, the controller 110 may check whether a user has selected input of authentication information through the sensed external device 170. For instance, upon selection of executing an application or an application program for inputting the authentication information to the external device 170, the controller 110 may determine that a user has selected input of authentication information (S402).

If it is determined that a user has selected input of authentication information, the external device 170 may receive authentication information from the user by various methods. For instance, like the controller 110 of the vehicle control apparatus 100, the external device 170 may form an authentication information input region on at least part of a display unit provided thereat, and may receive authentication information from the user through the authentication information input region. The external device 170 may display, on the display unit thereof, one or more graphic objects for displaying the authentication information input region.

The external device 170 may distinguish an impact from an external object or a user's touch input by mistake, from a tap for inputting user authentication information. For instance, the external device 170 may determine whether a user authentication information has been input or not, in a similar manner to the determination method by the sensing unit 130 of the vehicle control apparatus 100. The external device 170 may receive information on a currently-set authentication type from the controller 110, and may display the received information on the display unit thereof. Thus, the user may input his or her authentication information, to the authentication information input region, based on the currently-set authentication type.

The external device 170 may receive the authentication information in various manners. For instance, the external device 170 may recognize the user's irises using a camera, a photo sensor, etc. provided thereat, and may use the recognized irises as authentication information. Alternatively, or additionally, the external device 170 may sense a user's gesture using various types of sensors mounted therein, e.g., an inertia sensor, an acceleration sensor, a gyro sensor, a motion sensor, etc., and may use information on the sensed gesture as authentication information.

If there exists authentication information recognized from the external device 170 by a user in S402, the controller 110 may receive authentication information input by the user, from the external device 170 (S404). The controller 110 may authenticate the user who has input the authentication information, based on the authentication information transmitted from the external device 170, and based on information pre-stored in the memory 140 (S406). If the user is an authorized user as an authentication result in S406, the controller 110 may go back to S204 and S206 to read environment setting information set in correspondence to a currently-authorized user, and to change various types of setting states of the vehicle.

As aforementioned, the controller 110 may authenticate a user based on authentication information input through the external device 170, and may change a driving state and a setting state of the vehicle. However, a plurality of authentication procedures may be required. In this case, the controller 110 may authenticate a user based on authentication information transmitted through the external device 170 in S406. Then the controller 110 may convert the current state of the vehicle into a wake-up state, if a corresponding user is an authorized user. The controller 110 may activate one or more parts of a preset region formed outside or inside the vehicle (e.g., a driver's side window or a passenger's side window, a windshield region, etc.). In this case, the controller 110 may re-perform user authentication based on user authentication information input on the activated region, and may change a driving state and a setting state of the vehicle based on an authentication result.

In a case where the current state of the vehicle is converted into a wake-up state, the controller 110 may activate a camera or a photo sensor installed at a preset specific point inside or outside the vehicle, thereby recognizing the user's irises or gesture. The controller 110 may perform user authentication based on results of the iris recognition and gesture recognition, and may change a driving state and a setting state of the vehicle according to an authentication result.

Figure 5A:
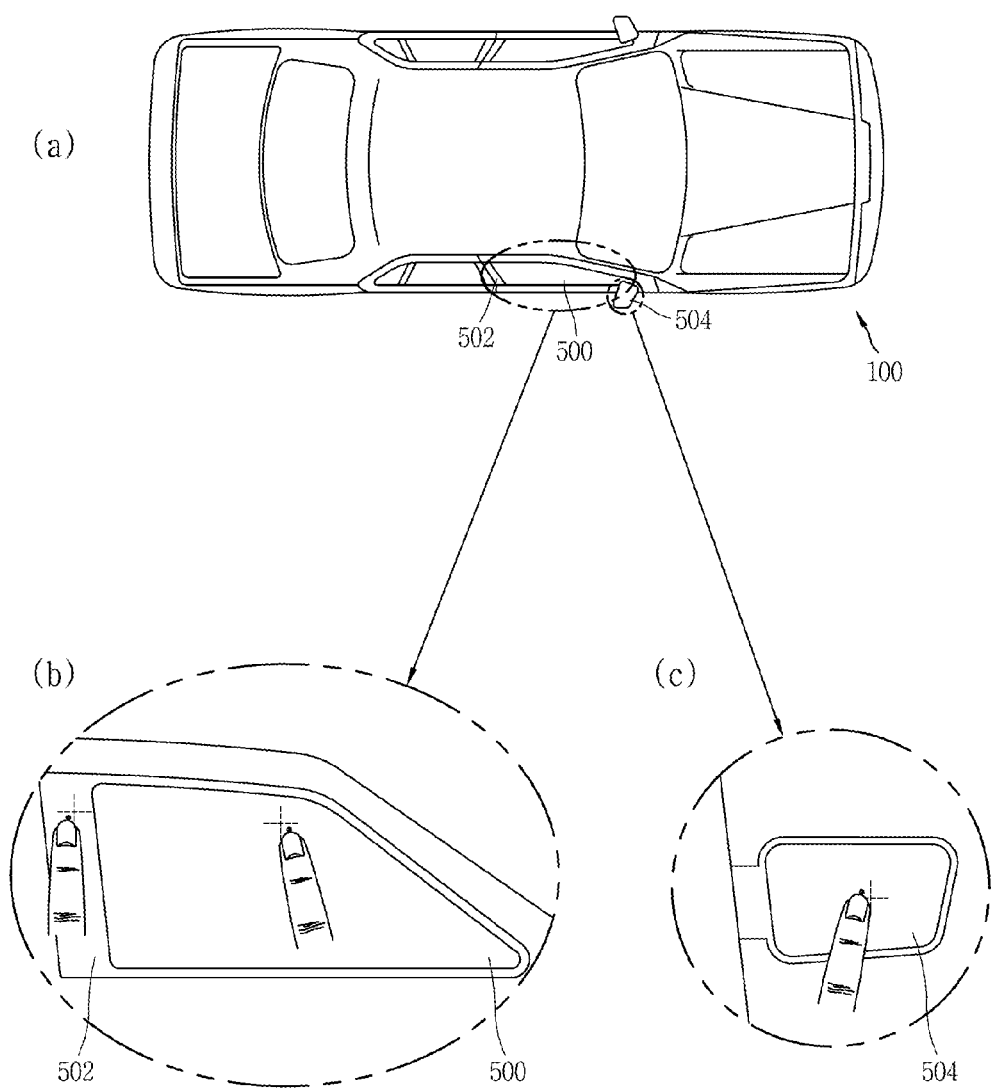

FIGS. 5A and 5B illustrate examples of receiving user authentication information, in the vehicle control apparatus according to the present disclosure.

FIG. 5A illustrates an example where a user inputs authentication information using a plurality of taps, in a vehicle provided with the vehicle control apparatus 100 according to the present disclosure.

As aforementioned, in the present disclosure, a touch screen or a tap sensing unit 133 may be formed on a preset region outside or inside the vehicle. The preset region may be a partial region or an entire region of a window on a side surface of a driver's seat, a window on a side surface of a passenger seat, windows of rear seats, or a windshield. Alternatively, or additionally, the preset region may be an outer surface of windows and a windshield (i.e., a surface exposed to outside of the vehicle), or an inner surface thereof (i.e., a surface which faces inside of the vehicle). The preset region may be a side mirror of the vehicle, or a sunroof of the vehicle.

The preset region may be an external frame or an internal frame of the vehicle. For instance, the preset region may be a surface of an external frame of the vehicle, e.g., between a windshield and a window or between a window and a window, such as an A-pillar, a B-pillar or a C-pillar. Alternatively, the preset region may be at least part of an external surface of a vehicle door (e.g., a knob of a vehicle door). Further, the preset region may be a surface of a gear box cover or a console box cover within the vehicle. The preset region may be formed on at least one or more different portions of the vehicle.

At least part of the preset region inside or outside the vehicle may be implemented as a touch screen configured as the display unit 151 for displaying video information and a touch sensor are integrally formed with each other. For instance, in a case where a driver's side window, a passenger's side window, a windshield, a window of a rear seat side, or a sunroof is formed of a transparent material, a transparent display may be implemented. Thus, a touch screen may be formed on at least part of each part of the vehicle, the part formed of a transparent material. An entire region or a partial region of the vehicle may be activated under control of the controller 110. A region where a touch screen is to be formed may be configured to receive a user's input, and to display various image information.

The tap sensing unit 133 for sensing a tap applied from a user, which can include a touch sensor, etc., may be provided at a non-transparent region (opaque region), i.e., an external frame of the vehicle such as an A-pillar, a B-pillar and a C-pillar. The tap sensing unit 133 may be provided on at least part of an external surface of a vehicle door (e.g., one portion in the vicinity of a door knob of a vehicle door), or a surface of a gear box cover or a cover of a console box within the vehicle. Thus, a user may input his or her fingerprint, a password using a plurality of taps, or pattern recognition information, etc. as authentication information, even in a non-transparent (opaque) region. The controller 110 may receive the authentication information, based on a sensing result by the tap sensing unit 133.

As shown in the example of FIG. 5A(a), a preset region for receiving user authentication information may be formed at a driver's side window or a passenger's side window 500, a B-pillar 502, or a side mirror 504. In this case, as shown in FIG. 5A(b), a user may input his or her authentication information to the authentication information input region formed at the window 500, the B-pillar 502, or the side mirror 504. The controller 110 may receive user authentication information not only through a surface of an external frame of the vehicle such as the window 500 and the B-pillar 502 each formed of a transparent material (refer to FIG. 5A(b)), but also through at least part of the side mirror 504 (refer to FIG. 5A(c)).

FIG. 5B illustrates an example of entering authentication information through an external device, for example, a smart phone.

For instance, a user may use his or her smart phone as an external device 170 for transmitting his or her authentication information, by linking the smart phone with the vehicle control apparatus 100 according to an implementation of the present disclosure. In this case, the controller 110 may transmit information on a currently-set authentication type to the smart phone 171, if the smart phone 171 approaches within a preset distance, or if a request transmitted from the smart phone 171 is received.

In this case, the smart phone 171 may display various types of authentication information input regions on a display unit 550 thereof, based on the authentication type received from the controller 110. FIGS. 5B(a), (b) and (c) illustrate two types of user authentication using fingerprint information and pattern recognition information, respectively.

For instance, if a currently-set authentication type is based on fingerprint information, the controller 110 may transmit such information to the smart phone 171. Next, as shown in FIG. 5B(a), the smart phone 171 having received such information may generate an authentication information input region 552 for inputting a user's fingerprint, and may display the authentication information input region 552 on the display unit 550. As shown in FIG. 5B(a), upon input of a user's fingerprint, information on the input fingerprint is transmitted to the vehicle control apparatus 100. Then the controller 110 may authenticate a corresponding user based on the received authentication information, i.e., fingerprint information.

In some cases, if a currently-set authentication type is based on pattern recognition information, as shown in FIG. 5B(b), the controller 110 may generate user authentication information based on a user's input applied to a region divided into a plurality of sections or a region where a plurality of points have been displayed. Then the controller 110 may transmit the generated authentication information to the controller 110. For instance, as shown in FIG. 5B(b), in case of using a region 560 divided into a plurality of sections, order of at least part of the plurality of sections 560 selected by a user, or information on a selection pattern of at least part of the plurality of sections 560, may be authentication information. Alternatively, in case of using a plurality of points 570 as shown in FIG. 5B(c), information on a pattern that at least part of the plurality of points are connected to each other by a user's touch input, may be authentication information.

As aforementioned, authentication information input through the external device 170 may be a user's iris recognition information or a user's gesture information, rather than the information shown in FIG. 5B. In this case, the smart phone 171 may recognize the user's iris recognition information or the user's gesture information, using a camera or various types of sensors mounted therein. Then a result on the recognition may be displayed on the display unit 550 of the smart phone 171, and may be transmitted to the vehicle control apparatus 100. The controller 110 may authenticate a user based on the transmitted iris recognition information or gesture recognition information.

As aforementioned, in the present disclosure, a user may be authenticated based on fingerprint information or information on a preset pattern. Such fingerprint information or pattern information may be input to a preset authentication information input region.

Figure 6:
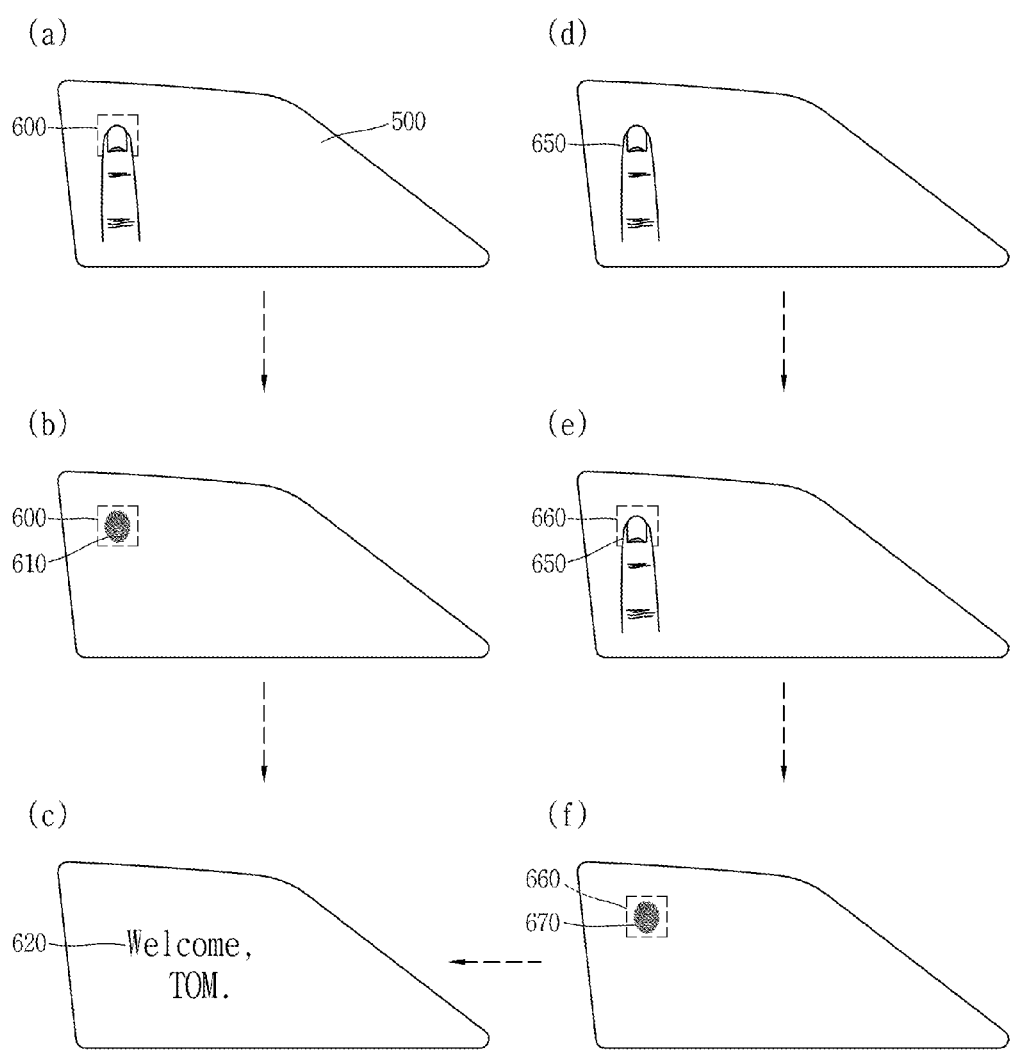
FIG. 6 is a reference view illustrating an example process for receiving a user's fingerprint information, in a vehicle control apparatus according to the present disclosure.

FIG. 6 illustrates an example of receiving a user's fingerprint information as authentication information, in the vehicle control apparatus according to the present disclosure.

For instance, in the vehicle control apparatus 100 according to the present disclosure, a user may input fingerprint information to a preset region formed outside or inside the vehicle. The preset region may be a region formed at a window, etc. as aforementioned. FIG. 6 illustrates an example where information on a user's fingerprint is input to the driver's side window or the passenger's side window 500.

As shown in FIG. 6(a), if a user's finger contacts a preset region 600 formed outside or inside the vehicle for more than a predetermined time, fingerprint information 610 on the user may be input to the preset region 600. In this example, the controller 110 can determine, from user information pre-stored in the memory 140, whether there exists a user having the fingerprint information 610. If there exists a user matching the fingerprint information 610, the controller 110 may determine that the user has been authenticated.

In this case, the controller 110 may display an authentication result, and image information including user information (e.g. user name) based on the authentication result, on a preset region (e.g., a touch screen region provided on a window). Thus, the user may recognize that the currently-authenticated user is himself or herself.

In some cases, if a user's touch input is sensed on a preset region formed inside or outside the vehicle, the controller 110 may display a region for receiving authentication information. For instance, as shown in FIG. 6(d), upon sensing of a user's touch input 650, the controller 110 may form an authentication information input region 660. Then the controller 110 may display the authentication information input region 660 as shown in FIG. 6(e).

The authentication information input region 660 may be formed based on a point where the touch input 650 has been sensed. In this case, as shown in FIG. 6(e), the authentication information input region 660 may be generated based on a point where the touch input 650 has been sensed. Thus a user can input fingerprint information by merely maintaining the user's touch input 650 without applying a touch input to another position.

FIG. 6(f) illustrates a case where an authentication information input region 660 and fingerprint information 670 have been input to a position where a user had firstly applied the user's touch input 650. In this case, the controller 110 may perform user authentication based on the input fingerprint information 670, and may display an authenticated result as shown in FIG. 6(c).

The authentication information input region may be formed at a preset region. If the user's touch input 650 is firstly detected as shown in FIG. 6(d), the controller 110 may form the authentication information input region at a preset specific point, and may display a graphic object (e.g., guideline) indicating the authentication information input region. In this case, a user may input fingerprint information by applying a touch input to the authentication information input region formed at the preset specific point. Various types of image information including such graphic object may be automatically turned off as time lapses.

Figure 7B:
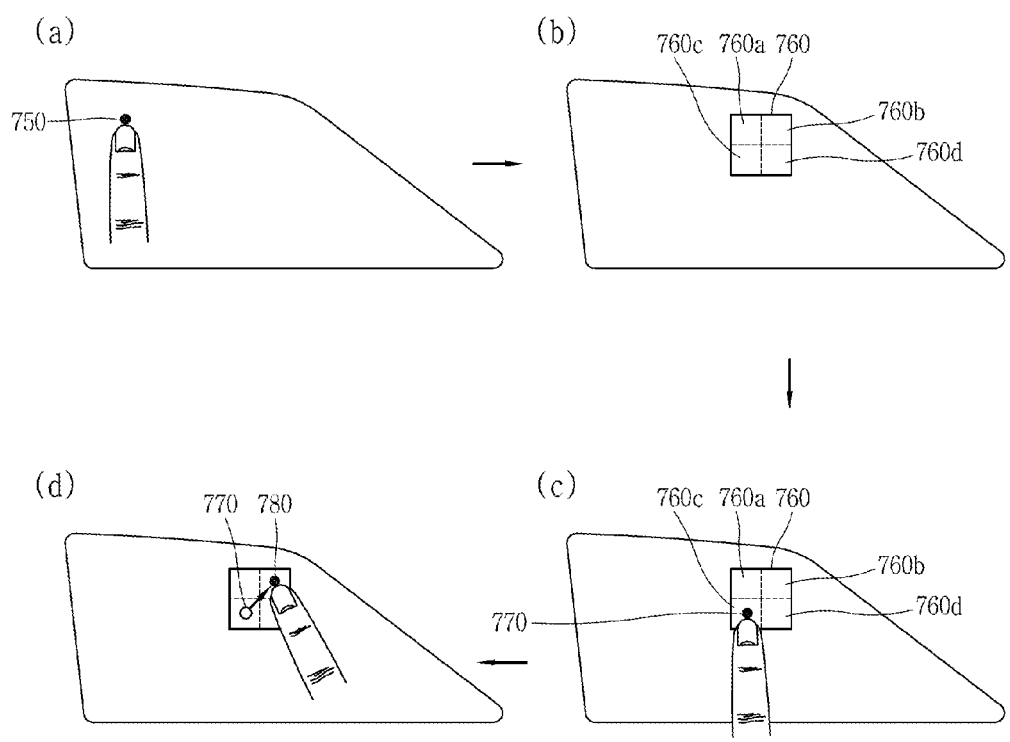

FIGS. 7A and 7B are illustrate examples of performing user authentication based on user pattern information consisting of a plurality of taps.

If the plurality of taps are applied to a preset region formed outside or inside the vehicle, the controller 110 of the vehicle control apparatus 100 according to the present disclosure can recognize a pattern formed by the plurality of taps. For instance, the controller 110 may divide a region to which a plurality of taps have been applied, into a predetermined number of sections. Then the controller 110 may recognize order of the sections selected by a user among the plurality of sections, as pattern information. Alternatively, or additionally, the controller 110 may recognize an area as pattern information. In such a case, the area may be formed by connecting sections selected by a plurality of taps among the plurality of sections, to each other, in order of selecting the sections. The controller 110 may perform user authentication by using such pattern information as authentication information.

The controller 110 may form the authentication information input region to which a plurality of taps are applied, at an arbitrary position within a preset region formed outside or inside the vehicle. For instance, as shown in FIG. 7A(a), if a first tap 700 has been sensed on a driver's side window or a passenger's side window 500, the controller 110 may form an authentication information input region 710 based on a position where the first tap 700 has been sensed. As shown in FIG. 7A(b), the authentication information input region 710 may be a region divided into a plurality of sections.

As shown in FIG. 7A(c), a user may further apply another tap 720 to the authentication information input region 710. In this case, the controller 110 may recognize order of selecting sections by the first tap 700 and said another tap 720, or an area formed by connecting the selected sections among the plurality of sections of the authentication information input region 710, as a pattern formed by the plurality of taps. The recognized pattern may be used to perform user authentication.

The controller 110 may form the authentication information input region 710 based on the first tap, in various manners. For instance, the controller 110 may form the authentication information input region 710 based on a position where the first tap 700 has been applied. Alternatively, as shown in FIG. 7A(a), the controller 110 may form one of a plurality of sections of the authentication information input region 710, in correspondence to a position where the first tap 700 has been applied. Then the controller 110 may form the remaining sections of the authentication information input region 710 based on said one section.

The one section corresponding to the first tap 700 may be a region having a first order, the region which has been set to pattern information on a preset specific user. In this case, the controller 110 may recognize order of sections selected by the first tap 700 and said another tap 720, or an area formed by connecting the selected sections to each other, as a pattern formed by the plurality of taps. Then the controller 110 may use such order or area for user authentication. In case of forming the authentication information input region based on a position where the first tap 700 has been applied, the authentication information input region may be generated at any arbitrary position according to a user's selection. Thus, the position of the authentication information input region may be changed whenever authentication information is input.

As shown in FIG. 7A(a), the controller 110 may not display a size, a position, or a divided state of the authentication information input region 710. If said another tap 720 has been sensed on a region spaced from the first tap-applied region by more than a predetermined distance, the controller 110 may recognize the respective taps as taps corresponding to different sections among the plurality of sections of the authentication information input region 700. On the other hand, if another tap is applied within a preset distance based on the first tap-applied region after a preset time has lapsed, the controller may recognize said another tap as a tap for re-selecting the same section.

The first tap may be performed to activate a preset authentication information input region, for application of a plurality of taps. FIG. 7B illustrates such case.

Referring to FIG. 7B(a), in a case where a first tap 750 is applied to a preset region formed outside or inside the vehicle (i.e., driver's side window or passenger's side window 500), the controller 110 may recognize the tap as a tap for activating a preset authentication information input region 760. In this case, as shown in FIG. 7B(b), the controller 110 may activate the authentication information input region 760, and may sense taps applied to a plurality of divided sections 760*a*, 760*b*, 760*c*, 760*d* inside the authentication information input region 760. As shown in FIG. 7B(c) and (d), if a user applies a first tap 770 to the first section 760*c* and then applies a second tap 780 to the second section 760*b*, the controller 110 may recognize order that the first tap 770 and the second tap 780 have been selected, or an area formed by connecting the taps 770 and 780 to each other, as a pattern formed by the plurality of taps. The activated authentication information input region may be automatically deactivated as a predetermined time lapses.

FIG. 7B illustrates a case where the authentication information input region 760 is displayed when activated. However, the controller 110 may control the authentication information input region 760 not to be displayed.

In cases where each divided section of the authentication information input region is selected by a user's tap, specific information on the selected section may be provided to a user in the form of image information, audio information, etc. As such, the user may check whether he or she has correctly applied a tap, in a visual manner or in an audible manner.

In case of applying a plurality of taps to a preset authentication information input region, the controller 110 may control preset tactile information to be output using the haptic module 153, etc. As a result, the user may recognize that the taps have been applied to a correct position.

FIGS. 7C to 7G illustrate further examples of forming an authentication information input region upon detection of a user's tap. Hereinafter, it will be explained that a user's tap is applied to a driver's side window or a passenger's side window. However, the present disclosure is not limited to this. That is, a user's tap may be also applied to other region or regions formed inside or outside the vehicle.

Figure 7C:
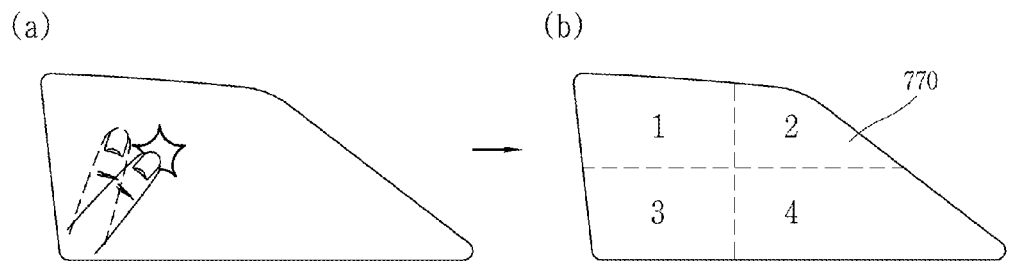

As shown in FIG. 7C, upon detection of a tap applied to a window 500, the controller 110 may display a guide screen 770 on the window 500. For instance, if a preset password is "3142", an authentication information input region may be divided into 4 sections, and a guide screen 770 indicating the four sections may be displayed. A user may release a locked state of the vehicle by sequentially applying taps to the third section, the first section, the fourth section and the second section (3→1→4→2).

Figure 7D:
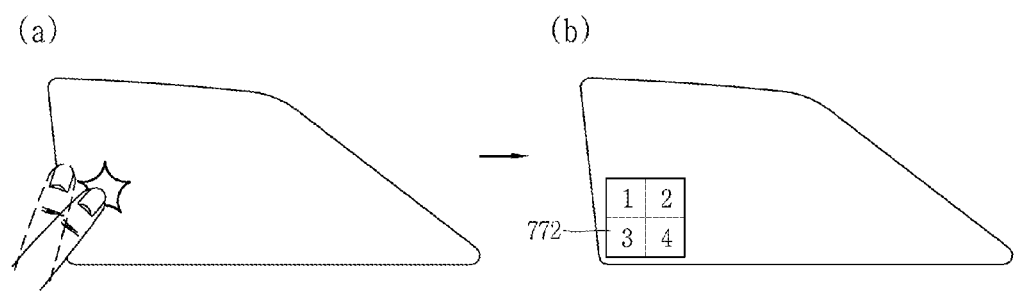

As shown in FIG. 7D, in a case where one or more taps are applied to an edge part of the window 500, the controller 110 may display a guide screen 772 on at least part including the point where said one or more taps have been applied. The controller 110 may divide part of the window 500 into a plurality of sections, and may display information on the divided sections as the guide screen 772. The reason is in order to receive a motion pattern on an area smaller than a reference size.

The size of the guide screen 772 may become different according to intensity of said one or more taps. For instance, if a tap of a first strength is applied, a guide screen of a first size corresponding to the first strength may be displayed. On the other hand, a tap of a second strength is applied, a guide screen of a second size corresponding to the second strength may be displayed.

Figure 7E:
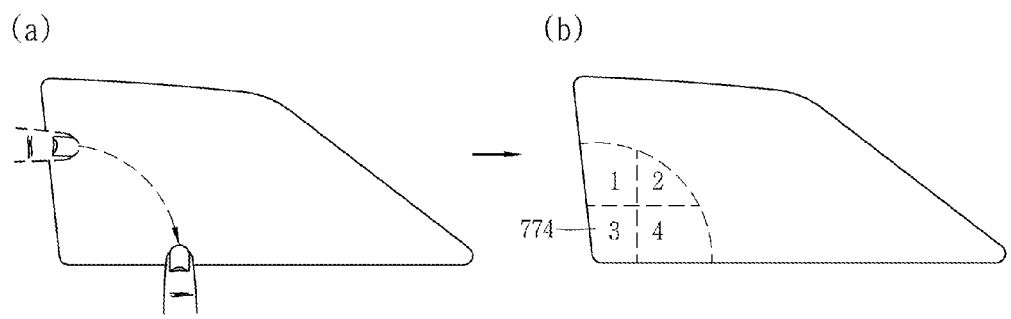

As shown in FIG. 7E, a continuous touch from a first point on the window 500 to a second point different from the first point may be applied. In this case, the controller 110 may divide an entire region of the window 500 into a first region and a second region based on a touch area applied to the window 500, and may display a guide screen 774 on one of the first and second regions. The controller 110 selects a region where the guide screen 774 is to be displayed, based on an edge part of the window 500, the touch area, and a first touch point and the touch release point on the touch area. That is, the size and the position of the guide screen 774 may be varied according to the touch area.

Further, if a first touch and a second touch crossing each other on the window 500 are sensed within a predetermined time, the controller 110 may divide an entire region 776 of the window 500 into a plurality of sections, based on the first and second touches. And the controller 110 may analyze a motion pattern formed by a plurality of taps, based on a tap applied to one of the plurality of sections.

The size and the position of the sections divided from each other by the first and second touches may become different according to the first and second touches. For instance, as shown in FIG. 7F, if the first and second touches cross each other at a central part of the window 500, the controller 110 may divide the entire region of the window 500 into 4 sections. As another example, if the first and second touches cross each other at an edge part of the window 500 as shown in FIG. 7G, the controller 110 may divide a part 778 of the window 500 into 4 sections, based on a crossing point between the first and second touches.

The controller 110 may display one or more touch area real time, on the window 500, in response to at least one of the first and second touches. Alternatively, upon input of the first and second touches, the controller 110 may activate the authentication information input region, and may display information on the divided sections. Still alternatively, as shown in FIG. 7E, the controller 110 may maintain the authentication information input region in a deactivated state, and may not display information on the divided sections.

In the example processes described above, user authentication was described as being performed based on position information associated with the plurality of taps that were applied to the input region. That is, spatial information of the plurality of taps was used to determine whether to authenticate the user. Alternatively, or additionally, temporal information of the plurality of taps may be used for user authentication. In other words, a rhythmic pattern of the plurality of taps (e.g., predetermined number of taps separated by variable time intervals) may be used to perform user authentication. For example, once an authentication information input region has been activated, the controller 110 may sense the rhythmic pattern of the plurality of taps and recognize it as the authentication information if received within a predetermined time after activation. Both spatial and temporal information associated with the plurality of taps may be sensed using a touch sensor. Temporal information associated with the plurality of taps may be sensed using just an acceleration sensor.

In the vehicle control apparatus according to an implementation of the present disclosure, a user may register a preset pattern as user authentication information. For instance, if a user inputs a motion pattern consisting of a plurality of taps to a preset region formed inside or outside the vehicle (e.g., an external surface or an internal surface of the driver's side window or the passenger's side window 500), the controller 110 may register the motion pattern as user authentication information.

In some cases, an apparatus for setting and sensing such taps may be implemented by a mobile terminal. In this case, the mobile terminal may be interworked with a vehicle to thus control the vehicle. Hereinafter, a vehicle control method by a mobile terminal will be explained in more detail.

Figure 8:
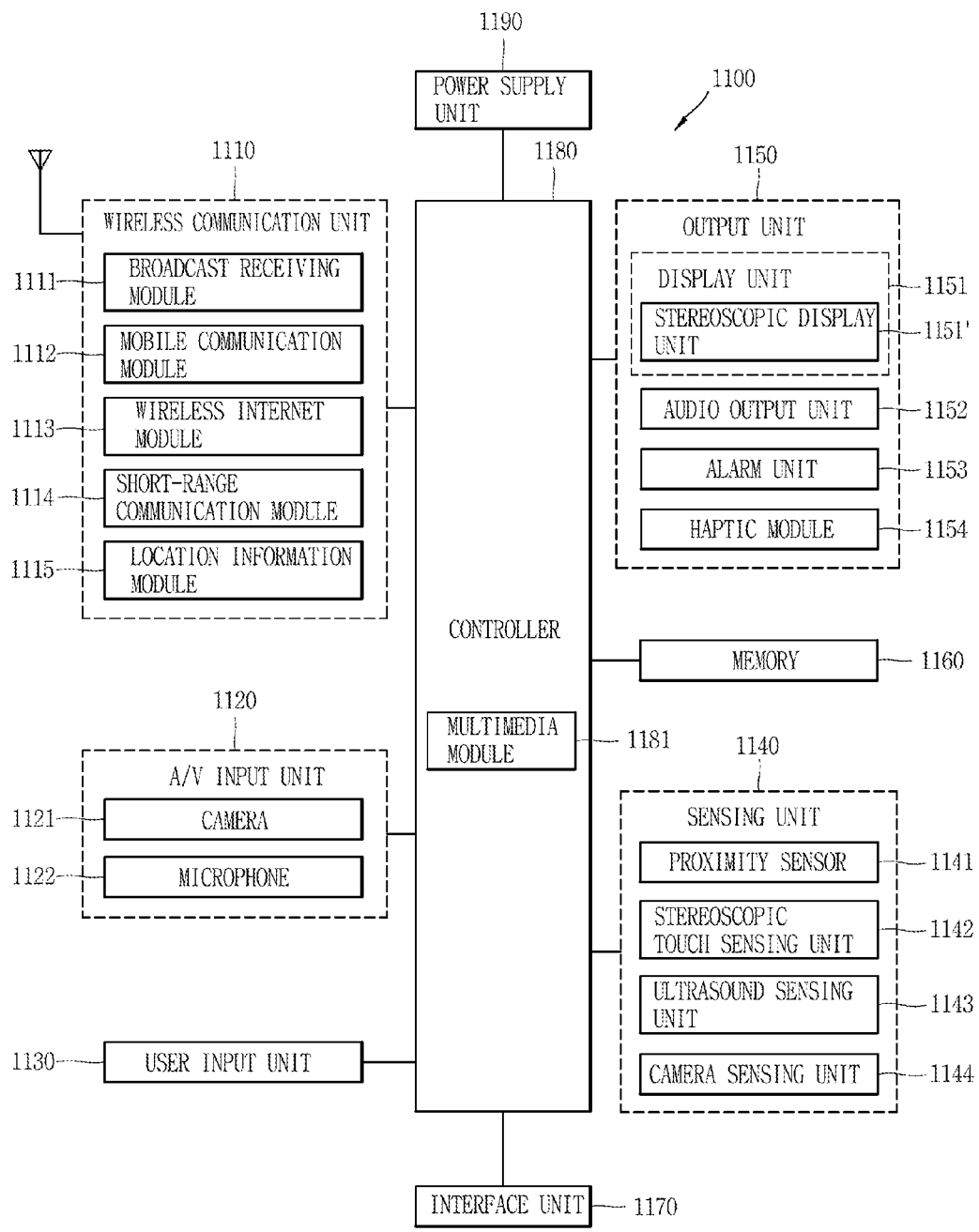
FIG. 8 is a block diagram illustrating an example mobile terminal according to an implementation of the present disclosure.

FIG. 8 is a block diagram of a mobile terminal 1100 in accordance with one exemplary implementation. For example, the external device 170 (FIG. 1B) may include the mobile terminal 1100.

The mobile terminal 1100 may comprise components, such as a wireless communication unit 1110, an Audio/Video (NV) input unit 1120, a user input unit 1130, a sensing unit 1140, an output unit 1150, a memory 1160, an interface unit 1170, a controller 1180, a power supply 1190, and the like. FIG. 8 shows the mobile terminal 1100 having various components, but it is understood that implementing all of the illustrated components is not a requirement. Greater or fewer components may alternatively be implemented.

The wireless communication unit 1110 can include one or more components to authorize radio communication between the mobile terminal 1100 and a radio communication unit system or a network in which the mobile terminal 1100 is located. For example, the radio communication unit 1110 may include a broadcast receiving module 1111, a mobile communication module 1112, a wireless Internet module 1113, a short range communication module 1114, a location information module 1115, etc.

The broadcast receiving module 1111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and. In this case, the broadcast associated information may be received by the mobile communication module 1112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 1111 may be configured to receive signals broadcast by using various types of broadcast systems. In particular, the broadcast receiving module 1111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 1111 may be configured to be suitable for every broadcast system that provides a broadcast signal as well as the above-mentioned digital broadcast systems.

Broadcast signals and/or broadcast-associated information received via the broadcast receiving module 1111 may be stored in the memory 1160.

The mobile communication module 1112 can transmit and/or receive radio signals to and/or from at least one of a base station, an external terminal and a server. Such radio signals may include a voice call signal, a video call signal or various types of data according to text and/or multimedia message transmission and/or reception.

The mobile communication module 1112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 1112 is configured to transmit and receive at least one of voice data and image data.

The wireless Internet module 1113 supports wireless Internet access for the mobile communication terminal. This module may be internally or externally coupled to the mobile terminal 1100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 1114 is a module for supporting short range communications. Some examples of short range communication technology include Bluetooth™, Radio Frequency IDentification (RFID), Infrared Data Association (IrDA), Ultra-WideBand (UWB), Zig-Bee™, and the like.

The location information module 1115 is a module for acquiring a location (or position) of the mobile communication terminal. For example, the location information module 1115 may include a GPS (Global Positioning System) module.

Referring still to FIG. 8, the A/V input unit 1120 is configured to receive an audio or video signal. The A/V input unit 1120 may include a camera 1121 and a microphone 1122. The camera 1121 processes image data of still pictures or video acquired by an image capture device in a video capturing mode or an image capturing mode. The processed image frames may be displayed on a display unit 1151.

The image frames processed by the camera 1121 may be stored in the memory 1160 or transmitted via the radio communication unit 1110. Two or more cameras 1121 may be provided according to the configuration of the mobile communication terminal.

The microphone 1122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 1112 in case of the phone call mode. The microphone 1122 may implement various types of noise canceling (or suppression) algorithms to cancel (or suppress) noise or interference generated in the course of receiving and transmitting audio signals.

The user input unit 1130 may generate key input data from commands entered by a user to control various operations of the mobile communication terminal. The user input unit 1130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 1140 can detect a current status (or state) of the mobile terminal 1100 such as an opened or closed state of the mobile terminal 1100, a location of the mobile terminal 1100, the presence or absence of a user's touch (contact) with the mobile terminal 1100 (e.g., touch inputs), the orientation of the mobile terminal 1100, an acceleration or deceleration motion and direction of the mobile terminal 1100, etc., and generates commands or signals for controlling the operation of the mobile terminal 1100. For example, when the mobile terminal 1100 is implemented as a slide type mobile phone, the sensing unit 1140 may sense whether the slide phone is opened or closed. In addition, the sensing unit 1140 can detect whether or not the power supply unit 1190 supplies power or whether or not the interface unit 1170 is coupled with an external device.

The output unit 1150 is configured to provide outputs in a visual, audible, and/or tactile manner (e.g., audio signal, video signal, alarm signal, vibration signal, etc.). The output unit 1150 may include the display unit 1151, an audio output unit 1152, an alarm unit 1153, a haptic module 1154, and the like.

The display unit 1151 may display information processed in the mobile terminal 1100. For example, when the mobile terminal 1100 is in a phone call mode, the display unit 1151 may display a User Interface (UI) or a Graphic User Interface (GUI) associated with a call. When the mobile terminal 1100 is in a video call mode or image capturing mode, the display unit 1151 may display a captured image and/or received image, a UI or GUI.

The display unit 1151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 1100 may include two or more displays 1151. The rear surface portion of the display unit 1151 may also be implemented to be optically transparent. Under this configuration, a user can view an object positioned at a rear side of a body through a region occupied by the display unit 1151 of the terminal body.

The display unit 1151 may be implemented in two or more in number according to a configured aspect of the mobile terminal 1100. For instance, a plurality of displays may be arranged on one surface integrally or separately, or may be arranged on different surfaces.

Here, if the display unit 1151 and a touch sensitive sensor (referred to as a touch sensor) have a layered structure therebetween, the structure may be referred to as a touch screen. The display unit 1151 may be used as an input device rather than an output device. The touch sensor may be implemented as a touch film, a touch sheet, a touch pad, and the like.

The touch sensor may be configured to convert changes of a pressure applied to a specific part of the display unit 1151, or a capacitance occurring from a specific part of the display unit 1151, into electric input signals. Also, the touch sensor may be configured to sense not only a touched position and a touched area, but also a touch pressure.

When touch inputs are sensed by the touch sensors, corresponding signals can be transmitted to a touch controller. The touch controller processes the received signals, and then transmits corresponding data to the controller 1180. Accordingly, the controller 1180 may sense which region of the display unit 1151 has been touched.

Referring still to FIG. 8, a proximity sensor may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a "proximity touch," while recognition of actual contacting of the pointer on the touch screen will be called a "contact touch". In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output unit 1152 may output audio data received from the radio communication unit 1110 or stored in the memory 1160 in a call signal reception mode, a call mode, a record mode, a voice recognition mode, a broadcast reception mode, and the like. Also, the audio output unit 1152 may provide audible outputs related to a particular function (e.g., a call signal reception sound, a message reception sound, etc.) performed in the mobile terminal 1100. The audio output unit 1152 may include a receiver, a speaker, a buzzer, etc.

The alarm unit 1153 may output a signal for informing about an occurrence of an event of the mobile terminal 1100. Events generated in the mobile terminal may include call signal reception, message reception, key signal inputs, and the like. In addition to video or audio signals, the alarm unit 1153 may output signals in a different manner, for example, to inform about an occurrence of an event. For example, the alarm unit 1153 may output a signal in the form of vibration. The video signal or audio signal may be output through the display unit 1151 or the audio output unit 1152. Therefore, the display unit 1151 and the audio output unit 152 may be categorized as part of the alarm unit 1153.

The haptic module 1154 can generate various tactile effects the user may feel. A typical example of the tactile effects generated by the haptic module 1154 is vibration. The strength and pattern of the haptic module 1154 can be controlled. For example, different vibrations may be combined to be output or sequentially output.

Besides vibration, the haptic module 1154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 1154 may be implemented to allow the user to feel a tactile effect through a muscle sensation such as fingers or arm of the user, as well as transferring the tactile effect through a direct contact. Two or more haptic modules 1154 may be provided according to the configuration of the mobile terminal 1100.

The memory 1160 may store software programs used for the processing and controlling operations performed by the controller 1180, or may temporarily store data (e.g., a map data, phonebook, messages, still images, video, etc.) that are input or output. The memory 1160 may store data relating to various patterns of vibrations and sounds output when touch input to the touch screen is sensed.

The memory 1160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk, among others. Also, the mobile terminal 1100 may be operated in relation to a web storage device that performs the storage function of the memory 1160 over the Internet.

The interface unit 1170 serves as an interface with every external device connected with the mobile terminal 1100. For example, the external devices may transmit data to an external device, receives and transmits power to each element of the mobile terminal 1100, or transmits internal data of the mobile terminal 1100 to an external device. For example, the interface unit 1170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 1100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 1100 via a port.

When the mobile terminal 1100 is connected with an external cradle, the interface unit 1170 may serve as a passage to allow power from the cradle to be supplied therethrough to the mobile terminal 1100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 1180 typically controls the general operations of the mobile terminal. For example, the controller 1180 performs controlling and processing associated with voice calls, data communications, video calls, and the like. The controller 1180 may include a multimedia module 1181 for reproducing multimedia data. The multimedia module 1181 may be configured within the controller 1180 or may be configured to be separated from the controller 1180.

The controller 1180 may perform a pattern recognition processing to recognize a handwriting input or a picture drawing input performed on the touch screen as characters or images, respectively.

Once a preset condition of the mobile terminal is satisfied, the controlled 1180 can execute a locked state for limiting a user's input of control commands with respect to applications. And the controller 1180 can control a locked screen displayed in the locked state, based on a touch input sensed by the display unit 1151 in the locked state.

The power supply unit 1190 can receive external power or internal power and supplies appropriate power required for operating respective elements and components under control of the controller 1180.

Various implementations described herein may be implemented in a computer-readable or its similar medium using, for example, software, hardware, or any combination thereof.

For hardware implementation, the implementations described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such implementations may be implemented by the controller 1180 itself.

For software implementation, the implementations such as procedures or functions described herein may be implemented by separate software modules. Each software module may perform one or more functions or operations described herein.

Software codes can be implemented by a software application written in any suitable programming language. The software codes may be stored in the memory 1160 and executed by the controller 1180.

Hereinafter, a structure of the mobile terminal of FIG. 8 according to an implementation of the present disclosure will be explained.

Figure 9A:
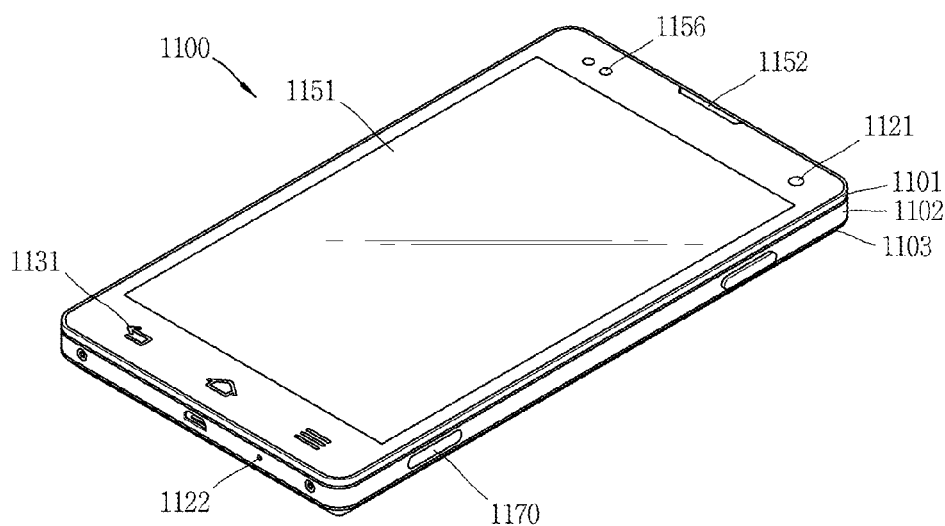
FIG. 9A is a front perspective view illustrating an example mobile terminal according to the present disclosure.
Figure 9B:
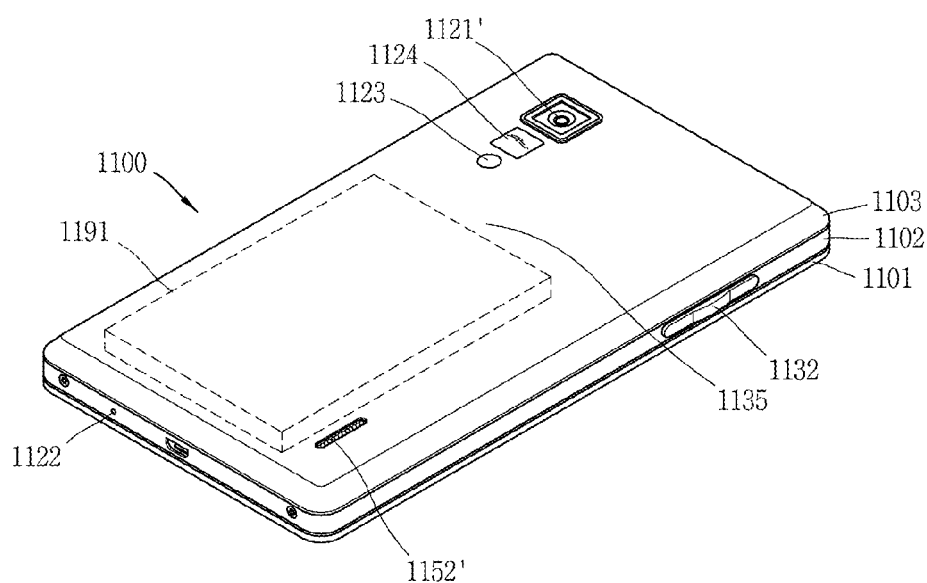
FIG. 9B is a rear perspective view of the mobile terminal of FIG. 9A.

FIGS. 9A and 9B illustrate the mobile terminal 1100 according to an implementation of the present disclosure.

The mobile terminal 1100 described the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of the mobile terminal 1100 may include a front case 1101 and a rear case 1102. A space formed by the front case 1101 and the rear case 1102 may accommodate various components therein. At least one intermediate case may further be disposed between the front case 1101 and the rear case 1102.

Such cases may be formed by injection-molded synthetic resin, or may be formed using a metallic material such as stainless steel (STS) or titanium (Ti).

At the front case 1101, may be disposed a display unit 1151, an audio output unit 1152, a camera 1121, a user input unit 1130, a microphone 1122, an interface unit 170, a light emitting unit 1156, etc.

The display unit 1151 occupies most parts of a main surface of the front case 1101. The audio output unit 1152 and the camera 1121 are arranged at a region adjacent to one end of the display unit 1151, and the user input unit 1130 and the microphone 1122 are arranged at a region adjacent to another end of the display unit 1151. The user input unit 1130, the interface unit 1170, etc. may be arranged on side surfaces of the front case 1101 and the rear case 1102. The microphone 1122 is arranged at another end of the mobile terminal 1100.

The user input unit 1130 can be manipulated to receive a command for controlling the operation of the mobile terminal 1100, and may include a plurality of manipulation units 1131 and 1132. The manipulation units may be referred to as manipulating portions, and may include any type of ones that can be manipulated in a user's tactile manner.

Commands inputted through the first or second user input units 1131 and 1132 may be variously set. For instance, the first manipulation 1131 is configured to input commands such as START, END, SCROLL or the like, and the second manipulation unit 1132 is configured to input commands for controlling a level of sound outputted from the audio output unit 1152, or commands for converting the current mode of the display unit 1151 to a touch recognition mode.

The light emitting unit 1156 can be arranged at an upper region of the front surface of the mobile terminal 1100, and may be provided with one or more light emitting diodes (LEDs). The light emitting unit 1156 is configured to emit light in various manners under control of the controller 1180. That is, a color of light, a period to flicker light on and off, a brightness of light, etc. may be changed.

Referring also to FIG. 9B, an audio output unit 1152' may be additionally arranged on a rear surface of the terminal body. The audio output unit 1152' may cooperate with the audio output unit 1152 so as to implement a stereo function. Also, the audio output unit may be configured to operate as a speakerphone.

A rear camera 1121' may be additionally provided on the rear case 1102. The rear camera 1121' faces a direction which is opposite to a direction faced by the camera 1121, and may have different pixels from the camera 1121.

For example, the camera 1121 may operate with relatively lower pixels (lower resolution). Thus, the camera 1121 may be useful when a user can capture his face and send it to another party during a video call or the like. In this case, the camera 1121 can reduce the size of transmission data. On the other hand, the camera 1121' may operate with a relatively higher pixels (higher resolution) such that it can be useful for a user to obtain higher quality pictures for later use.

The cameras 1121 and 1121' may be installed at the mobile terminal 1100 so as to rotate or pop-up. A flash 1123 and a mirror 1124 may be additionally disposed adjacent to the camera 1121'. The flash 1123 operates in conjunction with the camera 1121' when taking a picture using the camera 1121'. The mirror 1124 can cooperate with the camera 1121' to allow a user to photograph himself in a self-portrait mode.

The power supply unit 1190 in the form of a battery 1191 for supplying power to the mobile terminal 1100 can be mounted within a body of the mobile terminal 1100. The battery 1191 may be permanently mounted in the terminal body, or may be detachably mounted to the terminal body.

A touch pad 1135 for sensing touch may be additionally mounted to the rear case 102. Like the display unit 1151, the touch pad 1135 may be formed to be light-transmissive. If the display unit 1151 is configured to output visual information from its two surfaces, the visual information is recognizable through the touch pad 1135. Information output from two surfaces of the display unit 1151 may be controlled by the touch pad 1135. A display may be additionally mounted to the touch pad 1135, and a touch screen may be arranged at the rear case 1102.

The touch pad 1135 can operate in association with the display unit 1151 of the front case 1101. The touch pad 1135 may be disposed on the rear surface of the display unit 1151 in parallel. The touch pad 1135 may have a size equal to or smaller than that of the display unit 1151.

In the mobile terminal according to an implementation of the present disclosure which can include at least one of the aforementioned components, a lock mode where the display unit is deactivated and a control command input from a user is restricted, can be executed. Once the lock mode is executed (locked state), the controller 1180 displays a lock screen for inputting a password when the display unit is activated.

The mobile terminal further includes a sensing unit configured to sense taps applied onto the terminal body in a deactivated state of the display unit. In a case where a plurality of taps are sensed by the sensing unit, the controller sequentially connects points of the sensed taps with one another to thus analyze a user's motion pattern. If the analyzed motion pattern corresponds to one of a plurality of release commands for releasing a locked state, the controller releases a locked state of the mobile terminal in response to reception of the release command, activates the display unit, and displays preset screen information on the display unit.

Under such configuration, a user may release a locked state of the mobile terminal, through a simple gesture to tap the display unit. This can allow the user to omit general procedures to turn on the display unit, and to input a password to the display unit using a virtual keypad.

Hereinafter, with reference to the attached drawings, will be explained a new user interface capable of controlling the mobile terminal based on a user's motion pattern formed by sequentially connecting points of taps with one another, the taps sensed in a deactivated state of the display unit.

Figure 10:
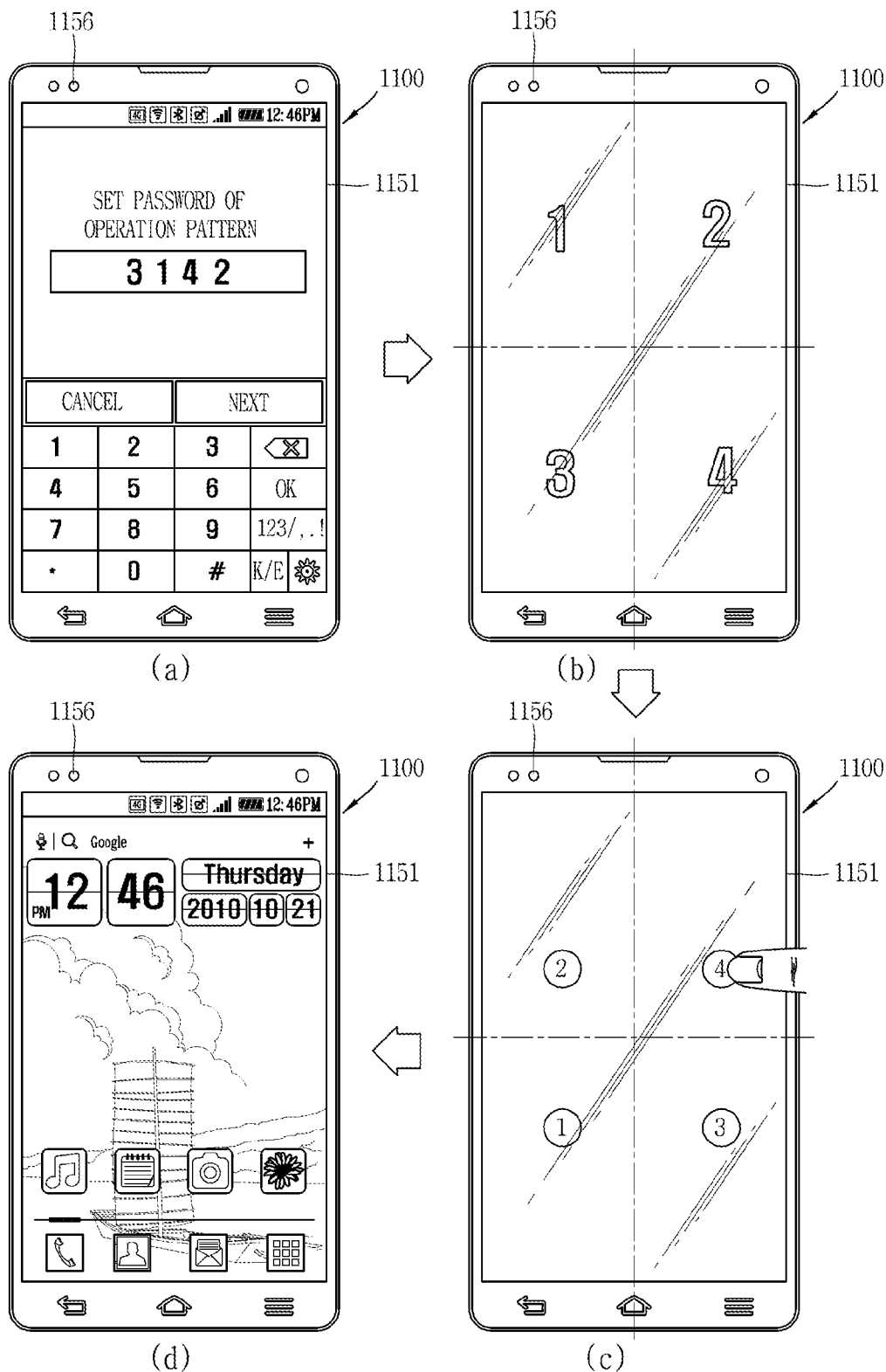
FIG. 10 is a conceptual view illustrating an example operation performed by a mobile terminal of the present disclosure.
Figure 11:
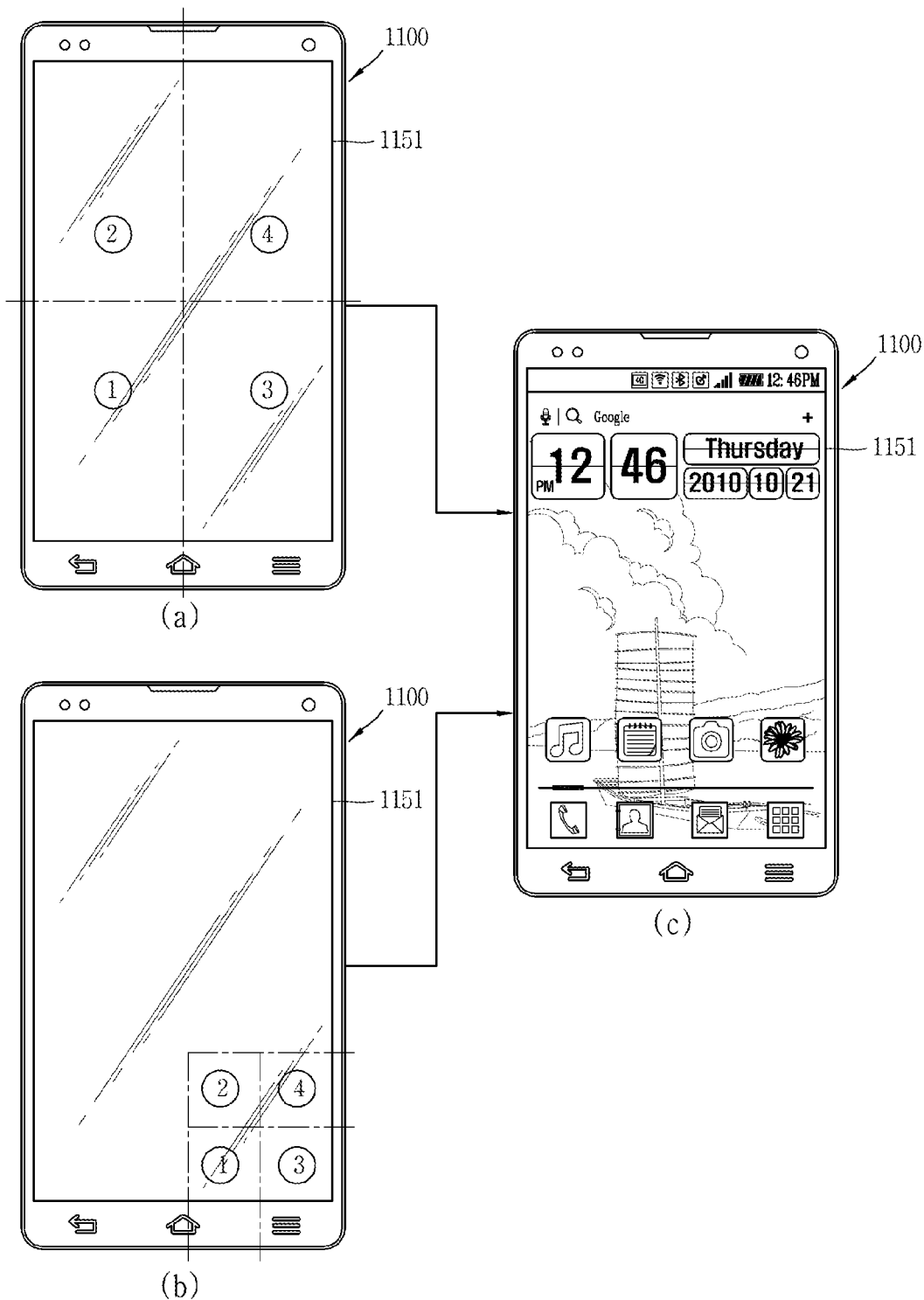
FIG. 11 is a conceptual view illustrating an example method for releasing a locked state using a motion pattern of various sizes using the control method of FIG. 10.

FIG. 10 illustrates an example operation performed by a mobile terminal of the present disclosure, and FIG. 11 illustrates an example method for releasing a locked state using a motion pattern of various sizes, in the control method of FIG. 10.

First, a method for releasing a locked state by a user's motion pattern in a mobile terminal according to an implementation of the present disclosure will be explained with reference to FIG. 10. The mobile terminal 1100 (refer to FIG. 8) includes the sensing unit 1140, the display unit 1151 and the controller 1180.

The locked state means a state where reception of a control command input from a user is restricted. The locked state can be released only when a password set by a specific user is input. In such locked state, a lock screen for inputting a password can be displayed when the display unit 1151 is activated.

In a case where the lock screen is displayed, a user may apply a preset touch onto screen information output to the lock screen for release of a locked state. For instance, the preset touch may be a touch for drawing a path from a first point on the display unit 1151, to a second point different from the first point. That is, the preset touch may be a touch for drawing a pattern by a moving path thereof. Upon completion of a touch for releasing a locked state, the controller 1180 may convert the locked state into a released state, and may output a home screen page to the display unit 1151. That is, as the locked state is converted into the released state, the mobile terminal may enter a mode where at least some of a plurality of applications installed at the mobile terminal can be executed.

In the mobile terminal according to the present disclosure, a locked state can be released by a release command formed by a plurality of taps applied to the mobile terminal in a deactivated state of the display unit 1151. More specifically, the release command is defined by a motion pattern formed by sequentially connecting points of the plurality of taps with one another. Here, the points of the plurality of taps mean coordinate values to which the plurality of taps have been applied.

Accordingly, a locked state of the mobile terminal can be directly released by a plurality of taps applied to the mobile terminal in a deactivated state, and the mobile terminal can display preset screen information. That is, a locked state of the mobile terminal can be released without a user's inputting a password to the display unit where a lock screen has been displayed. Hereinafter, an operation performed by the mobile terminal of the present disclosure will be explained in more detail with reference to FIG. 10.

In order to convert a locked state into a released state, a user's password for releasing a locked state should be input. Such password may be preset when the mobile terminal is presented on the market, or may be preset or edited by a user. Referring to FIG. 10(a), a password input window (or a pin code input window) for inputting a user's password may be displayed on the display unit 1151 of the mobile terminal. For instance, the controller 1180 may display the password input window on the display unit 1151, in case of executing a password setting function and/or in case of converting a released state into a locked state.

The password input window may include at least one virtual keypad. More specifically, the virtual keypad may be a numeric keypad. The controller 1180 may set a password for releasing a locked state, based on a user's input to the virtual keypad. For instance, as shown in FIG. 10(a), a password for releasing a locked state may be set as "3142."

The controller 1180 can set (or register) a motion pattern for converting a locked state into a released state, based on the set password. The motion pattern is formed by a plurality of taps applied to the mobile terminal. More specifically, the motion pattern is formed by sequentially connecting points of the taps with one another. For instance, a motion pattern, where points of four taps form vertexes of a capital letter "N" sequentially, may be set.

The controller 1180 may divide an entire region of the display unit 1151 into a plurality of regions, and may set a user's motion pattern using the plurality of regions. In a case where a preset password is "3142", the controller 1180 divides the display unit 1151 based on a largest number among the input numbers, e.g., "4". For instance, the controller 1180 may divide the display unit 1151 into four regions as shown in FIG. 10(b). The four regions may be sequentially provided with identification numbers from a left upper side (e.g., 1~4 regions). The controller 1180 may set sequential application of first to fourth taps onto the third region, first region, the fourth region and the second region, as a motion pattern. Hereinafter, the motion pattern set in the aforementioned manner is called a preset motion pattern.

The present disclosure is not limited to the above configuration where a password is set as four numbers, and an entire region of the display unit 1151 is divided into 4 regions. That is, the controller 1180 may divide the display unit 1151 into a plurality of regions in various manners. For instance, the controller 1180 may divide the display unit 1151 into an upper region and a lower region, or an upper region, a middle region and a lower region, based on a preset password. Then the controller 1180 may set various motion patterns.

Once the password and the motion pattern have been set, the controller 1180 may execute a locked state, and deactivate or activate the display unit 1151.

For reference, a deactivated state of the display unit 1151 means a state where a light emitting unit provided in the mobile terminal so as to illuminate the display unit 1151 is turned off. For instance, as shown in FIG. 10(b), neither information nor a graphic image is displayed on the display unit 1151 in a deactivated state of the display unit 1151.

On the contrary, an activated state of the display unit 1151 means a state where the light emitting unit provided in the mobile terminal so as to illuminate the display unit 1151 is turned on. In an activated state of the display unit 1151, different screen information is displayed on the display unit 1151 under control of the controller 1180. In some cases, if the display unit 1151 is activated in a locked state, the controller 1180 can display a lock screen related to input of a password, so that a password for releasing a locked state can be input from a user.

In a deactivated state of the display unit 1151, a plurality of taps applied onto the display unit 1151 may be sensed. In this case, the controller 1180 analyzes a motion pattern formed by sequentially connecting points of the sensed taps with one another. If the analyzed motion pattern is consistent with a preset motion pattern for releasing a locked state, the controller 1180 executes a locked-state releasing function. Such locked-state releasing function means a function to release a locked state, to convert a deactivated state of the display unit into an activated state, and to display preset screen information on the activated display unit 1151.

As shown in FIG. 10(c), in a case where first to fourth taps (①,②,③,④) are sequentially sensed on the third region, the first region, the fourth region and the second region, respectively, the controller 1180 may determine that a release command has been received, because the sensed taps form a preset motion pattern (e.g., "N") defined as the release command. In this case, the controller 1180 may execute a locked-state releasing function as shown in FIG. 10(d). That is, the controller 1180 may activate the display unit 1151, and may display a home screen page. The home screen page may include at least one object, and such object may be an icon or a widget of an application installed at the mobile terminal. When a locked state of the mobile terminal is converted into a released state, such home screen page is not necessarily output to the display unit 1151 first. For instance, screen information, which has been output to the display unit 1151 the most recently before the locked state is implemented, may be displayed as preset screen information.

Under such configuration, a locked state of the mobile terminal can be released based on a user's motion pattern to tap the display unit 1151 in a deactivated state of the display unit 1151. Accordingly, a simple user interface can be implemented.

Further, such configuration of the present disclosure can help improve user convenience by eliminating the need to activate the display unit 1151 using buttons, etc. in order to release a locked state before being to input a password to the display unit 1151 using a virtual keypad included in a lock screen.

A user can control the mobile terminal in a novel manner even in a deactivated state of the display unit.

In the mobile terminal according to an implementation of the present s2 disclosure, the controller 1180 can release a locked state in response to reception of one of a plurality of release commands defined as a motion pattern formed by a plurality of taps. In this case, the release command indicates a command for releasing a locked state of the display unit, and converting a deactivated state of the display unit into an activated state.

Each of the plurality of release commands include a plurality of taps which form a motion pattern with a different size. That is, each of the plurality of release commands forms the same motion pattern, but includes taps which implement a pattern of a different size by being connected to one another. The plurality of release commands include a first release command and a second release command. The first release command may correspond to a plurality of taps which form a motion pattern of a first size, whereas the second release command may correspond to a plurality of taps which form the same motion pattern of a second size different from the first size.

Referring to FIGS. 11(a) and 11(b), a motion pattern preset by a password "3142" may be formed by a plurality of taps, and thereby a plurality of release commands may be defined. More specifically, a plurality of release commands may be formed by the same number of taps (e.g., 4 taps). A virtual pattern (e.g., ①→②→③→④) formed as points of the taps are sequentially connected to one another has the same shape as a preset motion pattern. However, the virtual pattern may be different from the preset motion pattern in a size or a touch position. That is, when a virtual pattern is the same as a preset motion pattern, it means that the two patterns are identical in shape.

A distance between an $n^{th}$ tap and an $n-1^{th}$ tap among the plurality of taps which form the motion pattern may be variable according to the plurality of release commands. For instance, a distance between the first tap (①) and the second tap (②) in a first release command shown in FIG. 11(a) is different from a distance between the first tap (①) and the second tap (②) in a second release command shown in FIG. 11(b). However, each of the first release command and the second release command corresponds to a release command for releasing a locked state. As shown in FIG. 11(c), one of the plurality of release commands may correspond to a release command for entering a home screen page.

For convenience, a tap characteristic is expressed as a circle as shown in FIG. 11. The number inside the circle indicates the order of tap application, and the position of the circle indicates a position where a tap has been applied. In a case where a single circle includes different numbers, it means that taps corresponding to different numbers have been sequentially applied to the same position.

In a deactivated state of the display unit 1151, information on a plurality of regions is not be output. For convenience, virtual lines for dividing regions from one another, and numbers corresponding to a plurality of regions may be displayed.

According to the aforementioned driving method, a user may input a motion pattern for releasing a locked state on different positions and/or in different sizes, in a deactivated state of the display unit 1151. For instance, a user may apply a release command using his thumb, with his right hand grasping the mobile terminal. In this case, a tap may be applied to a region where the user's right thumb reaches (e.g., a right lower region of the display unit 1151). If a motion pattern which has the same shape as a preset motion pattern is formed by the same number of taps as the preset motion pattern, the controller 1180 may release a locked state. That is, the mobile terminal of the present disclosure can provide a user with a more intuitive and simpler user interface.

Hereinafter, a method to recognize a user's motion pattern in a mobile terminal according to an implementation of the present disclosure will be explained in more detail with reference to FIGS. 12, 13, 14A, and 14B.

Figure 12:
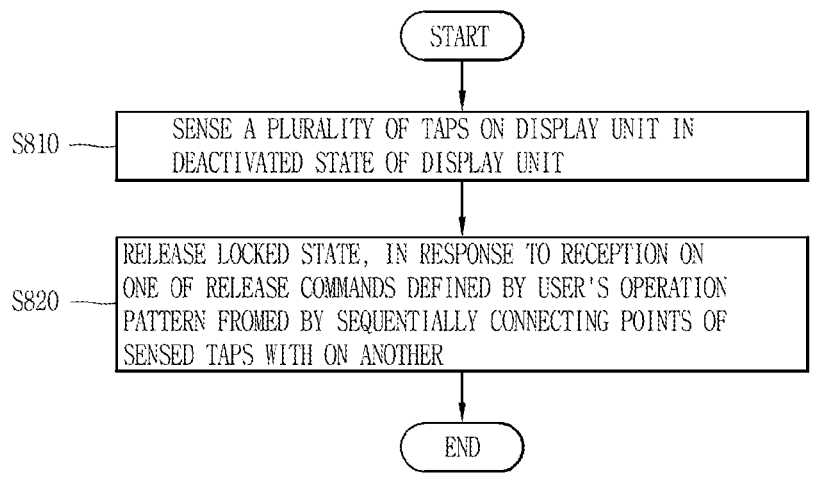
FIG. 12 is a flowchart illustrating an example method for controlling a mobile terminal according to an implementation of the present disclosure.

FIG. 12 illustrates an example method to control a mobile terminal according to an embodiment of the present invention.

Referring to FIG. 12, a plurality of taps for knocking on the display unit 1151 are sensed in a deactivated state of the display unit 151 (S810).

Such deactivated state of the display unit 1151 means that a light emitting unit provided in the mobile terminal for illuminating the display unit 1151 is turned off. That is, neither information nor a graphic image may be displayed on the display unit 1151 in a deactivated state of the display unit 1151.

The sensing unit 1140 can sense a tap applied to the terminal body regardless of whether the display unit 1151 is in an activated state or a deactivated state.

A tap or a tap gesture refers to a user's gesture to knock on the mobile terminal 1100 or a similar object. More specifically, a tap may refer to an operation to knock on the mobile terminal 1100 or an object using a tap applying object such as a finger, or an operation to bring the tap applying object in slight contact with the mobile terminal 1100 or the object. The concept of "knock-on" will be discussed further below.

Such tap applying object may be a thing which can apply an external force to the mobile terminal 1100 or an object. For instance, the tap applying object may be a finger having a fingerprint, a stylus pen, a pen, a pointer, a first (finger joint), knuckle, etc. The tap applying object is not limited to an object which can apply a touch input to the mobile terminal, but may have various types only if it can apply an external force to the mobile terminal 1100 or an object.

The object may include at least one of the terminal body and a region rather than the terminal body. That is, an input region of the mobile terminal may extend to outside of the terminal body. Accordingly, a region rather than the terminal body of the mobile terminal 1100 where a tap can be sensed may be a virtual input region.

Such virtual input region may have a different area according to a place where the mobile terminal is positioned, an object, or a tap intensity. For instance, in a case where the mobile terminal is placed on a table, etc., if a user taps on the table, the mobile terminal is moved and thereby the tap may be sensed. If the intensity of the tap increases, the virtual input region increases in size. As another example, in a case where a user holds the terminal body, the virtual input region may disappear.

In a tap sensing step, if two or more taps are applied within a predetermined time, the controller 1180 may determine that a tap on the display unit 1151 for controlling the mobile terminal has been sensed. For instance, if a single tap is applied onto the display unit 1151 by a touch applying object which can apply a touch input to the display unit 1151, the controller 1180 may recognize the single tap as a touch input. More specifically, reception of a control command input by a user is restricted in a locked state. Accordingly, if a user's input is recognized as a touch input not a tap, the controller 1180 may ignore the user's input.

The controller 1180 may determine whether a motion pattern which defines a release command has been applied or not, only in a case where the sensing unit 1140 senses at least two taps which have been consecutively applied to the display unit 1151 within a predetermined time.

At least two taps which have been consecutively sensed within a predetermined time may be referred to as a "knock-on." For instance, if a second tap is sensed within a predetermined time based on a time point when a first tap has been sensed, it may mean that knock-on has been sensed. Accordingly, the fact that knock-on has been sensed may mean that a plurality of taps on the terminal body or a region rather than the terminal body have been sensed.

If the sensing unit 1140 is implemented as a touch sensor, the sensing unit 1140 may sense knock-on in different manners according to whether the display unit 1151 has been activated or not. For instance, if the display unit 1151 has been activated, the touch sensor may execute an active mode in order to react to a user's input immediately. The active mode indicates a mode for maintaining an activated state. The activated state includes fast conversion between an activated state and a deactivated state which seems to be an activated state. On the contrary, if the display unit 1151 has been deactivated, the touch sensor may execute a doze mode in order to reduce consumption of a battery. The doze mode indicates a mode for converting an activated state and a deactivated state to each other at preset time periods. More specifically, in a case where the display unit 1151 is in a deactivated state, the touch sensor may execute the doze mode, and the deactivated state may be converted into an activated state at preset time periods If a time period to activate the touch sensor is shorter, a speed to sense knock-on applied to the display unit 1151 may be faster. However, in this case, power consumed by the touch sensor may be increased. On the contrary, if a time period to activate the touch sensor is longer, power consumed by the touch sensor may be decreased, but the speed to sense knock-on applied to the display unit 1151 may be slower.

Accordingly, a preset time period may be set so that power consumption efficiency is maximized while maintaining sufficient sensing speed. For instance, the preset time period may be a value preset so that the touch sensor can be activated about 30 times (30 Hz) for one second. Such value may correspond to a minimum current to recognize a touch input in a deactivated state of the display unit 1151.

The touch sensor may execute a doze mode in a deactivated state of the display unit 1151, and may execute an active mode when a first tap is applied to the display unit 1151. That is, if it is determined that taps are applied in a deactivated state of the display unit 1151, the touch sensor may execute an active mode so as to more precisely sense a tap to be applied subsequently. In the active mode, the touch sensor may be set to be activated about 120 times (120 Hz) for one second.

If a second tap is not sensed within a predetermined time based on a time point when a first tap has been sensed, the touch sensor may convert the active mode into a doze mode. Such conversion is performed in order to prevent a malfunction of the mobile terminal resulting from the occurrence of a user's unintentional tap.

The sensing unit 1140 includes a touch sensor. Furthermore, the sensing unit 1140 may also include one of an acceleration sensor configured to sense a tap based on motion of the terminal body, a sound sensor configured to sense a tap based on sound generated from the periphery of the terminal body, a proximity sensor configured to sense a tap based on whether there is an object around the terminal body, and a pressure sensor configured to sense a tap based on a pressure applied to the terminal body, among others.

Like the touch sensor, other sensors included in the sensing unit 1140 may become deactivated or become activated at preset time periods, in a deactivated state of the display unit 1151. This may help reduce power consumption by the sensors.

More specifically, if a first tap has been sensed in a deactivated state of the display unit 1151, the controller 1180 may activate one or more sensors included in the sensing unit 1140, in order to more precisely sense a second tap to be applied subsequently. Said one or more sensors may include a touch sensor, a mike sensor, a proximity sensor, an RGB sensor, a pressure sensor, etc., and may be used to determine a tap characteristic such as a tap intensity, a tap position, a time interval between a first tap and a second tap, an object to which a tap is applied and a tap area.

For instance, the touch sensor may be arranged at the terminal body, and may sense a tap based on a touch applied to the terminal body. Further, the touch sensor may calculate a position to which a tap is applied, and may determine a tap applying object (e.g., finger, nail, palm, etc.) based on a tap area.

As another example, the mike sensor may sense a tap based on sound generated from the periphery of the terminal body. Sound has its own frequency characteristic. Accordingly, a tap applying object (e.g., finger, nail, palm, pen, etc.) and a tap pattern may be determined using a frequency characteristic of received sound.

As still another example, even if knock-on has been sensed by the touch sensor, if an object adjacent to a front surface of the terminal body has been sensed by a proximity sensor, the controller 1180 may reject the sensed knock-on. The reason is because the mobile terminal which has been put into a bag may malfunction as the bag is moved.

As still another example, the RGB sensor may sense a color of a tap applying object, and may determine a type of the tap applying object using the sensed color. That is, in the present disclosure, a user's finger and a touch pen may be distinguished from each other by the RGB sensor.

As still another example, the pressure sensor may sense a tap based on a pressure applied onto the terminal body, and may calculate the intensity of a pressure occurring from the tap.

As still another example, a piezo sensor (or other types of sensors that can sense impact) may sense a tap using a principle that electricity is generated from the surface of a crystalline substance when a pressure is applied to a specific direction. An acceleration sensor may be configured to sense a motion corresponding to several hundreds of hertz (Hz), whereas the piezo sensor may be configured to sense motion corresponding to several thousands of hertz (kHz). Therefore, the piezo sensor may be able to sense a motion of the mobile terminal (or an impact applied to the mobile terminal) more precisely.

Further, the controller 1180 can be configured to check the aforementioned tap characteristic using the piezo sensor. More specifically, the piezo sensor can generate a different physical pattern according to a characteristic of a tap which causes an impact to an object. Accordingly, the piezo sensor may check a tap characteristic based on a physical pattern obtained in an experimental manner. The physical pattern obtained in an experimental manner may be preset in a manufacturing step in a factory, and may be stored in the memory 1160. Also, the physical pattern may be updated periodically, or may be changed by a user.

For sensing of a tap applied to the terminal body, one of the acceleration sensor and the touch sensor may be used, or the acceleration sensor and the touch sensor may be sequentially used. Alternatively, the acceleration sensor and the touch sensor may be simultaneously used.

A mode where only the acceleration sensor is used to sense a tap may be called a first mode. A mode where only the touch sensor is used to sense a tap may be called a second mode. A mode where both of the acceleration sensor and the touch sensor are used (sequentially or simultaneously) to sense a tap may be called a third mode or a hybrid mode. Furthermore, the controller 1180 may determine whether knock-on has been sensed or not, by considering sensing signals generated from the aforementioned sensors. This can allow a tap characteristic such as a position where a tap has been sensed, to be checked more precisely.

Next, a step (S820) of releasing a locked state in response to one of a plurality of release commands defined by a user's motion pattern formed by sequentially connecting points of sensed taps with one another may be performed.

For example, upon detection of knock-on applied onto the terminal body plural times, the controller 1180 analyzes a user's motion pattern formed by sequentially connecting points of sensed taps with one another. The user's motion pattern may be applied according to, but not limited to, any one or more of the following: the number of sensed taps, an absolute/relative position to which taps have been applied, an input speed (or tempo) of taps, a rhythmic pattern of taps, an application order of taps, the number of tap applying objects for a single tap (e.g., a single tap using one finger, or a single tap using two fingers), a tap area, a tap intensity, whether a contact state between a tap applying object and the terminal body is maintained (tap and hold), etc. That is, the user's motion pattern, for example knock pattern or knock code, may include temporal and/or spatial aspects. For convenience, implementations where first to fourth taps are applied to the display unit 1151 using a single tap applying object (e.g., one finger) will be explained hereinafter. However, the present disclosure is not limited to this implementation.

In one implementation, the controller 1180 may calculate a coordinate value to which a tap has been applied. The coordinate value may be expressed as (x, y) based on a horizontal axis (x-axis) and a vertical axis (y-axis) of the display unit 1151. The controller 1180 may analyze a user's motion pattern formed by sequentially connecting points of taps with one another based on the calculated coordinate values. Then the controller 1180 may distinguish a motion pattern for releasing a locked state, from an erroneous motion pattern.

The controller 1180 may analyze a motion pattern based on a relative position between tap points. In this case, an $n^{th}$ tap should be applied to a position which satisfies preset conditions, from a point where an n−1$^{th}$ tap has been applied. For instance, if a second tap does not satisfy the preset conditions based on a position of a first tap, the controller 1180 ignores the first tap. On the contrary, if the second tap satisfies the preset conditions based on the position of the first tap, the controller 1180 may determine whether a third tap satisfies the preset conditions based on a position of the second tap. If all the taps which form the motion pattern satisfy the preset conditions, the controller 1180 may determine that a preset motion pattern has been sensed. Such preset conditions may be related to an angle formed by a virtual axis obtained based on a distance between two tap points, and a moving direction of a tap, and formed by a straight line which connects two points with each other.

Next, the controller 1180 can release the locked state in response to reception of one of a plurality of release commands, convert a deactivated state of the display unit into an activated state, and display preset screen information. That is, the controller 1180 can perform a locked-state releasing function.

For example, the controller 1180 analyzes a motion pattern based on sensed taps, and determines whether the analyzed motion pattern matches a preset motion pattern defined as a release command. The controller 1180 may digitize a matching rate. If a digitized matching rate is larger than a reference value, the controller 1180 determines that a release command has been received.

A plurality of release commands can be defined by a single motion pattern. The controller releases a locked state in response to reception of one of the plurality of release commands. The controller 1180 displays preset screen information not a lock screen, on the display unit 1151. The preset screen information may be a home screen page. The home screen page may include at least one object, and such object may be an icon or a widget of an application installed at the mobile terminal. When a locked state of the mobile terminal is converted into a released state, such home screen page is not necessarily output to the display unit 1151 first. For instance, screen information, which has been output to the display unit 1151 the most recently before the locked state is implemented, may be displayed as preset screen information.

The memory 1160 may store therein information on a motion pattern which defines a plurality of release commands. The information on a motion pattern may include the number of taps which form a motion pattern, the order that the taps are applied, a distance between two consecutive taps, a moving direction of a tap. The controller 1180 may determine whether sensed taps form the motion pattern, based such information.

Each of the plurality of release commands may correspond to control information for displaying different screen information on the display unit 1151. That is, when a locked state is released, screen information displayed on the display unit 1151 may be variable according to a release command. Upon detection of a preset motion pattern of a first size, the controller 1180 may display first screen information on the display unit 1151. On the contrary, upon detection of a motion pattern of a second size different from the first size, the controller 1180 may display second screen information different from the first screen information, on the display unit 1151.

The plurality of release commands may include a first release command and a second release command. The first release command may be defined as a motion pattern formed on the display unit with a size larger than a reference size, and the second release command may be defined as a motion pattern formed on the display unit with a size smaller than the reference size.

Upon detection of taps which form a motion pattern on the display unit with a size larger than a reference size, or upon reception of the first release command, the controller 1180 displays a first screen on an entire region of the display unit 1151. On the contrary, upon detection of taps which form a motion pattern on the display unit with a size smaller than the reference size, or upon reception of the second release command, the controller 1180 displays a second screen different from the first screen on a partial region of the display unit 1151. Alternatively, the controller 1180 displays the second screen on an entire region of the display unit 1151, together with the first screen.

The second screen is a screen obtained by contacting the first screen by a reference ratio, and a position of the second screen on the display unit 1151 is variable according to a region to which a motion pattern has been applied. As an example, if a motion pattern is formed on a left lower region of the display unit 1151, the controller 1180 displays the second screen on the left lower region of the display unit 1151. As another example, if a motion pattern is formed on a right lower region of the display unit 1151, the controller 1180 displays the second screen on the right lower region of the display unit 1151.

This can be to provide a mobile terminal capable of enhancing a user's convenience by displaying a supplementary screen obtained by contracting an entire screen. For instance, a user may apply a tap onto the display unit 1151 using his thumb while holding the mobile terminal with his one hand. That is, a user who controls the mobile terminal using his thumb has a limitation in applying a tap or a touch onto all regions of the display unit 1151, due to a structure of the human body. More specifically, if a user holds the mobile terminal using his left hand, a region to which the user can apply a tap or a touch corresponds to a left lower region of the display unit 1151. On the contrary, if a user holds the mobile terminal using his right hand, a region to which the user can apply a tap or a touch corresponds to a right lower region of the display unit 1151. As the size of the display unit 1151 becomes larger, a user has a more difficulty in applying a tap or a touch onto all regions of the display unit 1151. Accordingly, the user should control the mobile terminal with holding the mobile terminal using his one hand, and with touching a touch screen using his another hand. That is, if the mobile terminal has a large screen, a user should control the mobile terminal using his two hands.

In order to solve such problem, upon detection of taps which form a motion pattern on the display unit 1151 with a size smaller than a reference size, the controller 1180 displays a supplementary screen obtained by contracting an entire screen. A position of the second screen on the display unit 1151 is variable according to a region to which a motion pattern has been applied.

If a preset motion pattern has been applied to the display unit 1151 and the last tap among taps which form the motion pattern is in a contacted state to the terminal body, the controller 1180 displays one or more graphic objects corresponding to different functions, around a region where the last tap has been sensed. Upon detection of a drag input which starts from the last tap toward one of the graphic objects, the controller 1180 performs a function corresponding to the graphic object. That is, the controller may execute at least one application according to the drag input. For instance, if a motion pattern which defines a release command has been applied to the display unit 1151 and the last tap among taps which form the motion pattern is in a contacted state to the terminal body, the controller 1180 may release a locked state, may activate one or more regions on the display unit 1151, and may display the graphic object on said one or more regions. Upon detection of a drag input which starts from the last tap toward the graphic object, the controller 1180 may execute a photo application.

Even if a plurality of taps on the display unit 1151 have been sensed in a deactivated state of the display unit 1151, a motion pattern formed by the sensed taps may not match a preset motion pattern for releasing a locked state. That is, taps unrelated to a locked-state releasing function (i.e., an erroneous motion pattern) may be sensed. In this case, the controller 1180 does not release a locked state, but maintains a deactivated state of the display unit 1151. That is, the controller 1180 can ignore a sensed tap. Here, the controller 1180 can inform a user that taps have been erroneously applied (i.e., there is no function to be performed), using a light emitting unit. For instance, the light emitting unit may inform a user that taps have been erroneously applied, by flicking red light plural times.

Erroneous motion patterns may be consecutively sensed. That is, taps unrelated to a locked-state releasing function may be repeatedly sensed a predetermined number of times within a predetermined time. In this case, the controller 1180 maintains a locked state, activates the display unit 1151, and displays a lock screen for inputting a password. Repeated inputs of incorrect motion patterns mean that a user does not know a password. Accordingly, the controller 1180 displays, on the display unit 1151, a lock screen for releasing a locked state. A user may input a password using a virtual keypad of the lock screen, not using a tap. Then the user may convert a locked state into a released state.

The controller 1180 executes a low power mode (or a doze mode) in a deactivated state of the display unit 1151. Hereinafter, a method for sensing a tap on the display unit 1151 in a low power mode of a mobile terminal according to an implementation of the present disclosure will be explained in more detail with reference to FIG. 13.

Figure 13:
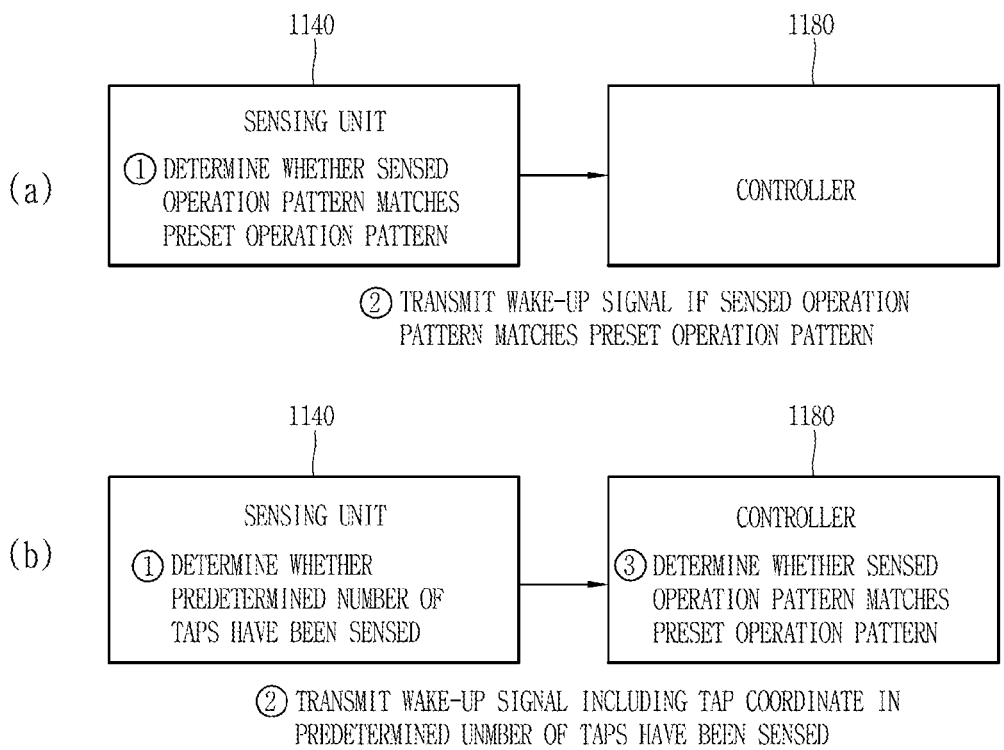
FIG. 13 is a conceptual view illustrating example components configured to sense a user's motion pattern in a mobile terminal according to an implementation of the present disclosure.

FIG. 13 illustrates the use of example components that are configured to sense a user's motion pattern in a mobile terminal according to an implementation of the present disclosure. The components configured to sense a user's motion pattern include the controller 1180 and the sensing unit 1140.

The controller 1180 of the mobile terminal 1100 can execute a low power mode when the display unit 1151 is deactivated. In the low power mode, the controller 1180 performs only arithmetic operations absolutely necessary to operate the mobile terminal. However, the sensing unit 1140 may sense a tap on the display unit 1151 even in a deactivated state of the display unit 1151.

The sensing unit 1140 may be additionally provided with a registry and an execution processor. As shown in FIG. 13(*a*), the sensing unit 1140 may determine whether sensed taps form a preset motion pattern. For instance, if a password for releasing a locked state is set, the controller 1180 stores, in the registry, information on a motion pattern set by the password. The execution processor of the sensing unit 1140 determines whether the sensed taps form a preset motion pattern in a deactivated state of the display unit 1151, based on the information stored in the memory. If it is determined that a preset motion pattern has been sensed, the sensing unit 1140 transmits, to the controller 1180, a wake-up signal for waking controller 1180 up. The controller 1180 executes a locked-state releasing function in response to the wake-up signal. In this case, whether a motion pattern has been sensed or not is determined by the sensing unit 1140 which uses a relatively low power. As a result, power consumption due to arithmetic operations by the controller 1180 can be reduced.

As shown in FIG. 13(*b*), the sensing unit 1140 may determine whether a predetermined number of taps which form a motion pattern have been sensed. Upon detection of a predetermined number of taps, the sensing unit 1140 transmits, to the controller 1180, a wake-up signal including coordinate values of the taps. For instance, upon detection of 4 taps, the sensing unit 1140 may transmit, to the controller 1180, a wake-up signal including coordinates information on each of the 4 taps. The controller 1180 having received the wake-up signal determines whether the sensed taps form a preset motion pattern. That is, the controller 1180 determines whether a sensed motion pattern matches a preset motion pattern. In this case, the sensing unit 1140 having a relatively low price is used. As a result, manufacturing cost of the mobile terminal can be reduced.

In some cases, the sensing unit 1140 may sense a first tap and transmit a wake-up signal to the controller 1180, in a deactivated state of the display unit 1151. That is, whenever a tap is sensed, the sensing unit 1140 transmits a coordinate value of the sensed tap to the controller 1180. Then the controller 1180 determines whether real time-sensed taps form a preset motion pattern.

In the mobile terminal according to the present disclosure, whether a motion pattern has been sensed or not is determined by a different subject. For convenience, it is assumed that whether a motion pattern has been sensed or not is determined by the controller 1180.

In case of analyzing a motion pattern formed by sequentially connecting points of sensed taps with one another, the controller 1180 uses only taps applied within a predetermined time. For instance, if a second tap is sensed after a predetermined time (e.g., 1 second) lapses from a time point when a first tap has been sensed, the controller 1180 ignores the first tap. That is, the controller 1180 uses the second tap as an initial tap included in the motion pattern.

If taps more than taps which form a preset motion pattern are consecutively applied, the controller 1180 ignores the applied taps. For instance, under an assumption that a preset motion pattern is formed by 4 taps, 10 taps may be consecutively applied. Even if four taps included in the 10 taps form the preset motion pattern, the controller 1180 ignores the 10 taps. This is in order to prevent a malfunction of the mobile terminal resulting from the occurrence of a user's unintentional tap.

Figure 14A:
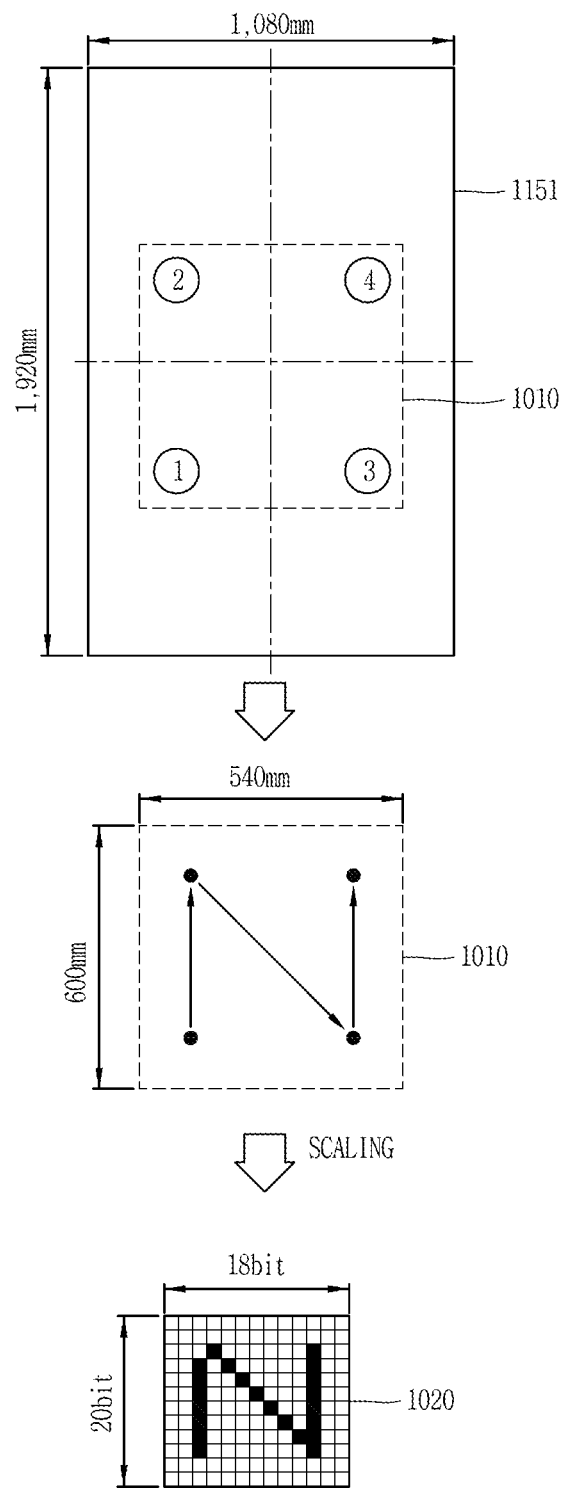

FIGS. 14A, 14B illustrate example methods to sense a user's motion pattern using the components of FIG. 13.

Referring to FIG. 14A, the sensing unit 1140 senses a plurality of taps on the display unit 151, in a deactivated state of the display unit 1151. The controller 1180 may calculate a region 1010 to which the plurality of taps have been applied, and may perform a scaling with respect to the extracted region, into a bitmap 1020 of a preset size. The bitmap 1020 indicates an image obtained by converting a tap-applied position and a non-applied position into 1 and 0. For instance, a region obtained by sequentially connecting points of taps sensed on the bitmap 1020 is expressed as "1," and other regions are expressed as "0." As a result, a motion pattern formed by connecting points of taps with one another may have a prescribed size (e.g., "N").

The controller 1180 compares the bitmap 1020 with a reference bitmap corresponding to a preset motion pattern. Then the controller 1180 determines whether sensed taps form the preset motion pattern according to a comparison result, or based on a matching rate.

Further, the controller 1180 may calculate direction vectors formed by an n−1$^{th}$ tap and an n$^{th}$ tap, and may determine whether sensed taps form a preset motion pattern based on the calculated direction vectors. For instance, in a case where first to fourth taps have been applied as shown in FIG. 14B, coordinate values (P1, P2, P3, P4) may be calculated. The controller 1180 may calculate a direction vector toward a point of a second tap from a point of a first tap, by comparing with a preset vector value ("0" in FIG. 14B). The controller 1180 may calculate direction vectors from the first-sensed tap to the lastly-sensed tap, and may determine whether sensed taps form a preset motion pattern by comparing the calculated direction vectors 1030 with vector values corresponding to a preset motion pattern.

Figure 16A:
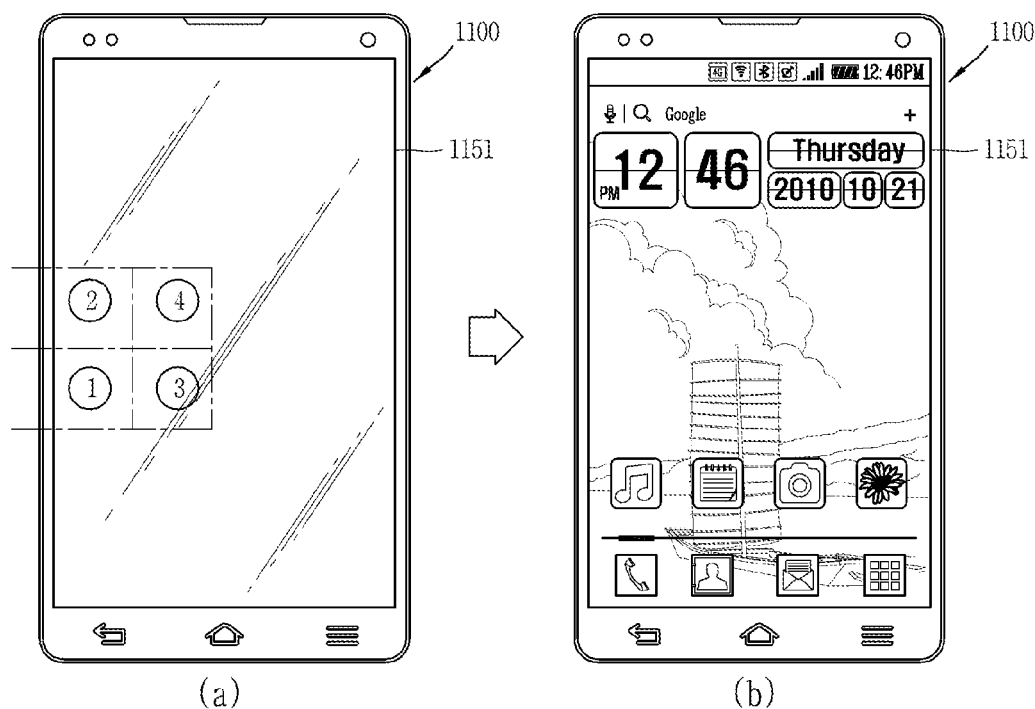
Figure 16B:
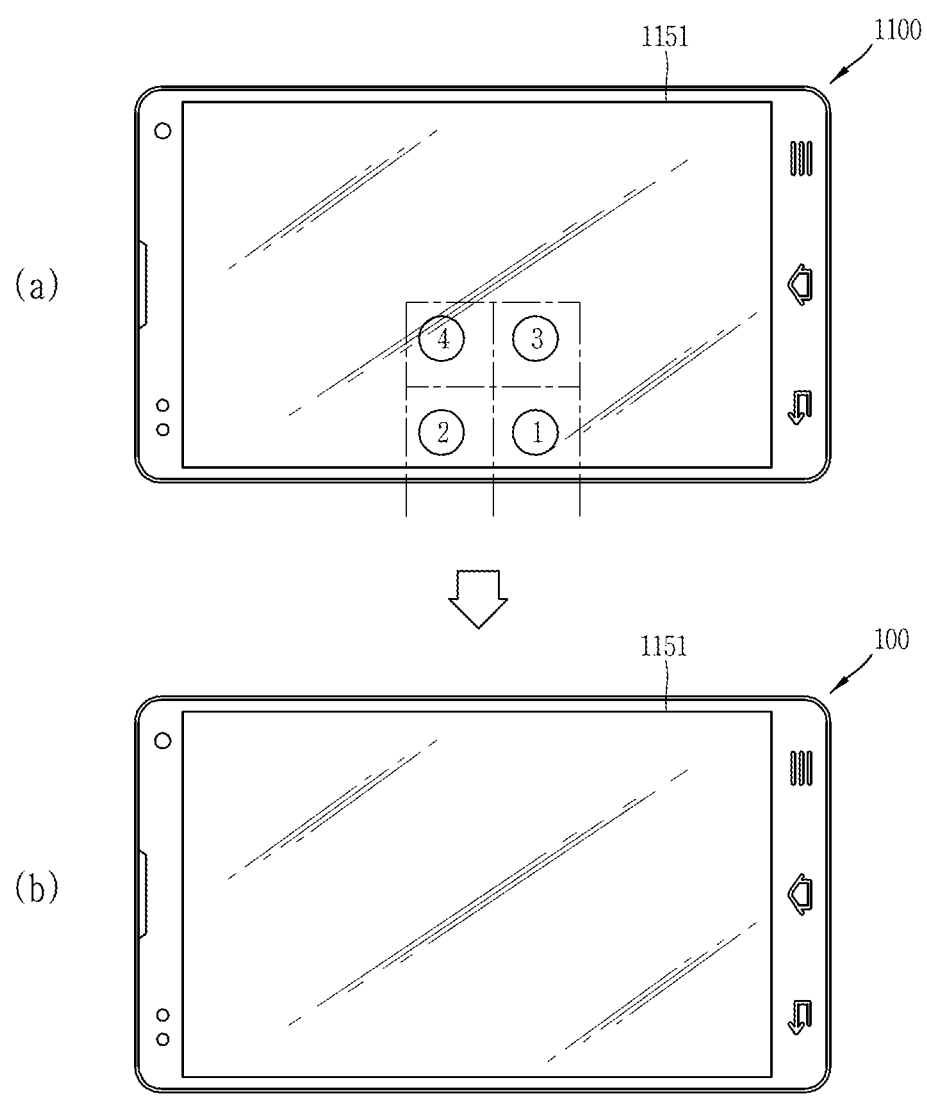

FIGS. 15, 16A, and 16B illustrate example methods to control a mobile terminal with respect to a terminal orientation according to an implementation of the present disclosure.

In a case where a plurality of taps have been sensed in a deactivated state of the display unit 1151, the controller 1180 may sense an orientation of the terminal body when the taps have been applied, and may determine whether to release a locked state or not based on the sensed orientation of the terminal body. That is, if taps are applied to preset positions in a preset order, the controller 1180 may recognize a motion pattern formed by the taps as an erroneous motion pattern, according to the sensed orientation of the terminal body.

A released state may mean a state that a locked state has been released. The mobile terminal which is in a released state may recognize a control command input from a user. In the released state, a specific function may be executed in response to the user's control command. For instance, if a locked state of the mobile terminal is converted into a released state, the controller 1180 may execute one of a plurality of applications installed at the mobile terminal, in response to a user's control command.

As aforementioned, in a case where a plurality of taps have been sensed in a deactivated state of the display unit 1151, the sensing unit may sense an orientation of the terminal body. The sensing unit may sense an orientation of the terminal body using various sensors provided at the mobile terminal. Such sensors for sensing an orientation of the terminal body may include a gravity sensor, a geomagnetic sensor, an inertia sensor, a gyro sensor, etc.

The orientation of the terminal body sensed by the sensing unit may include a rotation angle of the terminal body, a rotation direction of the terminal body, a rotation speed of the terminal body, a rotation acceleration of the terminal body, etc.

More specifically, as shown in FIG. 15, the orientation of the terminal body may be a relative position of a first direction of the terminal body, e.g., a vertical direction of the terminal body, with respect to a virtual reference axis (A-A'). The relative position of the first direction of the terminal body may be variable according to an angle between the terminal body and the virtual reference axis (A-A'). For instance, as shown in FIGS. 15(*a*) and 15(*b*), the relative position of the first direction of the terminal body may be implemented as a position parallel to the virtual reference axis (A-A'). This may mean that an angle between the terminal body and the virtual reference axis is 0° or 180°.

As shown in FIGS. 15(*c*) and 15(*d*), the relative position of the first direction of the terminal body may be implemented as a position perpendicular to the virtual reference axis (A-A'). This may mean that an angle between the terminal body and the virtual reference axis is 90° or 270°.

Hereinafter, implementations will be explained with reference to the four orientations of the terminal body shown in FIG. 15. However, the present disclosure is not limited to this. That is, the angle between the terminal body and the virtual reference axis may have various values.

In the present disclosure, the orientation of the terminal body may be determined based on the virtual reference axis (A-A'), or based on a relative position with respect to a user. For instance, the mobile terminal of the present disclosure may further include a camera unit 1121 configured to receive a user's facial image. The controller 1180 may determine a relative position of the terminal body with respect to the user's facial image. The controller 1180 may recognize the pupils from the user's facial image, and may determine a relative position of the terminal body with respect to the user's facial image. The controller 1180 may control the mobile terminal in a different manner according to the determined relative position of the terminal body.

In the present disclosure, the orientation of the terminal body is sensed based on the virtual reference axis. However, the orientation of the terminal body may be sensed based on a user's position.

The controller 1180 can determine whether a plurality of taps on the display unit 1151 form a preset motion pattern, based on the orientation of the terminal body. That is, the controller 1180 may perform a different operation according to whether the orientation of the terminal body is a first orientation or a second orientation, even if taps have been sequentially sensed on the same position. The different operation may indicate an operation to release a locked state, or an operation to ignore sensed taps. For instance, as shown in FIGS. 16A and 16B, an operation to release a locked state may be performed or may not be performed according to whether the orientation of the terminal body is a first orientation or a second orientation, even if taps have been applied to preset points in a preset order.

Figure 16C:
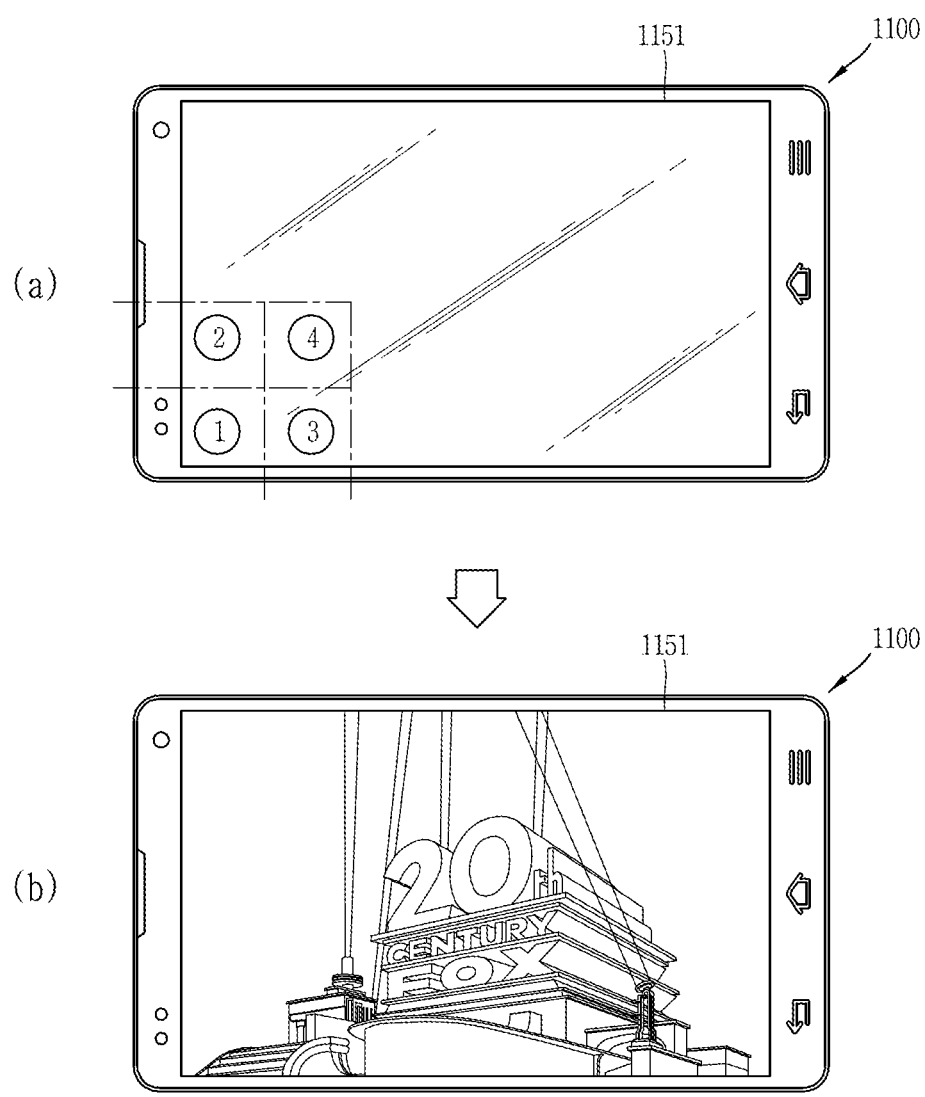

Accordingly, a preset motion pattern may be set based on a gravity direction. If a motion pattern, formed by sequentially connecting points (positions) of taps with one another based on the gravity direction, matches the preset motion pattern, an operation to release a locked state is performed regardless of the orientation of the terminal body. For instance, as shown in FIGS. 16A and 16C, if a motion pattern applied to the mobile terminal matches a preset motion pattern based on the gravity direction, even if the orientation of the mobile terminal is different, an operation to release a locked state is performed.

Figure 17A:
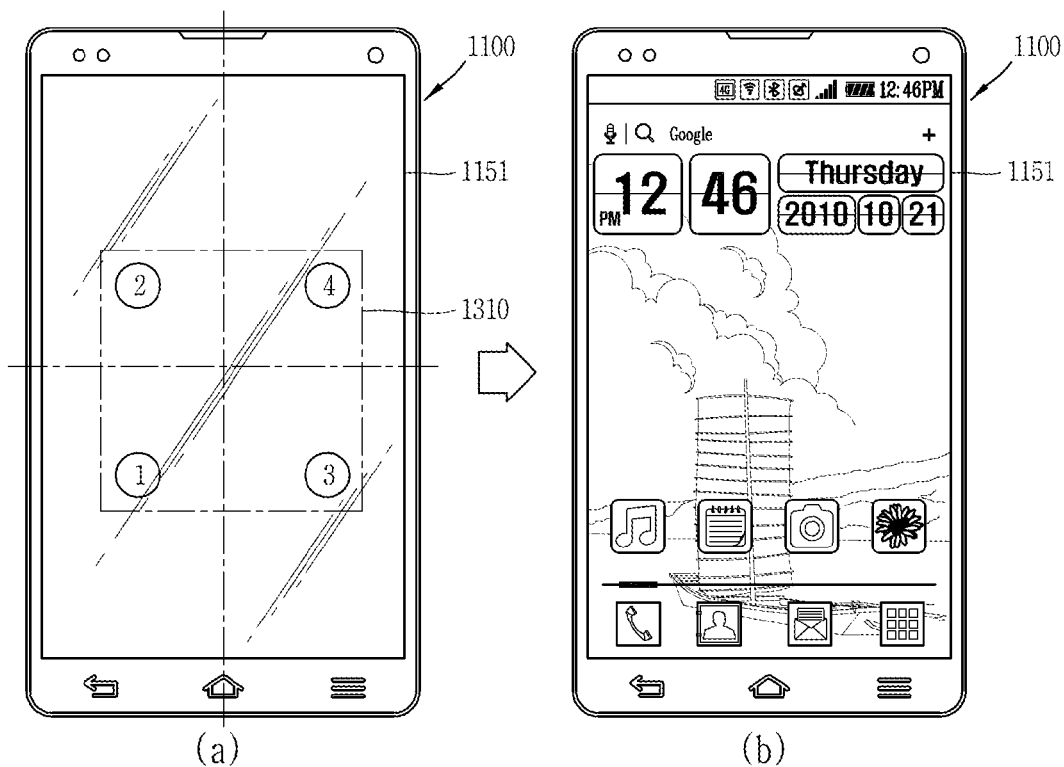
FIGS. 17A to 17C are conceptual views illustrating an example method to display different screens according to a release command in a mobile terminal according to an implementation of the present disclosure.
Figure 17B:
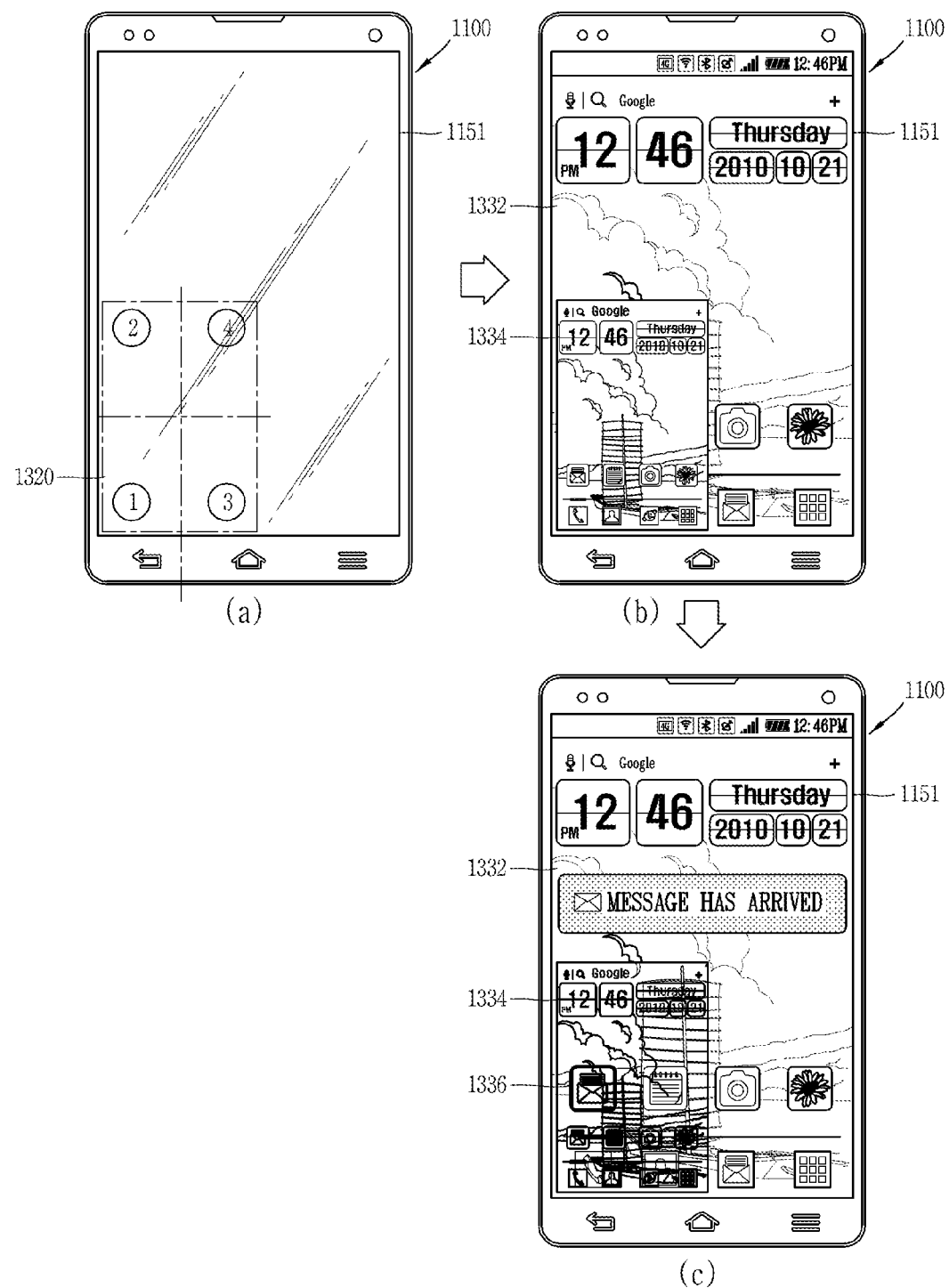
Figure 17C:
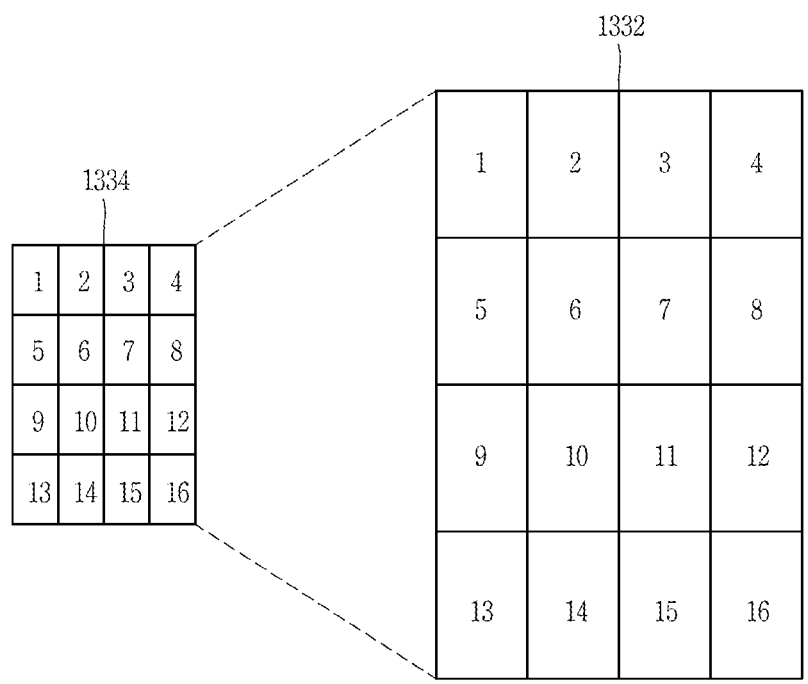

FIGS. 17A to 17C illustrate example methods to display different screens according to a release command in a mobile terminal according to an implementation of the present disclosure.

In the mobile terminal according to an implementation of the present disclosure, a user's motion pattern may be input to a region having a size larger than a reference size, or a region having a size smaller than the reference size. The reference size may be variously modified in some implementations.

As shown in FIG. 17A, when a motion pattern is applied to a region 1310 having a size equal to or larger than the reference size, the controller 1180 displays preset screen information on an entire region of the display unit 1151, as an entire screen.

As shown in FIG. 17B(*a*), a motion pattern is applied to a region 1320 having a size smaller than the reference size, the controller 1180 displays a supplementary screen 1334 obtained by contacting the preset screen information with a predetermined ratio, on a partial region of the display unit 1151. The region 1320 having a size smaller than the reference size may be divided into a plurality of regions by virtual lines.

The supplementary screen 1334 may be displayed on a region of the entire screen 1332 displayed on an entire region of the display unit 1151. In this case, the region of the entire screen 1332 is blocked by the supplementary screen 1334. Alternatively, the supplementary screen 1334 may overlay the entire screen 1332. In this case, the supplementary screen 1334 may be displayed in a semi-transparent state.

The controller 1180 determines a position of the supplementary screen according to a region to which a motion pattern has been applied. The controller 1180 displays the supplementary screen around the region to which a motion pattern has been applied.

A size of the supplementary screen may correspond to a size of a region on the display unit 1151 to which a motion pattern has been applied. That is, the size of the supplementary screen may be variable according to the size of a region on the display unit 1151 to which a motion pattern has been applied. The region, to which a motion pattern has been applied, is formed within a distance where a user's thumb can move. Accordingly, the supplementary screen for providing a convenient user's input should be also displayed within a distance where a user's thumb can move. In some cases, the supplementary screen may be displayed in a preset size, and may have its size controllable by a user's input.

In a state where the supplementary screen has been displayed together with the entire screen, a user's input for controlling an operation of the mobile terminal is performed on the supplementary screen. The controller may derive a coordinate value on the entire screen, which corresponds to a coordinate value on the supplementary screen selected by a user's input. Accordingly, even if a user's input is performed on the supplementary screen, the same effect as a user's input on the entire screen may be generated. A correlation between coordinate values on the entire screen and coordinate values on the supplementary screen may be stored in the memory.

FIG. 17C illustrates a correlation between coordinate values on the entire screen and coordinate values on the supplementary screen. Referring to FIG. 17C, a relatively small screen (left side) is defined as the supplementary screen 1334, and a relatively large screen (right side) is defined as the entire screen 1332. For convenience, it may be assumed that each of the supplementary screen 1334 and the entire screen 1332 is divided into 16 regions. It is also assumed that the 16 regions of the supplementary screen 1334 are defined as $1^{st}$~$16^{th}$ region of the supplementary screen 1334, and the 16 regions of the entire screen 1332 are defined as $1^{st}$~$16^{th}$ region of the entire screen 1332. If the $5^{th}$ region of the supplementary screen 1334 is touched by a pointer, the controller may recognize that the $5^{th}$ region of the entire screen 1332 has been touched. If the pointer has moved to the $5^{th}$ region, the $6^{th}$ region, and the $10^{th}$ region of the supplementary screen 1334, sequentially, the controller may recognize that the pointer has moved to the $5^{th}$ region, the $6^{th}$ region, and the $10^{th}$ region of the entire screen 1332, sequentially.

FIG. 17C is merely an example for explaining that coordinate values of the supplementary screen 1334 correspond to coordinate values of the entire screen 1332. Accordingly, the present disclosure is not limited to FIG. 17C. As shown in FIG. 17C, each of the supplementary screen 1334 and the entire screen 1332 may be divided into "n" regions, and the respective regions of the supplementary screen 1334 may be made to match the respective regions of the entire screen 1332. However, the supplementary screen 1334 and the entire screen 1332 may be correlated with each other in various manners, e.g., a point-to-point scheme using coordinate values of selected points.

If a coordinate value on the entire screen which corresponds to a coordinate value on the supplementary screen selected by a user's input is blocked by the supplementary screen, the controller may control the display unit 1151 so that an opaque state of the supplementary screen can be converted into a semi-transparent state or a transparent state.

If a region of the entire screen blocked by the supplementary screen is selected in a semi-transparent state of the supplementary screen, the controller may control the display unit 1151 so that the supplementary screen is displayed in a transparent state, or so that transparency of the supplementary screen can be increased.

Referring to FIG. 17C, it may be assumed that the supplementary screen 1334 is displayed on the $9^{th}$ region of the entire screen 1332 in an overlaying manner. If a pointer has moved to the $6^{th}$ region, the $5^{th}$ region, and the $9^{th}$ region of the supplementary screen 1334, sequentially, the controller may recognize that the pointer has moved to the $6^{th}$ region, the $5^{th}$ region, and the $9^{th}$ region of the entire screen 1332, sequentially. In this case, the controller may control a current state of the supplementary screen 1334 to be converted into a semi-transparent state or a transparent state, as soon as the pointer has moved to the $9^{th}$ region of the supplementary screen 1334. Under such configuration, a user can recognize that a user's input is being applied even to a region of the entire screen 1332 blocked by the supplementary screen 1334.

If an event occurs from the mobile terminal while the supplementary screen is being displayed, the controller 1180 may control a notification message so as to be displayed on the display unit 1151. If an entire region or a partial region of the notification message is blocked by the supplementary screen, the controller 1180 may control the display unit 1151 so that an opaque state of the supplementary screen 1334 can be converted into a semi-transparent state or a transparent state.

If a notification message blocked by the supplementary screen is displayed on the display unit 1151 in a semi-transparent state of the supplementary screen, the controller 1180 may control the display unit 1151 so that the supplementary screen is displayed in a transparent state, or so that transparency of the supplementary screen can be increased.

As shown in FIG. 17B(c), if an event occurs from the mobile terminal in a state where the supplementary screen 1334 has been displayed on the entire screen 1332 in an overlaying manner, the controller 180 may control a notification message such as "A message has arrived" to be output to the display unit 1151. If an entire region or a partial region of the notification message is blocked by the supplementary screen 1334, the controller 1180 may control the display unit 1151 so that an opaque state (current state) of the supplementary screen 1334 can be converted into a semi-transparent state or a transparent state. As the current state of the supplementary screen 1334 is converted into a semi-transparent state or a transparent state, a user can easily check contents of the notification message.

If an icon 1336 related to the notification message is blocked by the supplementary screen 1334, the controller 1180 may control transparency of the supplementary screen 1334, and may highlight the icon for distinction from other icons. This can allow a user to execute a related application using the icon related to the notification message.

The controller 1180 may control the supplementary screen so as not to be displayed on the display unit 1151, based on a user's input. If necessary, a user may control the supplementary screen so as to be displayed on the display unit 1151.

Figure 18B:
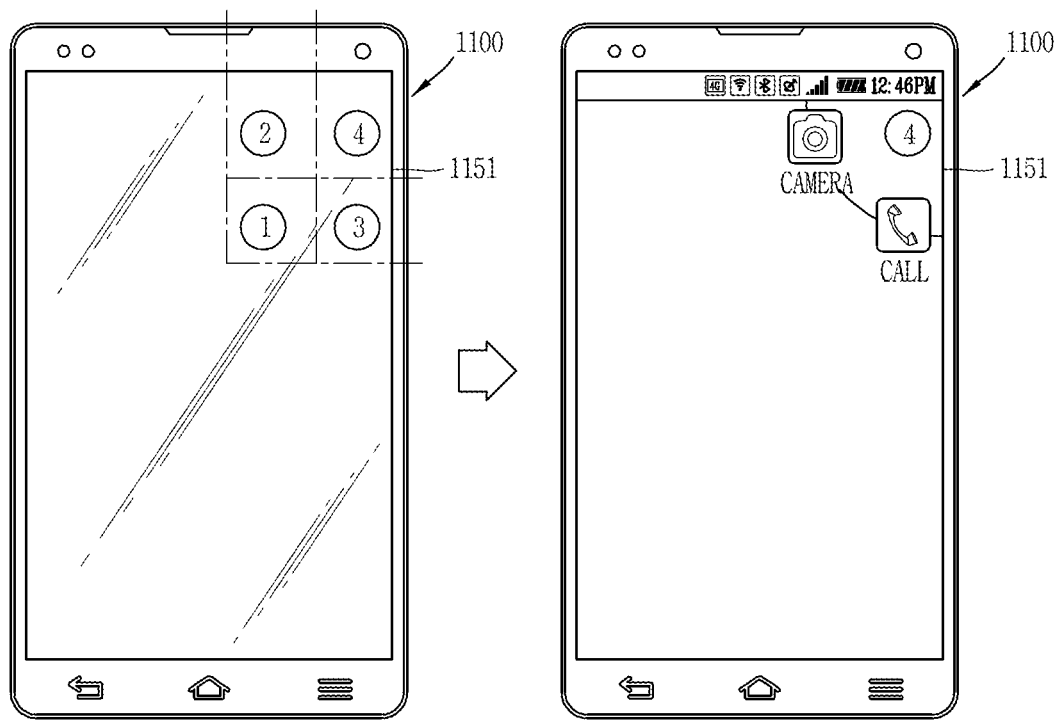

FIGS. 18A and 18B illustrate example methods to control a mobile terminal according to an implementation of the present disclosure, in a case where a last tap has not been released, but instead remains in a contacted state with the display unit.

If a motion pattern formed by sequentially connecting points of sensed taps with one another matches a preset motion pattern, the controller 1180 executes a locked-state releasing function. In a case where the last tap of the series of taps that form a motion pattern maintains a contacted state with the terminal body ("holding state"), the controller 1180 can display one or more graphic objects at a position where the last tap has been sensed. For instance, as shown in FIGS. 18A(a)~(b), if the last tap (e.g., ④) among taps (①,②,③,④) which form a motion pattern is in a holding state, the controller 1180 releases the device from the locked state and activates one or more regions of the display unit 1151. Said one or more regions may be variable according to a position where the last tap has been sensed, and include the position where the last tap has been sensed. The controller 1180 can display one or more graphic objects on said one or more regions, based on the position where the last tap has been sensed.

The graphic objects may be displayed around a position where the last tap among a plurality of taps included in a second pattern has been sensed. Also, the graphic objects may be graphic objects having different functions.

The graphic objects may be a menu 1510 including one or more functions which are executable in the mobile terminal 1100. That is, the different functions may include various types of functions that can be performed or driven in the mobile terminal 1100. For instance, the executable function may be an application installed at the mobile terminal 1100. Additionally, or alternatively, the executable function may be a function necessary to operate the mobile terminal 1100, e.g., a function to change setting information of the mobile terminal 1100, a function to output a notification panel for displaying an unchecked event, etc. For instance, as shown in FIG. 18A(b)~(c), the controller 1180 may display graphic objects corresponding to a screen capture function 1514, a call function 1518, a calendar output function 1513, and a camera function 1516, respectively, on the display unit 1151, in response to the second pattern.

In some cases, if an event has occurred from the mobile terminal, the graphic objects displayed on the display unit 1151 may be variable according to the event. For instance, if a message reception event has occurred from the mobile terminal, a graphic object corresponding to a screen capture function may be changed to a graphic object corresponding to a message check function. An event occurring from the mobile terminal may include a message reception event, a call reception event, an alarm generation event, etc. Various graphic objects may be displayed on the display unit according to various types of events.

The controller 1180 may receive input of one of graphic objects from a user. More specifically, the controller 1180 may receive input of one of the graphic objects from a user, based on a drag input which starts from the last tap. For instance, as shown in FIG. 18A(c), if a drag input which starts from the last tap (e.g., ④) is performed toward the graphic object 1518 corresponding to a call function, the controller 1180 may determine that the call function has been selected by a user.

Upon selection of one of the graphic objects, the controller 1180 executes a function corresponding to the selected graphic object, and executes an application corresponding to the function. For example, if the call function of FIG. 18A(c) is selected, an execution screen corresponding to the call function may be displayed on an entire region of the display unit 1151 (FIG. 18A(d)).

Positions as well as types of one or more graphic objects may be variable according to a holding position of the last tap. For instance, as shown in FIG. 18A, if a hold position of the last tap is a central region of the display unit 1151, the controller 1180 may display four graphic objects around the hold position of the last tap. As another example, as shown in FIG. 18B, if a hold position of the last tap is a corner region of the display unit 1151, the controller 1180 may display two graphic objects around the hold position of the last tap. As illustrated, only two graphic objects may be displayed if the corner region does not have a size large enough to display all the graphic objects.

There may occur a case where a plurality of taps on the display unit 1151 have been sensed in a deactivated state of the display unit 1151, but a motion pattern formed by the taps does not match a preset motion pattern. Such case will be explained in more detail with reference to FIG. 19.

FIG. 19 illustrates an example method to control a mobile terminal according to an implementation of the present disclosure, in a case where an erroneous motion pattern has been applied to the mobile terminal.

In a mobile terminal according to an implementation of the present disclosure, there may occur a case where a plurality of taps on the display unit 1151 have been sensed during a deactivated state of the display unit 1151, but a motion pattern formed by sequentially connecting the taps with one another does not match a preset motion pattern. Hereinafter, such case will be referred to as input of an erroneous motion pattern.

If a motion pattern formed by taps sensed by the sensing unit 1140 does not match a preset motion pattern (or if an erroneous motion pattern is sensed), the controller 1180 may maintain a locked state and instead output a notification information indicating that the sensed taps do not form the preset motion pattern, for example in one of visible, tactile, and audible manners. For instance, the controller 1180 can inform that the sensed taps do not form the preset motion pattern by using the light emitting unit 1156.

For instance, as shown in FIG. 19(*b*), the controller 1180 may maintain a deactivated state of the display unit 1151 in response to an erroneous motion pattern, and may control the light emitting unit 1156 to flicker plural times in a red color. The light emitting unit 1156 is arranged at an upper end of a front surface of the terminal body 1100, and may be provided with one or more light emitting diodes (LEDs). The light emitting unit 1156 can be configured to emit light in various manners under control of the controller 1180. For instance, the controller 1180 may change a color of light, a period to flicker light on and off, a brightness of light, etc.

If an erroneous motion pattern occurs predetermined number of times as shown in FIG. 19(*c*), the controller 1180 may activate the display unit 1151 and display a lock screen for inputting a password. Repeated occurrence of an erroneous motion pattern may indicate that a user does not know a preset motion pattern. Accordingly, the controller 1180 may display a lock screen for releasing a locked state, on the display unit 1151.

In this case, notification information, which indicates that a motion pattern formed by taps applied onto the display unit does not match a preset motion pattern (e.g., "INCORRECT TAP HAS BEEN APPLIED"), may be displayed on the lock screen.

Hereinafter, an example method to display a guide screen for easy inputting a control command by a user, and a method to set a motion pattern for releasing a locked state will be explained in more detail.

FIGS. 20A to 20E illustrate an example method to display a guide screen such that a motion pattern is input from a user, in a mobile terminal according to an implementation of the present disclosure.

A motion pattern for releasing a locked state is formed by a plurality of taps. As the plurality of taps are applied to the display unit 1151 in a deactivated state of the display unit 1151, an erroneous motion pattern may be formed. To prevent this, the controller 1180 may display a guide screen on the display unit 1151 so that taps can be correctly applied onto the display unit 1151. In a case where one or more taps on the display unit 1151 have been sensed in a deactivated state of the display unit 1151, the guide screen may be displayed on the display unit 1151. In order to prevent undesired display of the guide screen in a locked state, said one or more taps may be replaced by taps sensed on a predetermined region within a predetermined time, predetermined number of times.

The controller 1180 may activate the display unit for a predetermined time in response to said one or more taps, and may display the guide screen on the display unit 1151. That is, the controller 1180 may control the guide screen to be displayed on the display unit 1151 for a short time, and then to disappear from the display unit 1151. This is in order to inform a user that the mobile terminal is in an "ON" state.

Upon detection of the knock-on, the controller 1180 may divide an entire region of the display unit 1151 into a plurality of regions, for input of a motion pattern. A method for dividing the entire region of the display unit 1151 into a plurality of regions has been aforementioned with reference to FIG. 10. The controller may display a guide screen using the plurality of regions.

Figure 20A:
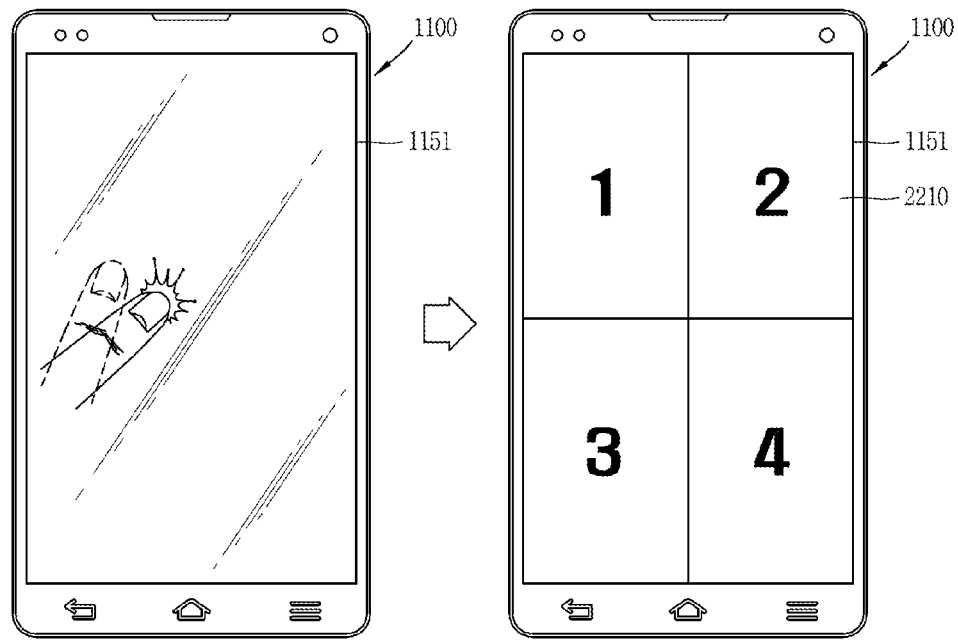
FIGS. 20A to 20E are conceptual views illustrating an example method to display a guide screen such that a motion pattern is input from a user using a mobile terminal according to an implementation of the present disclosure.

As shown in FIG. 20A, in a case where a tap on the display unit is sensed in a deactivated state of the display unit 1151, the controller 1180 may display a guide screen 2210 on the display unit 1151. For example, if a set password is "3142", the display unit 1151 can be divided into 4 regions, and the guide screen 2210 for indicating the 4 regions may be displayed. A user may release a locked state of the mobile terminal by applying taps to a third region, a first region, a fourth region and a second region, sequentially.

Figure 20B:
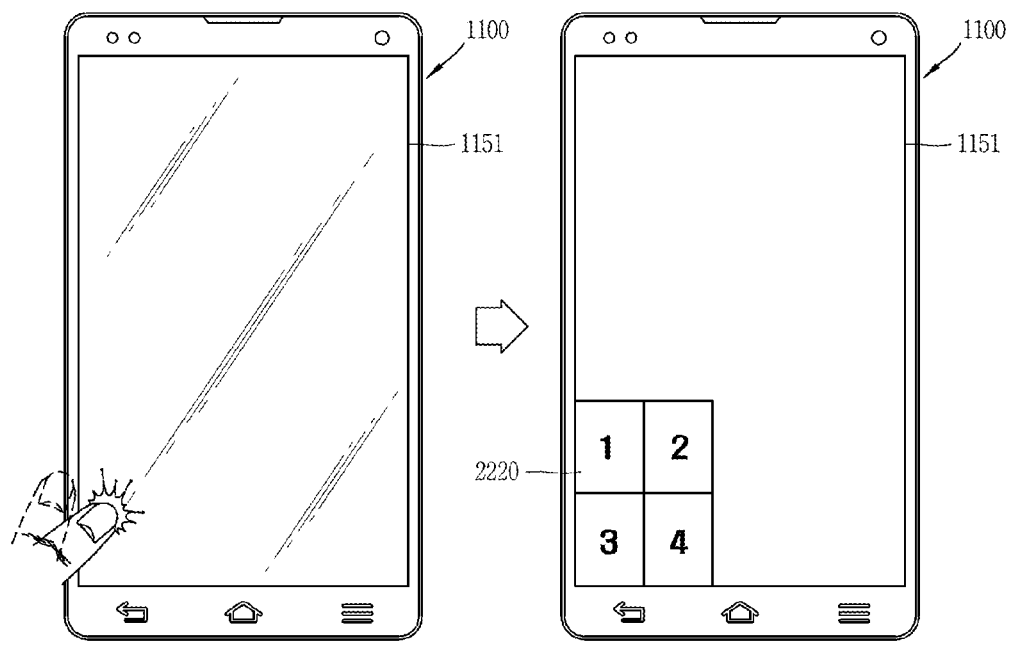

As shown in FIG. 20B, in a case where said one or more taps have been applied to a corner region of the display unit 1151, the guide screen 2220 may be displayed on one or more regions including the corner region. The controller 1180 may divide a partial region of the display unit 1151 into a plurality of regions, and may display information about the plurality of regions on the guide screen 2220. In this way, a motion pattern can be input to an area smaller than a reference area.

A size of the guide screen may be variable according to intensity of said one or more taps. For instance, if a tap of a first intensity is applied to the display unit 1151, a guide screen of a first size corresponding to the first intensity may be displayed. On the other hand, if a tap of a second intensity is applied to the display unit 1151, a guide screen of a second size corresponding to the second intensity may be displayed.

Figure 20C:
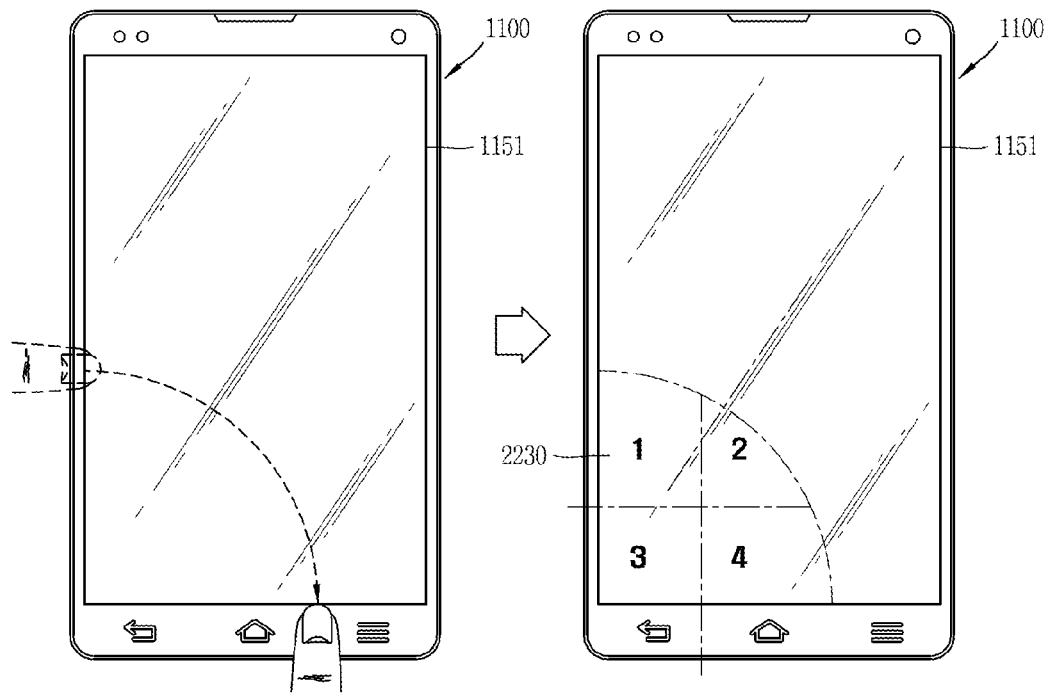

As shown in FIG. 20C, a touch input, which starts from a first point on the display unit 1151 toward a second point, may be applied in a deactivated state of the display unit 1151. The controller 1180 may divide an entire region of the display unit 1151 into a first region and a second region, based on a touch area on the display unit 1151. Then the controller 1180 displays a guide screen 2230 on one of the first region and the second region. The controller 1180 selects a display region of the guide screen, based on corner regions, a touch area, a first touch point on a touch area, and a touch-released point. That is, a size and a position of the guide screen may be variously changed according to a touch area.

If a first touch and a second touch crossing each other are sensed within a predetermined time in a deactivated state of the display unit 1151, the controller 1180 may divide an entire region 2240 of the display unit 1151 into a plurality of regions, based on the first touch and the second touch. The controller 1180 may analyze a motion pattern formed by taps, based on a tap applied to one of the plurality of regions.

Figure 20D:
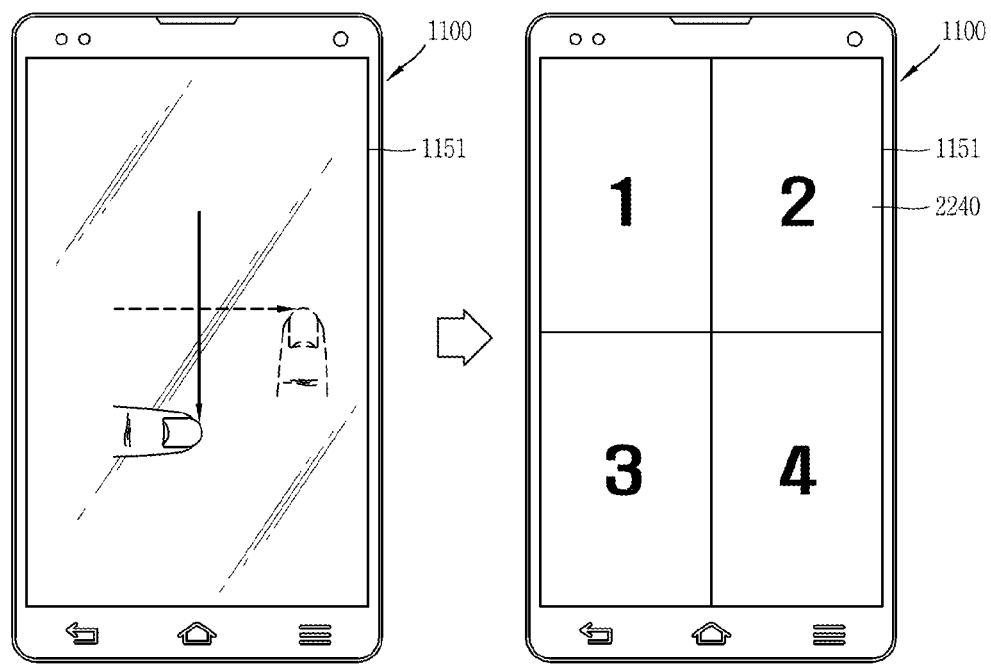
Figure 20E:
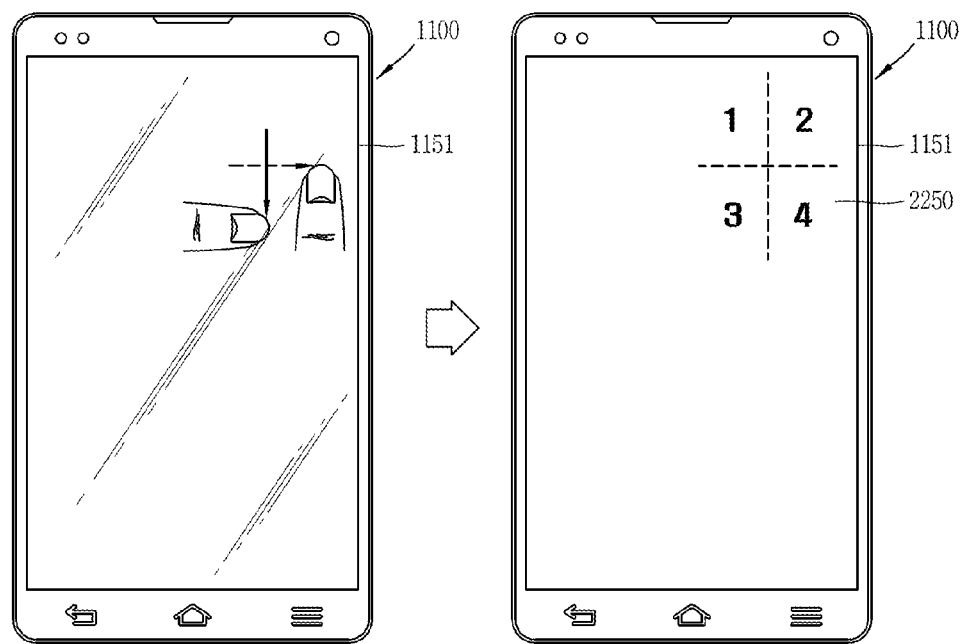

A size and a position of the plurality of regions divided by the first touch and the second touch may be variable according to the first touch and the second touch. As shown in FIG. 20D, if the first touch and the second touch cross each other at a central region of the display unit 1151, the controller 1180 may divide the entire region 2240 of the display unit 1151 into 4 regions. As shown in FIG. 20E, if the first touch and the second touch cross each other at a corner region of the display unit 1151, the controller 1180 may divide a region 2250 of the display unit 1151 into 4 regions based on a crossing point between the first drag and the second drag.

The controller 1180 may display in real-time said one or more touch paths, which are also referred to as touch orbits, in response to at least one of the first touch and the second touch, on the display unit 1151. Alternatively, when both of the first touch and the second touch have been input, the controller 1180 may activate the display unit 1151, and may display information on the divided regions. As shown in FIG. 20C, the controller 1180 may maintain a deactivated state of the display unit 1151, and may not display information on the divided regions.

In the mobile terminal according to an implementation of the present disclosure, a user may register a motion pattern for releasing a locked state.

Figure 21:
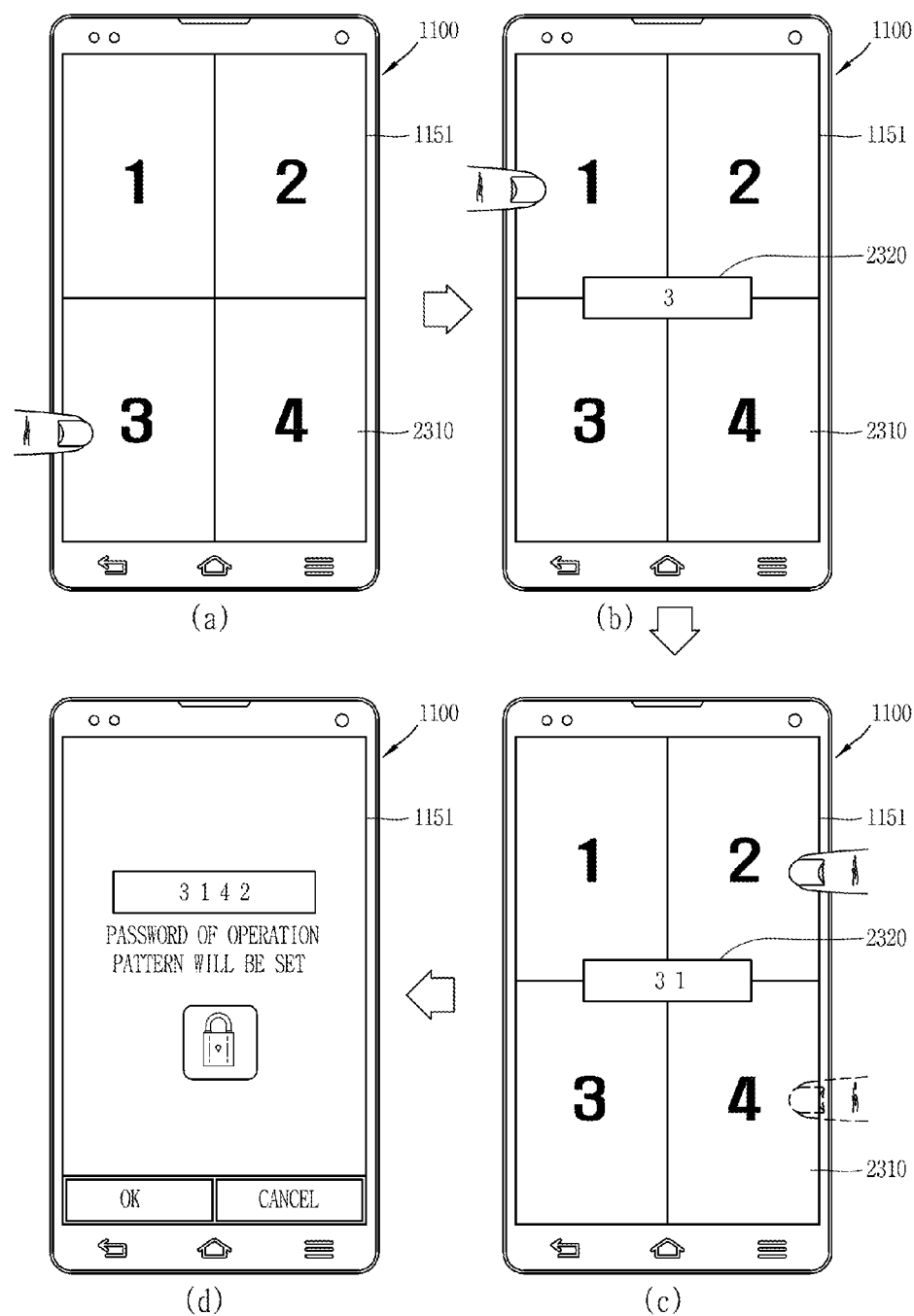

In a case where an application for registering a motion pattern is executed, the controller 1180 may display a plurality of regions 2310 for inputting a motion pattern, on the display unit 1151 as shown in FIG. 21(a). For example, an entire region of the display unit 1151 can be divided into 4 regions. However, the present disclosure is not limited to this. The number of the regions may be changed by a user's input.

The controller 1180 may set a motion pattern for releasing a locked state, based on a tap applied to one of the plurality of regions on the display unit 1151. Upon application of a tap to one of the plurality of regions, an identification number corresponding to said one region may be displayed on a region 2320 of the display unit 1151. For instance, if a first tap (e.g., ③) is applied to a third region as shown in FIG. 21(b), a number "3" corresponding to the third region may be displayed on the region 2320.

If the first to fourth taps are sequentially applied to a third region, a first region, a fourth region, and a second region, the controller 1180 may newly set a password for releasing a locked state (e.g., "3142") and a motion pattern for releasing a locked state.

In a state where a plurality of regions for inputting a motion pattern have been displayed on the display unit 1151, a pinch-in operation and a pinch-out operation with respect to the plurality of regions may be sensed. The pinch-in operation indicates that at least one of a first touch and a second touch moves so as to be close to another touch, from the initial point. On the other hand, the pinch-out operation indicates that at least one of a first touch and a second touch moves so as to be far from another touch, from the initial point. The controller 1180 may re-divide the entire region of the display unit 1151 in response to the pinch-in operation and the pinch-output operation, and may display the re-divided regions on the display unit 1151.

As one example, upon detection of a pinch-in operation in a state where 4 regions have been displayed on the display unit 1151 as shown in FIG. 22(*a*), the controller 1180 may further divide the display unit 1151 in proportion to a decreasing distance between a first touch and a second touch (referred to as a "segmentation function"). More specifically, as the first touch and the second touch become closer to each other, an entire region of the display unit 1151 may be divided into more regions.

As another example, upon detection of a pinch-out operation in a state where 4 regions have been displayed on the display unit 1151 as shown in FIG. 22(*b*), the controller 1180 may reduce the division of the display unit 1151 in proportion to an increasing distance between a first touch and a second touch (referred to as a "integration function"). More specifically, as the first touch and the second touch become farther from each other, an entire region of the display unit 1151 may be divided into less regions.

The controller 1180 may execute a segmentation function in response to a pinch-out operation with respect to a plurality of regions for inputting a motion pattern, and may execute an integration function in response to a pinch-in operation. Alternatively, or additionally, the controller 1180 may execute an integration function in response to a pinch-out operation, and may execute a segmentation function in response to a pinch-in operation.

As the divided regions are displayed on the display unit 1151, a user can input a motion pattern for releasing a locked state in a more convenient manner. This can allow a more enhanced user interface to be provided.

Figure 23:
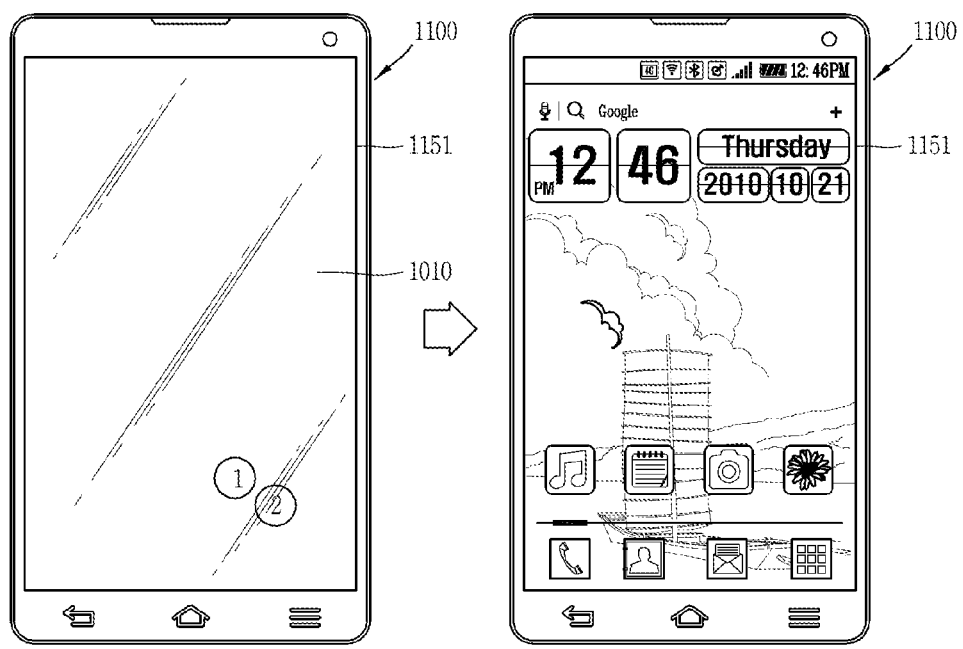
FIG. 23 is a conceptual view for illustrating an example method to release a locked state according to a user's motion pattern or an example method to execute a guest mode for using only some applications using a mobile terminal according to an implementation of the present disclosure.

FIG. 23 illustrates an example method to release a locked state according to a user's motion pattern, or a method to execute a guest mode for using only some applications, in a mobile terminal according to an implementation of the present disclosure.

Referring to FIG. 23, at least two taps applied onto the display unit 1151 within a predetermined time may be sensed during a deactivated state of the display unit 1151. The controller 1180 may execute a guest mode in response to knock-on, and may display an execution screen of the guest mode on the display unit 1151. The guest mode can refer to a state where only one or more preset applications can be executed. Such guest mode is executed in order to protect a user's privacy from a third party. That is, if knock-on is sensed in a locked state, a guest mode is executed. On the other hand, if a preset motion pattern is sensed in a locked state, the locked state is released.

In the implementation of the present disclosure aforementioned with reference to FIGS. 10 to 22, a motion pattern, formed by sequentially connecting points of sensed taps with one another, may be replaced by a motion pattern formed by a touch orbit (touch path) which consecutively moves from a first point to a second point on the display unit 1151.

Figure 24A:
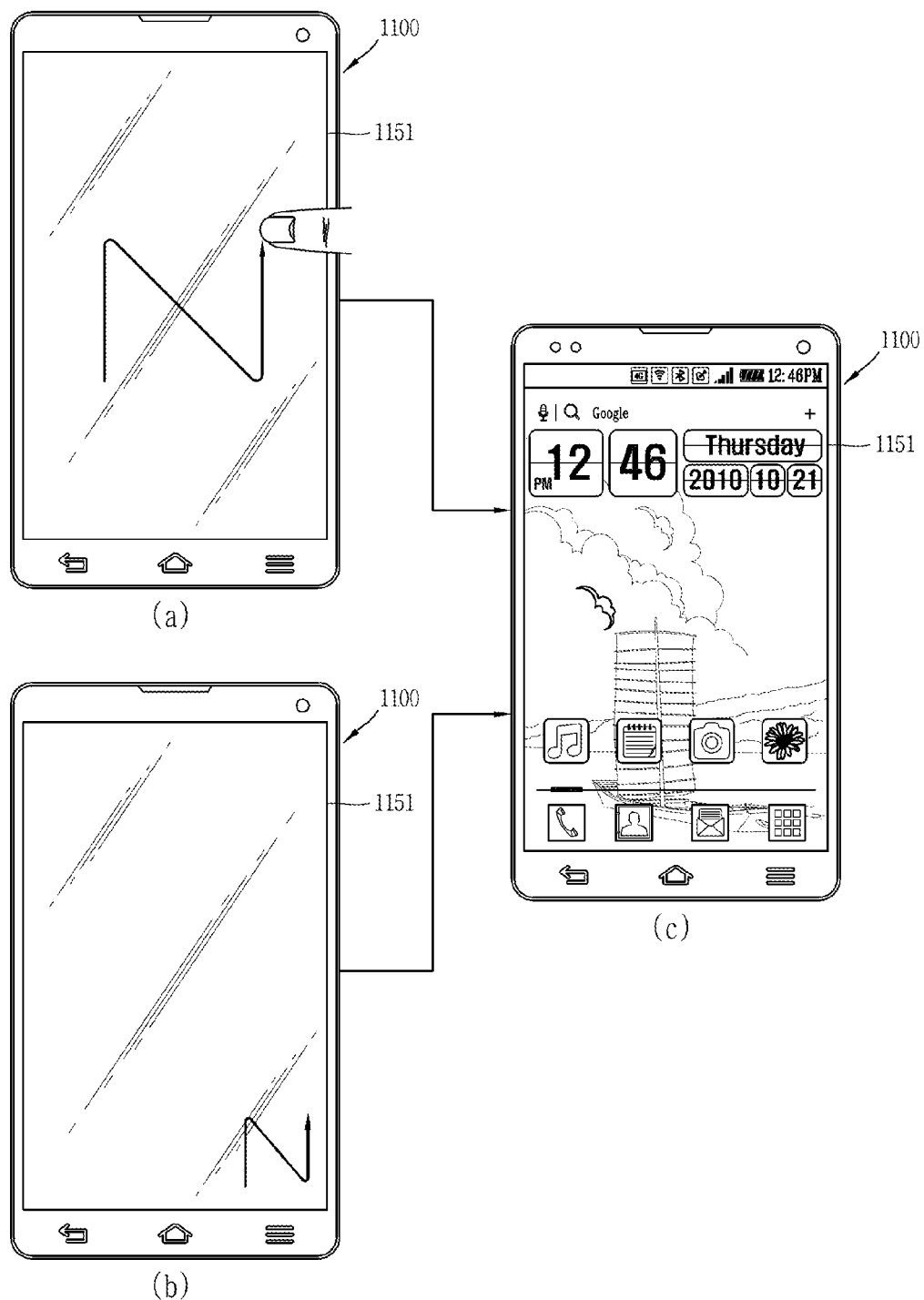
FIGS. 24A and 24B are conceptual views illustrating an example method for executing a locked-state releasing function based on a motion pattern formed by a touch area using a mobile terminal according to an implementation of the present disclosure.

Referring to FIG. 24A, if a touch orbit applied to the display unit 1151 in a deactivated state of the display unit 1151 matches a preset motion pattern, the controller 1180 may perform a locked-state releasing function. In this case, such locked-state releasing function may be executed if a motion pattern has the same shape as a preset motion pattern, even if the motion pattern has a different touch position and a different touch orbit size from the preset motion pattern.

Figure 24B:
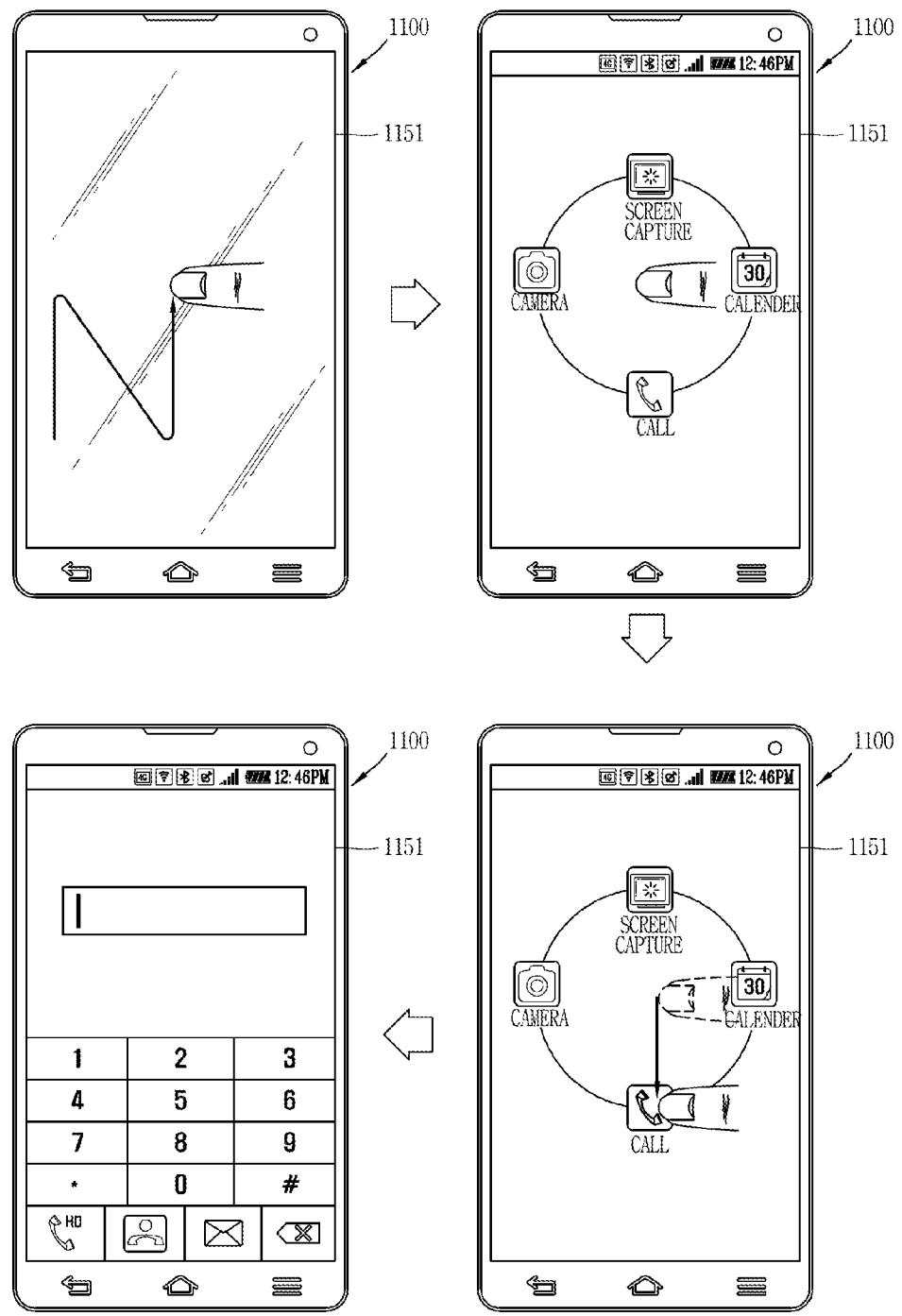

Referring to FIG. 24B, if a touch orbit formed by applied touches matches a preset motion pattern and a touch is maintained (held) at a specific position, the controller 1180 may release a locked state and may display one or more preset graphic objects on the specific position.

As aforementioned, the controller 1180 may perform a locked-state releasing function, based on a motion pattern formed by a plurality of taps in a deactivated state of the display unit 1151. A user can convert a locked state of the mobile terminal into a released state in a simple manner, e.g., by knocking on an object such as the display unit 1151. Accordingly, a new user interface can be provided, and thus a user's convenience can be enhanced.

The aforementioned method may be implemented as a program code stored in a computer-readable storage medium. The storage medium may include ROM, RAM, CD-ROM, a magnetic tape, a floppy disc, an optical data storage device, etc. The storage medium may be implemented as a carrier wave, for example transmission through the Internet.

Figure 25A:
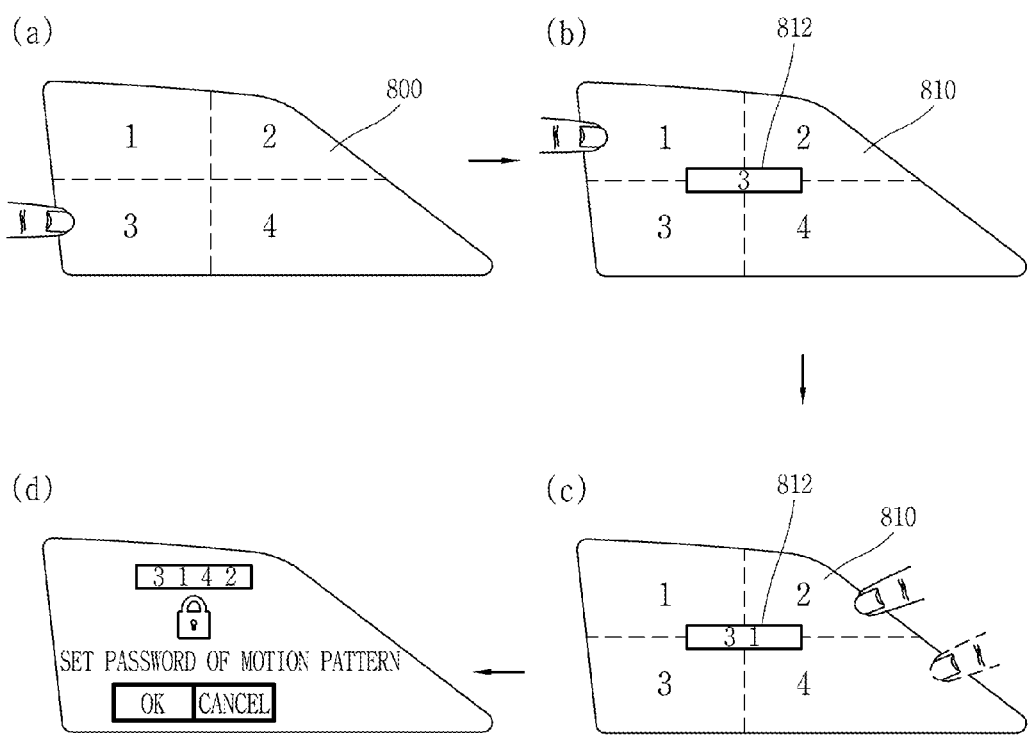

FIGS. 25A and 25B illustrate example scenarios for registering a motion pattern, in a vehicle control apparatus according to an implementation of the present disclosure.

For instance, referring also to FIG. 1A, in case of selecting a function to register a motion pattern by a user, the controller 110 (FIG. 1A) may cause to display, on a window 800, a plurality of regions 810 for receiving a motion pattern. If an authenticated user re-inputs a specific pattern corresponding to a function to register a motion pattern, or if an authenticated user executes an application program or an application for registering the motion pattern (e.g., external device 170), the controller 110 may determine that a function to register a motion pattern has been selected. For convenience, it may be assumed that a part for registering a motion pattern is displayed on an entire part of the window 800, and the part is divided into 4 regions. However, the present disclosure is not limited to this. That is, the plurality of regions may be changed according to a user's input.

The controller 110 may set a specific motion pattern based on a tap applied to one of the plurality of regions displayed on the window 800. If a tap is applied to one of the plurality of regions, an identification number corresponding to the one region may be displayed on a region 812 of the window 500. For instance, as shown in FIG. 25A(b), if a first tap is applied to a third region, a number "3" corresponding to the third region may be displayed on the region 812.

If first to fourth taps are sequentially applied to the third, first, fourth, and second regions, the controller 110 may newly set a password (e.g., "3142") and a motion pattern for user authentication.

In a state where a plurality of regions for inputting a motion pattern have been displayed on the window 800, a pinch-in operation or a pinch-out operation may be sensed. The pinch-in operation indicates that at least one of a first touch and a second touch moves so as to be close to another touch, from the initial point. On the other hand, the pinch-out operation indicates that at least one of a first touch and a second touch moves so as to be far from another touch, from the initial point. The controller 110 may re-divide the entire region of the window 800 in response to the pinch-in operation or the pinch-output operation, and may display the re-divided regions on the window 800.

For instance, upon detection of a pinch-in operation in a state where 4 regions have been displayed on the window 800 as shown in FIG. 25B(a), the controller 110 may further divide the window 800 in proportion to a decreasing distance between a first touch and a second touch (segmentation function). More specifically, as the first touch and the second touch become closer to each other, a region 852 of the window 800 may be divided into more regions.

As another example, upon detection of a pinch-out operation in a state where 4 regions have been displayed on the window 800 as shown in FIG. 25B(b), the controller 110 may reduce the division of the window 800 in proportion to an increasing distance between a first touch and a second touch (integration function). More specifically, as the first touch and the second touch become farther from each other, a region 854 of the window 800 may be divided into fewer regions.

The controller 110 may execute a segmentation function in response to a pinch-out operation with respect to a plurality of regions for inputting a motion pattern, and may execute an integration function in response to a pinch-in operation. Alternatively, the controller 110 may execute an integration function in response to a pinch-out operation, and may execute a segmentation function in response to a pinch-in operation.

As aforementioned, the controller 110 may change various types of hardware or software settings or the vehicle, based on environment setting information of an authenticated user.

FIGS. 26A to 26D illustrate example scenarios where an environment setting state of a vehicle is changed based on an authenticated user in the vehicle control apparatus according to the present disclosure.

For example, the controller 110 (FIG. 1A) may change various types of hardware or software settings or the vehicle, based on environment setting information on a currently-authenticated user. The hardware settings may include setting a height or a gap of a seat, setting a height or an operation mode of a steering wheel, setting an opening amount of a window, or setting temperature or humidity of the vehicle, etc. The software setting may include an automatic setting of a destination, automatic selection of music, selection of a radio broadcast channel, etc.

Figure 26A:

FIG. 26A illustrates an example where temperature is automatically controlled based on setting information of an authenticated user. For instance, if a specific user (e.g., "Tom") has been authenticated, the controller 110 may display, on a preset display unit 151 (FIG. 1A), information on the number of current passengers, an authenticated user, a preferred temperature of the authenticated user. The display unit 151 may be a touch screen formed on at least part of a preset region inside or outside the vehicle (e.g., window, windshield, glass, etc.). Alternatively, or additionally, the display unit 151 may be a display included in a navigation system provided in the vehicle.

In this case, as shown in FIG. 26A(b), the controller 110 may check a current temperature ("Now temp."). And the controller 110 may control a cooler or a heater by using a temperature set to the user setting information, as a target temperature ("Target temp."), so that the current temperature of the vehicle can be automatically adjusted to the user's preferred temperature.

Figure 26B:
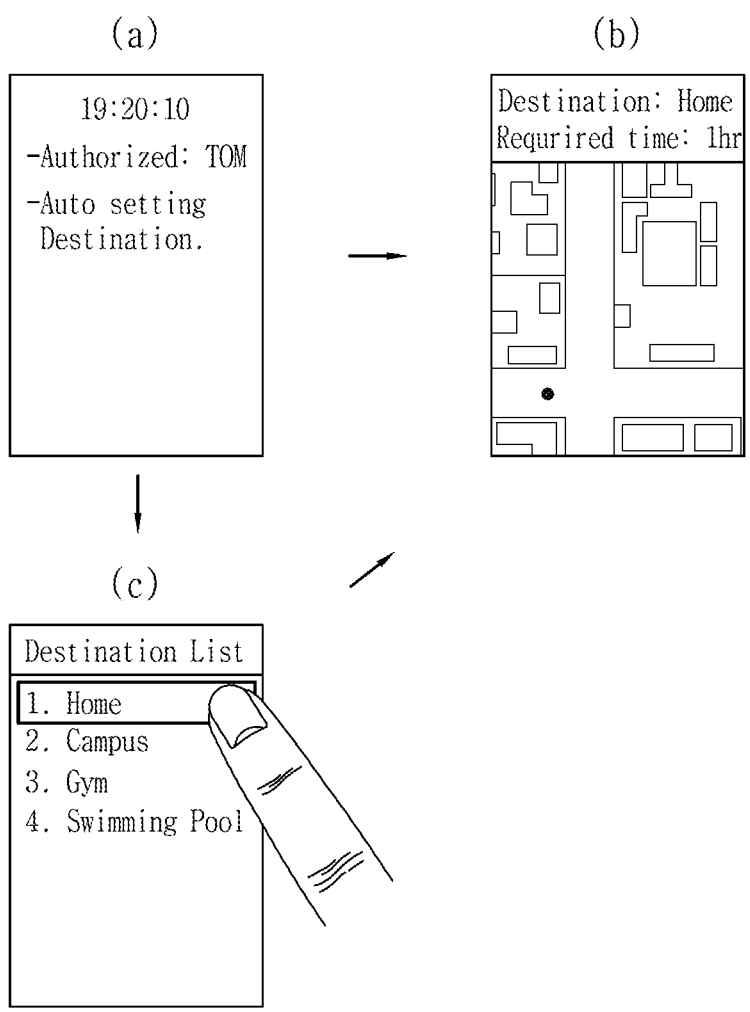

The controller 110 may also set a destination based on the authenticated user, and may automatically set a path to the destination. For instance, as shown in FIG. 26B(a), upon authentication of a user, the controller 110 may control a destination to be automatically searched based on a time when the user's authentication has been completed. For instance, the controller 110 may search for places where the user has frequently visited, at a time when the user has been authenticated, by analyzing the user's driving habit or driving record. For instance, in a case where a user's time for leaving work is mainly between 7:00 PM and 8:00 PM, and given that the user typically drives his or her vehicle home after leaving work, the controller 110 may automatically set "home" as a destination, based on the user's driving record, as shown in FIG. 26B(b). And the controller 110 may display a driving path to the currently-set destination, on a display unit of a navigation system.

The controller 110 may not directly set one destination. Rather, the controller 110 may provide to the user a list containing a plurality of destinations based on the user's driving record. In this case, as shown in FIG. 26B(c), the controller 110 may receive one of the plurality of destinations from the user. The controller 110 may display a path to the selected destination, on a display unit of a navigation system.

In some cases, if two or more passengers are on board, the controller 110 may recognize that there are two or more passengers on board.

In some cases, if two or more passengers are on board, the controller 110 may recognize that one passenger is in a passenger's seat or a rear seat based on a load applied to the vehicle or various types of sensors of the sensing unit 130 (FIG. 1A). In this case, as shown in FIG. 26C(a), the controller 110 may recognize the number of passengers who are currently on board, and may display, on the display unit, an authenticated user among the passengers.

As shown in FIG. 26C(a), if the number of passengers is two or more, the controller 110 may change physical environments inside the vehicle based on the number of passengers. For instance, if one passenger is on a passenger's seat 910, the controller 110 may control a horizontal gap or a back 912 of the passenger's seat 910 to be automatically adjusted, so that the passenger can be comfortable on the passenger's seat.

In a case where another authenticable user is on board, the controller 110 may perform user authentication with respect to said another authenticable user as well as a driver. For instance, in a case where a user who is on the passenger's seat as well as a driver have been authorized, the controller 110 may recognize both of them. In this case, the driver has been authorized at the time of releasing a locked state of the vehicle, and at the time of driving the vehicle.

Figure 26D:
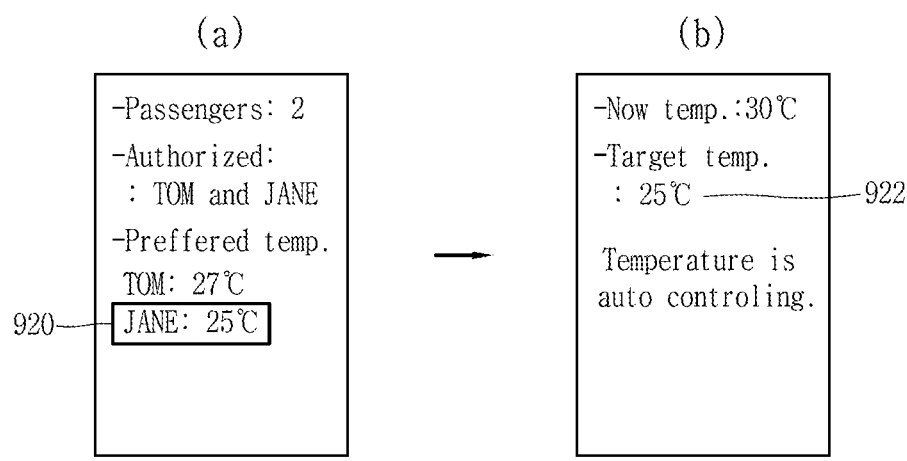

For instance, the controller 110 may detect whether there exists an authenticated user among current passengers, by analyzing an image of each passenger using a camera or a photo sensor provided in the vehicle, or by recognizing irises of each passenger. If there exists an authenticated user, as shown in FIG. 26D(a), the controller 110 may display information on all authenticated users, and may read environment setting information on each authenticated user from the memory 140.

The controller 110 may perform environment setting with respect to environments relating to driving of the vehicle (e.g., operation mode of a power steering device, a height of a steering wheel, a speed of the vehicle at the time of cruise control, a distance from a front vehicle, a transmission mode of a gear, etc.), among the read environment setting information, based on environment setting information on a user who is currently in a driver's seat.

However, the controller 110 may selectively determine other information (e.g., temperature or humidity inside the vehicle, or setting of music or a radio channel, etc.), based on environment setting information on authenticated users.

More specifically, the controller 110 may perform environment setting based on a user who is in a driver's seat. However, the controller 110 may control passengers to selectively set other environments less related to driving of the vehicle. For instance, as shown in FIG. 26D(a), if the number of authenticated passengers among all passengers in the vehicle is 2, the controller 110 may read, from the memory 140, preset environment setting information on the respective authenticated passengers, i.e., information on temperatures preferred by the respective authenticated passengers. And the controller 110 may change an environment setting state of the vehicle, based on an entry 920 of the environment setting information.

Referring to FIGS. 26D(a) and (b), if a temperature preferred by Jane has been selected from temperatures preferred by authenticated users (Tom and Jane), the controller 110 may control an inner temperature of the vehicle to be adjusted based on the selected temperature (25° C.).

As aforementioned, in a case where a user has been authenticated outside the vehicle and the authenticated user gets on board, various types of environment settings may be changed based on environment setting information on the authenticated user. However, settings for inner environments of the vehicle may be individually changed even in a state where a user has been in the vehicle.

For instance, a user may change the inner environment settings of the vehicle using a preset region inside the vehicle or a specific gesture, etc. For instance, the controller 110 may change the inner environment settings of the vehicle based on a touch input or a tap input to a driver's side or passenger's side window, a windshield, a steering wheel, a gear box, a console box, a vent hole, or a rear-view mirror, etc.

Figure 27:
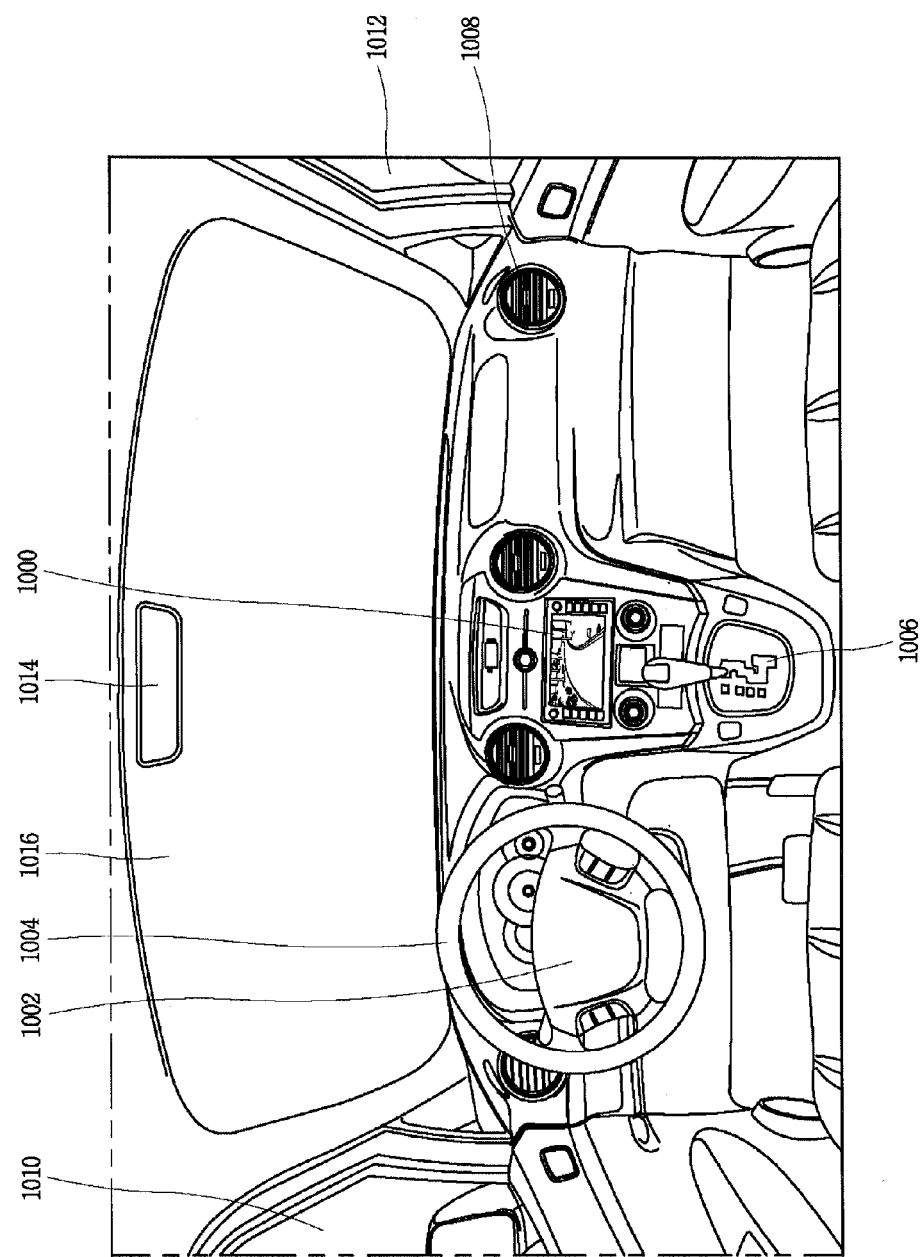
FIG. 27 is a view illustrating inside of a vehicle provided with a vehicle control apparatus according to the present disclosure.

FIG. 27 shows an example interior of a vehicle provided with the vehicle control apparatus according to the present disclosure.

The controller 110 may sense a user's tap applied to each component of the vehicle, and may change a specific environment setting of the vehicle based on the sensed tap. Environments of the vehicle, which are changed based on the sensed taps, may be determined based on a point where the taps have been sensed.

For instance, in a case where a plurality of taps have been applied to a rim 1004 or a spoke 1002 of a steering wheel, the controller 110 may check whether the taps are effective or not. If it is determined that the taps are effective, the controller 110 may change various types of setting states of the steering wheel based on the plurality of taps. For instance, the controller 110 may change a height or an operation mode of the steering wheel, based on the plurality of taps applied to the rim 1004 or the spoke 1002 of the steering wheel.

Upon sensing of a plurality of taps applied to the vicinity of a vent hole 1008, the controller 110 may control cooling or heating of the vehicle to be determined based on the plurality of taps. For instance, if the number of taps applied to the vicinity of the vent hole 1008 is odd, the controller 110 may increase intensity of cooling or heating. On the other hand, if the number of taps applied to the vicinity of the vent hole 1008 is even, the controller 110 may decrease intensity of cooling or heating. If the plurality of taps are sensed on an upper part of the vent hole 1008, the controller 110 may control the wind to blow toward the upper side. On the other hand, if the plurality of taps are sensed on a lower part of the vent hole 1008, the controller 110 may control the wind to blow toward the lower side.

Likewise, an opening amount of a driver's side window 1010 or a passenger's side window 1012 may be controlled based on the plurality of taps. For instance, the controller 110 may control an opening amount of the driver's side window 1010 or the passenger's side window 1012, based on whether the plurality of taps have been sensed on an upper part or a lower part of the windows.

Settings for various components of the vehicle, such as a windshield 1016, a navigation system 1000, a gear box 1006, and a rear-view mirror 1014, as well as the aforementioned components, may be changed by the plurality of taps. For instance, in a case where a plurality of taps have been sensed by the navigation system 1000, the controller 110 may set a specific destination, etc. based on the plurality of taps. As another example, in a case where a plurality of taps have been sensed by the gear box 1006, the controller 110 may change a transmission mode of a gear into an automatic transmission mode or a manual transmission mode.

Such plurality of taps may be sensed by the tap sensing unit 133 formed at the body unit of the vehicle, the body unit including an external frame and an internal frame of the vehicle. The controller 110 may change a criterion for determining whether taps sensed by the tap sensing unit 133 are effective or not, according to a user's selection.

Various implementations may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 110 of the vehicle control apparatus.

The foregoing implementations are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

As the present features may be embodied in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle comprising:
   a sensing unit configured to sense an authentication input of a user, the sensing unit comprising a sensor configured to sense one or more taps that are applied by the user to arbitrary positions within a preset region of the vehicle as the authentication input, the authentication input including a first tap and a touch input that follows the first tap; and a control apparatus comprising:
  a memory configured to store an authentication information, and
  a controller configured to determine whether the authentication input matches the stored authentication information and to control, based on the authentication input matching the stored authentication information, the vehicle according to the stored authentication information,
wherein the sensor includes an acceleration sensor configured to sense a rhythmic pattern associated with the touch input, wherein the controller is configured to control the vehicle based on a determination that the sensed rhythmic pattern matches the stored authentication information.

2. The vehicle of claim 1, wherein the controller is configured to determine whether one or both of a spatial information or a temporal information that is associated with the one or more taps that are applied by the user matches the stored authentication information.

3. The vehicle of claim 1, wherein the controller is configured to form an authentication information input region within the preset region to sense the one or more taps, wherein one or both of a size and a position of the authentication information input region is determined based on a position of the first of the one or more taps.

4. A vehicle comprising:
a sensing unit configured to sense an authentication input of a user, the sensing unit comprising a sensor configured to sense one or more taps that are applied by the user to arbitrary positions within a preset region of the vehicle as the authentication input, the authentication input including a first tap and a touch input that follows the first tap;
a display unit that is mounted to the vehicle and configured to output visual information; and
a control apparatus comprising:
  a memory configured to store an authentication information, and
  a controller configured to determine whether the authentication input matches the stored authentication information and to control, based on the authentication input matching the stored authentication information, the vehicle according to the stored authentication information,
wherein the sensor includes a touch sensor configured to sense positions associated with the touch input,
wherein the controller is configured to control the vehicle based on a determination that the sensed positions matches the stored authentication information,
wherein the stored authentication information is a preset pattern of position changes of sequentially-input taps, and
wherein the display unit outputs an image corresponding to the taps sensed by the sensing unit.

5. The vehicle of claim 4, wherein an output position of the image on the display unit is variable according to a position of the first tap.

6. The vehicle of claim 5, wherein the display unit is configured to restrict output of the image based onlapse of a preset time period.

7. The vehicle of claim 4, wherein the controller is configured to determine whether one or both of a spatial information or a temporal information that is associated with the one or more taps that are applied by the user matches the stored authentication information.

8. The vehicle of claim 4, wherein the controller is configured to form an authentication information input region within the preset region to sense the one or more taps, wherein one or both of a size and a position of the authentication information input region is determined based on a position of the first of the one or more taps.

9. A vehicle comprising:
a sensing unit configured to sense an authentication input of a user, the sensing unit comprising a sensor configured to sense one or more taps that are applied by the user to arbitrary positions within a preset region of the vehicle as the authentication input, the authentication input including a first tap and a touch input that follows the first tap; and
a control apparatus comprising:
  a memory configured to store an authentication information, and
  a controller configured to determine whether the authentication input matches the stored authentication information and to control, based on the authentication input matching the stored authentication information, the vehicle according to the stored authentication information,
wherein the sensor includes a touch sensor configured to sense positions associated with the touch input,
wherein the controller is configured to control the vehicle based on a determination that the sensed positions matches the stored authentication information,
wherein the sensor is configured to sense corresponding position information of taps that are sequentially input by the user as the touch input within a preset region formed inside or outside of the vehicle, and
wherein the controller is configured register the sensed position information as the stored authentication information of the user.

10. The vehicle of claim 9, wherein the controller is configured to determine whether one or both of a spatial information or a temporal information that is associated with the one or more taps that are applied by the user matches the stored authentication information.

11. The vehicle of claim 9, wherein the controller is configured to form an authentication information input region within the preset region to sense the one or more taps, wherein one or both of a size and a position of the authentication information input region is determined based on a position of the first of the one or more taps.

12. A vehicle comprising:
a sensing unit configured to sense an authentication input of a user, the sensing unit comprising a sensor configured to sense one or more taps that are applied by the user to arbitrary positions within a preset region of the vehicle as the authentication input; and
a control apparatus comprising:
  a memory configured to store an authentication information, and
  a controller configured to determine whether the authentication input matches the stored authentication information and to control, based on the authentication input matching the stored authentication information, the vehicle according to the stored authentication information,
wherein the memory is configured to store a plurality of authentication information corresponding a plurality of users, and wherein the controller is configured to determine whether the authentication input matches one of the plurality of the stored authentication information and to control, based on the authentication input matching one of the plurality of the stored authentication information, the vehicle according to the one of the plurality of the stored authentication information.

13. The vehicle of claim 12, wherein the controller is configured to determine whether one or both of a spatial information or a temporal information that is associated with the one or more taps that are applied by the user matches the stored authentication information.

14. The vehicle of claim 12, wherein the controller is configured to form an authentication information input region within the preset region to sense the one or more taps, wherein one or both of a size and a position of the authentication information input region is determined based on a position of the first of the one or more taps.

15. A vehicle comprising:
a sensing unit configured to sense an authentication input of a user, the sensing unit comprising a sensor configured to sense one or more taps that are applied by the user to arbitrary positions within a preset region of the vehicle as the authentication input; and
a control apparatus comprising:
a memory configured to store an authentication information, and
a controller configured to determine whether the authentication input matches the stored authentication information and to control, based on the authentication input matching the stored authentication information, the vehicle according to the stored authentication information,
wherein the sensing unit includes a gesture sensor that is configured to sense a gesture of the user that is performed inside or outside of the vehicle, and wherein the stored authentication information includes gesture data, the controller being configured to control a function of the vehicle based on the gesture of the user matching the stored gesture data.

16. The vehicle of claim 15, wherein the controller is configured to determine whether one or both of a spatial information or a temporal information that is associated with the one or more taps that are applied by the user matches the stored authentication information.

17. The vehicle of claim 15, wherein the controller is configured to form an authentication information input region within the preset region to sense the one or more taps, wherein one or both of a size and a position of the authentication information input region is determined based on a position of the first of the one or more taps.

18. A vehicle comprising:
a sensing unit configured to sense an authentication input of a user, the sensing unit comprising a sensor configured to sense one or more taps that are applied by the user to arbitrary positions within a preset region of the vehicle as the authentication input, the authentication input including a first tap and a touch input that follows the first tap; and
a control apparatus comprising:
a memory configured to store an authentication information, and
a controller configured to determine whether the authentication input matches the stored authentication information and to control, based on the authentication input matching the stored authentication information, the vehicle according to the stored authentication information,
wherein the sensing unit is configured to sense the touch input that is in the form of a fingerprint, and
wherein the controller is configured to control the vehicle based on a determination that the sensed fingerprint matches the stored authentication information.

19. The vehicle of claim 18, wherein the controller is configured to determine whether one or both of a spatial information or a temporal information that is associated with the one or more taps that are applied by the user matches the stored authentication information.

20. The vehicle of claim 18, wherein the controller is configured to form an authentication information input region within the preset region to sense the one or more taps, wherein one or both of a size and a position of the authentication information input region is determined based on a position of the first of the one or more taps.

21. A vehicle comprising:
a sensing unit configured to sense an authentication input of a user, the sensing unit comprising a sensor configured to sense one or more taps that are applied by the user to arbitrary positions within a preset region of the vehicle as the authentication input;
an authentication signal sensing unit that is configured sense a user authentication signal that is transmitted wirelessly from an external device; and
a control apparatus comprising:
a memory configured to store an authentication information, and
a controller configured to determine whether the authentication input matches the stored authentication information and to control, based on the authentication input matching the stored authentication information, the vehicle according to the stored authentication information,
wherein the controller is configured to control a function of the vehicle based on the user authentication signal matching a pre-stored authentication signal.

22. The vehicle of claim 21, wherein the authentication signal sensing unit is configured to receive user authentication information that includes at least one of fingerprint information, iris recognition information, and password information from the external device and to control the vehicle based on the received user authentication information matching a pre-stored reference information.

23. The vehicle of claim 21, wherein the authentication signal sensing unit is configured to receive information corresponding to a plurality of taps that are sequentially input by the user into the external device and to control the vehicle based on the information corresponding to the plurality of taps matching a pre-stored tap information.

24. The vehicle of claim 21, wherein the sensor is configured to sense the one or more taps that are applied by the user to arbitrary positions within the preset region of the vehicle as the authentication input based on a determination that the external device is within a preset distance from the vehicle.

25. The vehicle of claim 21, wherein the controller is configured to determine whether one or both of a spatial information or a temporal information that is associated with the one or more taps that are applied by the user matches the stored authentication information.

26. The vehicle of claim 21, wherein the controller is configured to form an authentication information input region within the preset region to sense the one or more taps, wherein one or both of a size and a position of the authentication information input region is determined based on a position of the first of the one or more taps.

* * * * *